United States Patent [19]

Reiners

[11] Patent Number: 4,866,610
[45] Date of Patent: Sep. 12, 1989

[54] GENERALIZED SYSTEM FOR GENERATING COMPUTER PROGRAMS

[75] Inventor: Stanley J. Reiners, Omaha, Nebr.

[73] Assignee: Syndetic Corporation, Omaha, Nebr.

[21] Appl. No.: 42,370

[22] Filed: Apr. 24, 1987

[51] Int. Cl.[4] ................................................ G06F 1/00
[52] U.S. Cl. ................................. 364/300; 364/274.1; 364/513
[58] Field of Search ................ 364/200, 300, 900, 513

[56] References Cited

U.S. PATENT DOCUMENTS 4,430,707  2/1984  Kim ..................................... 364/200

*Primary Examiner*—Raulfe B. Zache
*Attorney, Agent, or Firm*—Cushman, Darby & Cushman

[57] ABSTRACT

A system for programming a computer wherein a computer program is formed into a plurality of self-contained modules or subroutines. Each module or subroutine includes a communications process, a computational process, a data storage process and a feedback process. Each process has a complete truth table and each process is internally mathematically complete. An embodiment of the invention is in the form of a screen generation compiler.

8 Claims, No Drawings

GENERALIZED SYSTEM FOR GENERATING COMPUTER PROGRAMS

BACKGROUND OF THE INVENTION

This invention relates to a generalized system for generating programs or apparatus using a process model which simulates human intelligence.

In the past numerous techniques have been developed for developing software for the control of a general purpose digital computer. These techniques have utilized a number of different program languages such as PASCAL, BASIC, FORTH, etc. Each of these languages is, in effect, a compiler for converting input from the operator to a machine readable set of instructions. Each language has its own particular virtues with respect to the operator and computer. For example, BASIC provides a very simple means for the operator of a computer to enter instructions for controlling the operation of the computer. On the other hand FORTH is not as simple for an operator to use and in fact requires an operator who is skilled in programming techniques. However, it is designed to conserve memory and operate rapidly on a data base. Other languages such as COBOL and FORTRAN are designed for specific applications such as business or scientific uses.

Given the existence of such computer languages, techniques have been developed by programmers for developing programs designed to perform specific functions. These programming techniques include, among others, development of internal error detection routines to assist in the debugging of the developed software. In the development of programming techniques programmers have learned to develop subroutines which consist of a set of instructions. These instructions are accessed from time to time by the program to perform a given routine or subroutine. By establishing such subroutines, memory is conserved because the same subroutine can be utilized to perform the same function at a number of different times during the execution of the program. Thus, only one subroutine needs to be written for a given task even though that task may be performed a number of different times during the course of the executing of a given program. No techniques, however, have been developed for systematically designing a program in completely modular form such that each subroutine within any program is so complete that it can be called upon by the general program to perform its function without the need to modify in any respect the function of subroutines. The failure to produce such a systematic technique in the past is due, at least in part, to the failure to understand the process model of human intelligence, and accordingly, it could not be simulated in a computer environment. The present invention is directed to solving the problem of providing an error free and efficient program system for the generation of software for controlling general purpose digital computers.

The present invention is also directed to providing an improved system for the design of apparatus utilizing a sequence of steps in its operation.

SUMMARY OF THE INVENTION

Accordingly, the present invention relates to a system of generating a method or apparatus for performing a sequence of steps formed of a series of subprocesses hereafter called subroutines or modules. Each subroutine or module is made self-contained in that it includes a communication process, a computational process, a data storage process and a feedback process. The communications process for each subroutine or module includes a series of commands capable of interfacing the subroutine or module with any other subroutine or module of the program. The computational process is a sequence of commands which evaluates information stored or entered into a computer or controller and which is to be used by the computer or controller. The data storage process includes a series of commands for storing and recovering data for use by the computational process and communications process. The feedback process is a series of commands which performs the controlling function for each subroutine or module. Each subroutine or module having the aforementioned process commands must be complete in and of itself so that it can be used as a building block for an overall system. To be complete in and of itself, each element of every process must have a complete truth table. In addition, mathematical completeness must exist for each process.

In the past processes, such as, programs were designed having a series of subroutines which could be analogized to the aforementioned modules. However, such subroutines were typically not internally complete and were designed so that they could interface only with certain portions of the main program. Thus, they were not adaptable to be used as generalized building blocks for system software. In the present invention, each module is self-contained in that it includes each of the aforementioned process commands and accordingly can be utilized without modification in a general software system. By the use of self-contained modules substantially reduced execution time has been achieved and the total storage required for the program has been substantially reduced.

DETAILED DESCRIPTION OF THE PREFERRED EMBODIMENT

As a general overview, in the present invention, four simultaneous processes function in compliance with two constraints to produce the necessary and sufficient conditions for the generation of a non-unique method or apparatus for performing a desired objective. This invention is limited to those methods and apparatus for performing a deserved objective which are capable of being defined in terms of the aforementioned processes and constraints. These processes and constraints are discussed hereinbelow by way of example in connection with computer software. However, it should be appreciated that the invention is also applicable to apparatus for performing a sequence of steps, such as, a robot or a manufacturing process.

In the development of a general process model for the design of computer software, four clearly defined categories of simultaneous processes must exist. They are the communications process, the computational process, the data storage process, and the feedback process which updates the data stage, computational and communications processes. The communications process provides for communication between one module of the program or software and another module thereof. Accordingly, each module of the software must provide for commands which will permit communication between itself and an external module or program. The computational process serves the purpose of operating on information or data stored either within the program module itself or externally thereof and communicated to the module by way of the communications process. Each module of the program must include the computational process so that it does not rely upon a computational process of other modules or of an external program. The data storage process includes commands for the purpose of the preservation and recovery of information or data. The data may be stored within the program module itself or more generally outside of the program. The data storage process, however, provides the instructions for accessing such data so that the data can be operated on by the computational process. The data storage process in such a generalized instance would, of course, rely upon the communications process for retrieving and storing the information or data. In addition, the results of the computational process are operated on by the data storage process to store same as appropriate. The feedback process interrelates with the data storage, computational, and communications processes in order to be internally complete and not rely upon outside program steps for execution of the function for which the program module was designed.

In addition to the four processes required in each of the program modules, the processes are constrained such that each element of every process has a complete truth table and that each process be internally mathematically complete. The truth table constraint guarantees that the processes performed are in fact logically accurate. The mathematical completeness constraint guarantees that the process is unique and not duplicative and open ended.

As an example of the development of a program system utilizing the aforementioned systematic steps, a screen generation compiler has been developed. The compiler serves the purpose of declaring and defining the data input screens to be used in a particular program. In addition, it assembles data in a proper format so that it can be presented to the individual operator via a monitor or printout or in the alternative to the computer internally for operational steps to be performed thereon. In the case of the screen generation compiler, the program compiles data for use by another program utilized within the computer. The functions performed include among others, ASCII to binary conversion, binary to ASCII conversion, the insertion of commas into number strings at the thousandths point, the insertion of leading and trailing signs, the insertion of brackets and braces around negative numbers, etc. Other fundamental routines provided in the screen generation compiler are the management of color display and the formatting of data for display on a monitor. A program listing of the screen generation compiler in object code has been deposited with the U.S. Patent and Trademark Office pursuant to its guidelines.

The screen generator compiler is structured in the aforementioned modular form so that it comprises a plurality of internally complete modules which together form the program. As exemplified by the screen generation compiler, a new and improved programming system has been designed for simplifying the program development techniques by the self-contained modular form of programming described herein. Substantial operational time for executing the program has been saved. In addition, program storage space has been reduced because of the modular design of the present programming system. Moreover, because each module is internally complete, program debugging time has been reduced.

While the present invention has been disclosed in connected with a preferred embodiment thereof, it should be appreciated that there may be other embodiments of the invention which fall within the spirit and scope of the invention as defined by the appended claims.

PASCAL AND ASSEMBLER SOURCE CODE LISTINGS TO ILLUSTRATE HOW A PROGRAMMING PROCESS TITLED <u>A GENERALIZED SYSTEM FOR GENERATING COMPUTER PROGRAMS</u> CAN BE INCORPORATED INTO A COMPUTER PROGRAM.
Copyright(c) 1987 Syndetic Corporation. All Rights Reserved.

```
{ SCREEN GENERATION COMPILER (SGC) - Source Code documentation    }
{ Copyright(c) 1987 Syndetic Corporation. All Rights Reserved     }
{----- SGC program main module-----}
program SGC(input,output);
(*
{$debug+}
{$line+}
*)
function stkseg : word; extern;
function stkptr : word; extern;
function fremqq(ptr : adsmem) : word; extern;
function allmqq(siz : word) : adsmem; extern;
const nill = adsmem (0,0);
var      [public]
         drno,atrb,dent,lsthspg:integer;
         cont:boolean;
         drv,dumstr:lstring(1);
         xnam,itm:lstring(21);
         tic,valid,xend:boolean;
         fpos,pos,pop,fir:integer;
         fdats,flabs:integer;
```

```
              segnam,oname,kname:lstring(21);
              svpath,pth:lstring(64);
              firf,lasf,kmsg:integer;
              file8:text;
     var     [public]       file1,file2:text;      { Type Declarations }
     type    dimbits=array [1..8] of integer;      { Global Variable Declarations }
     var [public]                                  { Display Value Parameters and Variables }
              masop:integer;   {master (outer) function number}
              monsz:integer;        {Monitor size, 40, or 80 }
              dpage:integer;   {screen page for display}
              roworg:integer;       {Display row origin}
              colorg:integer;       {Display column origin}
              rowsz:integer;   {Row size of Display}
              colsz:integer;   {Column Size of Display}
              disedc:integer;       {Edit control of Display}
              bakcol:integer;       {Background Color}
              zname:lstring(20);              { Working Variables }
              dname:lstring(8);
              field:integer;
              error:boolean;
              funct,cntlt,altt,shftt:boolean;
              db,dw,dd:lstring(13);
              dwo:lstring(20);
     { Color Library Variables }
              nolib:integer;        {library size}
              nopnt:integer;
              colib:array [1..20] of integer;      {library}
     {color working variables }
              msg1:lstring(20);
     { SCREEN GENERATION COMPILER (SGC) - Source Code documentation      }
     { Copyright(c) 1987 Syndetic Corporation. All Rights Reserved       }
     {----- SGC program main module-----}
     program SGC(input,output);
     (*
     {$debug+}
     {$line+}
     *)
     function stkseg : word; extern;
     function stkptr : word; extern;
     function fremqq(ptr : adsmem) : word; extern;
     function allmqq(siz : word) : adsmem; extern;
     const nill = adsmem (0,0);
     var     [public]
              drno,atrb,dent,lsthspg:integer;
              cont:boolean;
              drv,dumstr:lstring(1);
              xnam,itm:lstring(21);
              tic,valid,xend:boolean;
              fpos,pos,pop,fir:integer;
              fdats,flabs:integer;
              segnam,oname,kname:lstring(21);
              svpath,pth:lstring(64);
              firf,lasf,kmsg:integer;
              file8:text;
     var     [public]       file1,file2:text;
     { Type Declarations }
     type    dimbits=array [1..8] of integer;
```

```
{ Global Variable Declarations }
var [public]
{ Display Value Parameters and Variables }
        masop:integer;     {master (outer) function number}
        monsz:integer;            {Monitor size, 40, or 80 }
        dpage:integer;     {screen page for display}
        roworg:integer;           {Display row origin}
        colorg:integer;           {Display column origin}
        rowsz:integer;     {Row size of Display}
        colsz:integer;     {Column Size of Display}
        disedc:integer;           {Edit control of Display}
        bakcol:integer;           {Background Color}
{ Working Variables }
        zname:lstring(20);
        dname:lstring(8);
        field:integer;
        error:boolean;
        funct,cntlt,altt,shftt:boolean;
        db,dw,dd:lstring(13);
        dwo:lstring(20);
{ Color Library Variables }
        nolib:integer;            {library size}
        nopnt:integer;
        colib:array [1..20] of integer;         {library}
{color working variables }
        msg1:lstring(20);
        msg2:lstring(20);
        msg3:lstring(20);
        msg4:lstring(20);
        libmsg:lstring(20);
        coloredt:boolean;                {true if color edit mode}
        oldcolor,newcolor:integer;
{ Label definition file}
type    link = ads of titldat;
        titldat = lstring (160);
        titldat1 = lstring (51);
type    labelrec=record
                rowl:integer;
                coll:integer;
                lenl:integer;
                seql:integer;
                titl:link;
                xnam:lstring(5);
        end; {labelrec}
var [public]
        labelfil:array [1..150] of labelrec;
        nlabs:integer;
        labpnt:integer;
        labcolor:integer;
        labptr:link;
        newentry:boolean;
        row,col,len,curpos,dtype:integer;
        seqm:integer;
        out:lstring(80);
        lbname:lstring(5);
        labtith:link;
        lablenh:integer;
```

```
{ Data File Definition }
type datarec=record
        rowd,cold,lend,seqd:integer;
        colord:array [1..4] of integer;
        optd:array [1..5] of integer;
        ofst:array [1..3] of integer;
        idxd:array [1..3] of word;
        iname,ddname,decname:lstring(20);
end;
var [public]
        datafil:array [1..150] of datarec;
        ndats,datpnt:integer;
{   Function Key Data Variables   }
type    funcrec = record
                    faction:integer;
                    fvalue:integer;
                    end;
        funsetr = record
                    key:lstring(8);
                    code:integer;
                    end;
var [public]
        funcfil:array [1..40] of funcrec;
        funcset:array [1..22] of funsetr;
        funcmsg:array [1..4] of titldat;
        inot:lstring(8);
        nfunset:integer;
{ Interface Variable File }
type    variflrec = record
                    vname:lstring(20);
                    vtype:integer;
                    vxna:lstring(5);
                    end;
var     [public]
        varifl:array [1..100] of variflrec;
        nvars:integer;
{ Help Table File }
type    helprec = record
                    fncno:integer;
                    rowh:integer;
                    colh:integer;
                    colorh:integer;
                    hname:lstring(8);
                    end;
var     [public]
        helpfil:array [1..40] of helprec;
        nhelps:integer;
        v1:array [1..8] of boolean;
        fr1:array [1..10] of boolean;
        b1,b2,b3:boolean;
        ifv,idv,idp:lstring(20);
        ifv1,idv1,idp1:word;
        decplac,helpcol:integer;
        lchr,bc1,bc2:lstring(1);
        editd:datarec;
{ Compiler variable initial defaults}
var [public]
```

```
          strd:datarec;    {string data field}
          reald:datarec;   {real data field}
          intd:datarec;    {integer data field}
          wordd:datarec;   {word data field}
          boold:datarec;   {boolean data field} var    disreg:lstring(160);  {local variable}
       rowh,colh,lenh,colorh:integer;
PROCEDURE GETLINE(vars nam:lstring;
                  vars row:integer;
                  vars txt:lstring); extern;    {retrieve screen row}
function FIRDIS(vars nam:lstring):integer; extern; {set first display}
function LASDIS(vars nam:lstring):integer; extern; {set last display}
function BACKGRD:integer; extern;              {clear background}
function LABELS:integer; extern;               {Draw labels}
function MARKFLD:integer; extern;              {mark data fields}
function DISPLAYD:integer; extern;             {Display data values}
function READD:integer; extern;
function KEYIN:integer; extern;                {Input with keyboard}
function RENKEYIN:integer; extern;             {Re-enter keyboard inp}
function CLEARED:integer; extern;              {Clear editor of links}
function GETCURFLD(vars nam:lstring;    {Get cursor field}
                   vars FIELD:integer):integer; extern;
function SETCURFLD(vars nam:lstring;    {Set cursor field}
                   vars FIELD:integer):integer; extern;
function CURSORPOS(vars nam:lstring;           {Get cursor name,row,col}
                   vars ROW:integer;
                   vars COLUMN:integer):integer; extern;
function SETCOLOR(vars nam:lstring;            {Set field color}
                  vars FIELD:integer;
                  vars COLOR:integer):integer; extern;
function SETERROR(vars nam:lstring;            {Set field to error color}
                  vars FIELD:integer):integer; extern;
function SETORIGIN(vars nam:lstring;           {Set display origin}
                   vars ROW:integer;
                   vars COLUMN:integer):integer; extern;
function SETBAKCOL(vars nam:lstring;           {Set background color}
                   vars COLOR:integer):integer; extern;
function SETLABFLD(vars nam:lstring;           {Set label limits}
                   vars FIRST:integer;
                   vars LAST:integer):integer; extern;
function SETDATFLD(vars nam:lstring;           {Set data field limits}
                   vars FIRST:integer;
                   vars LAST:integer):integer; extern;
function SETPAGE( vars nam:lstring;            {Set display page}
                  vars PAGE:integer):integer;  extern;
function SCROLROW(vars nam:lstring;            {scroll up or down}
                  vars ROWS:integer):integer; extern;
function SCROLCOL(vars nam:lstring;            {scroll right or left}
                  vars COLUMNS:integer):integer; extern;
{ Non-general SGC utilities }
function setedii(vars nam:lstring;     {set edit display size}
                 vars rows:integer;
                 vars cols:integer):integer;
         extern;
{ keyin for cursor position edit}
```

```
function kexin:integer;
        extern;
{ keyin for cursor position edit}
function kexren:integer;
        extern;
{keyin for lable, data field declaration}
function kezin(vars roworg:integer;
               vars colorg:integer;
               vars rowsz:integer;
               vars colsz:integer;
               vars dtype:integer;
               vars row:integer;
               vars column:integer;
               vars length:integer;
               vars curpos:integer;
               vars color:integer):integer;
        extern;
{ Get label from screen }
function getlabel(vars nam:lstring;
                  vars len:integer;
                  vars roworg:integer;
                  vars colorg:integer;
                  vars row:integer;
                  vars col:integer):integer;
        extern;
{ Display label on screen }
function dislabel(vars nam:lstring;
                  vars len:integer;
                  vars roworg:integer;
                  vars colorg:integer;
                  vars row:integer;
                  vars col:integer):integer;
        extern;
                {Screen Links}
{$include:'\sgcscr\sgcscrlb.pas'}
(* * * *   I N C L U D E   F I L E   R E P L A C E S   T H E S E   * * * *
{ Read Declaration function line}
function sgc7l:integer;  extern;
{ String Declaration function line }
function sgc6l:integer;  extern;
{ Label Declaration function line }
function sgc5l:integer;  extern;
{ Integer Declaration function line }
function sgc8l:integer;  extern;
{ Word Declaration function line }
function sgc9l:integer;  extern;
{ Boolean Declaration function line }
function sgc10l:integer;  extern;
{ Real Data Edit/Display control Screen}
FUNCTION SGC12L(vars fr1:BOOLEAN;
        vars v1:BOOLEAN;
        vars rw:INTEGER;
        vars cm:INTEGER;
        vars lg:INTEGER;
        vars ifv:LSTRING;
        vars ifv1:WORD;
        vars idv:LSTRING;
```

```
                vars idv1:WORD;
                vars idp:LSTRING;
                vars idp1:WORD;
                vars lchr:LSTRING;
                vars decplac:INTEGER):INTEGER;  EXTERN;
    FUNCTION SGC18l(vars v1:BOOLEAN;
                vars rw:INTEGER;
                vars cm:INTEGER;
                vars lg:INTEGER;
                vars ifv:LSTRING;
                vars ifv1:WORD;
                vars idv:LSTRING;
                vars idv1:WORD;
                vars fr1:BOOLEAN;
                vars lchr:LSTRING):INTEGER;  EXTERN;
    FUNCTION SGC19l(vars v1:BOOLEAN;
                vars rw:INTEGER;
                vars cm:INTEGER;
                vars lg:INTEGER;
                vars ifv:LSTRING;
                vars ifv1:WORD;
                vars idv:LSTRING;
                vars idv1:WORD;
                vars fr1:BOOLEAN;
                vars lchr:LSTRING):INTEGER;  EXTERN;
FUNCTION SGC13l(vars v1:BOOLEAN;
            vars rw:INTEGER;
            vars cm:INTEGER;
            vars lg:INTEGER;
            vars ifv:LSTRING;
            vars ifv1:WORD;
            vars idv:LSTRING;
            vars idv1:WORD;
            vars cb1:LSTRING;
            vars b1:BOOLEAN;
            vars cb2:LSTRING;
            vars b2:BOOLEAN;
            vars b3:BOOLEAN):INTEGER;  EXTERN;
FUNCTION SGC17l(vars v1:BOOLEAN;
            vars rw:INTEGER;
            vars cm:INTEGER;
            vars lg:INTEGER;
            vars ifv:LSTRING;
            vars ifv1:WORD;
            vars idv:LSTRING;
            vars idv1:WORD;
            vars fr1:BOOLEAN):INTEGER;  EXTERN;
FUNCTION SGC26l(vars rw:INTEGER;
            vars cm:INTEGER;
            vars lg:integer):integer;     extern;

{ Display Main Edit Screen }
FUNCTION sgc21l(vars vv:LSTRING):INTEGER;  EXTERN;
{ Help screen/mark definition screen }
FUNCTION sgc22l(vars nam:LSTRING):INTEGER;  EXTERN;
FUNCTION sgc27l(vars nam:LSTRING):INTEGER;  EXTERN;
FUNCTION MOREL:INTEGER;  EXTERN;
FUNCTION DIRREDl(vars itm:LSTRING):INTEGER;  EXTERN;
```

```
FUNCTION DIRDATL(vars itm:LSTRING;
         vars dum:INTEGER):INTEGER;  EXTERN;
FUNCTION DIRTITL(vars labl:LSTRING;
         vars drv:LSTRING;
         vars pth:LSTRING):INTEGER;  EXTERN;
FUNCTION SYNCORPL:INTEGER;  EXTERN;
* * * *   E N D   O F   C O M M E N T E D   P A R T   * * * *)
procedure palette(vars numcols:integer;
             vars col1,col2,col3,col4:integer); extern;
procedure macroinfo; extern;
procedure funkedit; extern;
procedure bitsbyte(vars bits:dimbits; vars bytes:integer); extern;
procedure bytebits(vars bits:dimbits;vars bytes:integer); extern;
procedure funcdisp; extern;
procedure sgcrepo;  extern;
procedure readfil; extern;
procedure writefil; extern;
procedure clearfil; extern;
{-------  File managemaent functions --------}
{-- all name/past variable must be 64 bytes long ---}
FUNCTION FNDENT(VARS path:LSTRING;           {Find a file}
             VARS NAM:LSTRING;
             VARS ATRB:INTEGER):INTEGER;
             EXTERN;
       {returns: 0--found
                 2--file not found
                 18--no more files}
FUNCTION NEXENT(VARS nam:LSTRING;            {Next File}
             VARS ATRB:INTEGER):INTEGER;
             EXTERN;
       {returns: 0--found
                 18--no more files}
FUNCTION CREATSD(VARS nam:LSTRING):INTEGER;  {create sub-drectory}
             EXTERN;
       {returns: 0--found
                 3--path not found
                 5--access denied}
FUNCTION SETSD(VARS nam:LSTRING):INTEGER;    {Set default Sub-dir}
             EXTERN;
       {returns: 0--set
                 3--path not found}
FUNCTION GETSD(VARS nam:LSTRING):INTEGER;    {Returns deflt Sub-dir}
             EXTERN;
       {returns: 0--set
                 15--invalid drive}
PROCEDURE SETDFD(consts drno:INTEGER);       {Set Default Drive}
             EXTERN;
       {drno = 0 for A, 1 for b, etc.}
FUNCTION GETDFD:INTEGER;                     {Returns Default Drive}
             EXTERN;
       {GETDFD = 0 for A, 1 for b, etc.}
FUNCTION RENAMF(VARS oldnam:lstring;         {Rename file}
             VARS newnam:LSTRING):INTEGER;
             EXTERN;
       {oldnam--original name
        newnam--name after change
        returns 0--done
```

```
                3--path not found
                17--Not same device.
        Note:   Renaming can move file from one sub-drectory to
                another}
FUNCTION DELDIR(VARS nam:LSTRING):INTEGER;        {Delete sub-directory}
                EXTERN;
        {Returns 0--done
                3--path not found
                5--access denied}
FUNCTION DELFIL(VARS nam:LSTRING):INTEGER;        {Delete file}
                EXTERN;
        {Returns 0--done
                2--file not found
                5--access denied}

{--------- INTERNAL PROCEDURES/FUNCTIONS ---------}
{--------print a screen routine----}
procedure prtscr(consts leftspc,frow,lrow:integer) [public];
var     spac,txt:lstring(80);
        nnm:lstring(1);
        i,j,qc:integer;
begin
        nnm:=null;
        for i:=1 to 80 do spac[i]:=chr(32);
        spac[0]:=chr(leftspc);
        for i:= frow to lrow do
                [if ord(spac[0])>0 then
                        write(file8,spac);        {leading spaces}
                j:=i;getline(nnm,j,txt);
                qc:=61;
                for j:=1 to 80 do
                        [if ord(txt[j])>127 then txt[j]:=chr(42)];
                writeln(file8,txt);
                lsthspg:=lsthspg+1];
end;
                                                {   NEWPAG   }
procedure newpag       [public];
var     i:integer;
begin
        while lsthspg>65 do lsthspg:=lsthspg mod 65;
        for i:=lsthspg to 65 do writeln(file8);
        lsthspg:=0;
end;
                                                {   BLANKLN   }
procedure blankln(consts nlines:integer)        [public];
var     i:integer;
begin
        for i:=1 to nlines do writeln(file8);
        lsthspg:=lsthspg+nlines;
end;
                                                {   PRTSCREEN   }
procedure prtscreen(consts frow,lrow:integer) [public];
begin
        assign(file8,'lpt1');
        rewrite(file8);
        blankln(6);
        prtscr(0,frow,lrow);
```

```
            newpag;
            close(file8);
end;
                                                        {   NULNAM    }
procedure nulnam(consts i:integer; vars nam:lstring) [public];
var k:integer;
begin    for k:=0 to i do nam[k]:=chr(0); end;
{------ check name and set to legal file name---  FNAMCHECK   }
function fnamcheck(vars nam:lstring):boolean      [PUBLIC];
var     i,k:integer;
begin
        if nam[1] in ['1'..'9'] then [fnamcheck:=false; return];
        k:=0;
        for i:=1 to ord(nam[0]) do
                [if k>0 then nam[i-k]:=nam[i];
                 if nam[i-k]=' ' then k:=k+1];
        nam[0]:=chr(ord(nam[0])-k);
        if ord(nam[0])>8 then nam[0]:=chr(8);
        nam[ord(nam[0])+1]:=chr(0);
        fnamcheck:=true;
end;
{---- clear a .xxx from a name  ----               CLEARDOT   }
procedure cleardot(vars nam:lstring)     [public];
var     i,j:integer;
        dot:boolean;
begin
        i:=ord(nam[0]); dot:=false;
        for j:=1 to i do
                [if nam[j]='.' then
                        [dot:=true; nam[0]:=chr(j-1)];
                 if dot then [nam[j]:=chr(0); break]];
end;
{---------compare lstrings. returns 1 l<r, 2 l=r, 3 l>r----}
                                             {   COMPARE    }
function compare(vars left,right:lstring):integer   [public];
var lc,lr,kl,kr,i,k:integer;
begin
        lc:=ord(left[0]);
        lr:=ord(right[0]);
        i:=lc; if i>lr then i:=lr;
        for k:=1 to i do begin
                kl:=ord(left[k]);
                if kl in [97..122] then kl:= kl-32;
                kr:=ord(right[k]);
                if kr in [97..122] then kr:= kr-32;
                if kl=kr then cycle;
                if kl>kr then [compare:=4; return];
                if kl<kr then [compare:=0; return];
                end;
        if lc>lr then [compare:=3; return];
        if lc<lr then [compare:=1; return];
        compare:=2;
end;
{--- Set default drive---                         DFDSET    }
procedure dfdset(vars drv:lstring) [public];
var     drno:integer;
begin
        if drv[0]>chr(0) then
                [drno:=ord(drv[1])-65;
```

```
                    if drno>20 then drno:=drno -32;
                    if drno>=0 then setdfd(drno)];
end;
{------ Read or Establish the Basic directory ---    REDDIR   }
function reddir(vars drv,pth:lstring;
                consts setdir:boolean):boolean [public];
var     eop:integer;
begin
        DFDSET(drv);
        if pth=null then [reddir:=TRUE; eop:=setsd(pth); return]
        ELSE eop:=setsd(pth);    {will test if directory exists}
        if eop<>0 then
                [IF SETDIR THEN
                [eop:=creatsd(pth);
                        if eop<>0 then [reddir:=false; return]
                                ELSE [REDDIR:=TRUE;eop:=setsd(pth);
                                                return]]
                        ELSE [REDDIR:=FALSE;RETURN]];
        reddir:=true;   {already exists}
end;
{---- Accept directory edit ---                        DIREDT   }
function diredt(vars drv,labl,xtm:lstring):integer  [public];
var     las:integer;
        i,j,k,eop:integer;
        pth:lstring(42);
        itm:lstring(20);
        xnam:lstring(14);
        nam:lstring(1);
        row,col,dent,atrb:integer;
        cont:boolean;
label   10,11;
procedure drwcol;          {row & column for directory  DRWCOL }
begin
        row:= (dent-1) mod 20 +5;
        col:= ((dent-1) div 20)*26 +1;
end;
{---- Display directory data ----                       DIRDATDIS  }
procedure dirdatdis;
begin
        if not cont then k:=getsd(pth);
        eop:=cleared +dirtitl(labl,drv,pth);
        eop:=backgrd +labels + displayd;
        eop:=cleared + dirdatl(itm,eop);
        if cont then [k:=nexent(itm,atrb);dent:=0]
        else begin
        nulnam(14,xnam);
        xnam:='????????.???';
        nam:=null;
        nulnam(1,nam);
        Dent:=0; atrb:=16;
        cont:=false;k:=fndent(xnam,itm,atrb);
        end; {else begin}
        dent:=0; atrb:=16;cont:=false;
        while k = 0 do
```

```
            [if itm='.' then [k:=nexent(itm,atrb); cycle];
            if itm='..' then [k:=nexent(itm,atrb); cycle];
                    dent:=dent+1; drwcol;
                    eop:=setorigin(nam,row,col);
                    eop:=displayd;
                    if dent >= 59 then [dent:=dent+1;
                            drwcol;cont:=true;
                            eop:=cleared +morel;
                            nam:=null; eop:=setorigin(nam,row,col);
                            k:=2; eop:=setpage(nam,k);
                            eop:=labels; return];
                    k:=nexent(itm,atrb)];

end;
begin
        cont:=false;
        dirdatdis;
11:     nam:=null;
        nulnam(1,nam);
        eop:=cleared+dirdatl(itm,eop);
        las:=dent; dent:=1;
10:     drwcol; eop:=setorigin(nam,row,col);
        K:=1; EOP:=SETERROR(NAM,K);
        eop:=keyin;
        J:=15; I:=SETCOLOR(NAM,K,J);
        case eop of
        1: goto 10;
        2:      [diredt:=eop; return];
        3:      [dent:=dent+1; if dent> las then dent:=1;
                goto 10];
        4:      [dent:=dent-1; if dent <1 then dent:= las;
                goto 10];
        11:     [diredt:=eop; las:=cleared +dirredl(xtm);
                nam:=null; las:=setorigin(nam,row,col);
                nulnam(20,itm);las:=readd; return];
        12:     [if cont then dirdatdis; goto 11];
        13:     [cont:=false; dirdatdis; goto 11];
        19:     [diredt:=eop; las:=cleared +dirredl(ITM);
                nam:=null; las:=setorigin(nam,row,col);
                nulnam(20,itm);las:=readd; return];
        40:     [PRTSCREEN(1,25);  GOTO 10];
        end;
end;
{--- SYNDETIC'S Logo ---                          SYNLOGDIS }
procedure synlogdis [public];
var     i:integer;
begin
        i:=cleared+syncorpl;
        i:=backgrd+labels+displayd;
end;
{******************************************}
{ display one label}
procedure dislabfld(consts i:integer);
var dop:integer;
```

```
begin
        dop:=cleared+sgc5l;
        if labelfil[i].lenl<1 then return;
        dop:=dislabel(labelfil[i].titl^,labelfil[i].lenl,
                    roworg,colorg,
                    labelfil[i].rowl,labelfil[i].coll);
end;

{-- erase a screen field---} procedure eradatfld;
var     k,j:integer;
        begin
        if lenh<1 then return;
        k:=cleared+sgc5l;
        k:=lenh*2;
        disreg[0]:=chr(k);
                for j:=1 to k do
                [if (j mod 2)=1 then disreg[j]:=chr(32)
                        else disreg[j]:=chr(bakcol)];
        j:=dislabel(disreg,lenh,roworg,colorg,
                    rowh,colh);
        end;
{ Processing procedures }
{-----------------}
{ Label Edit      }
{-----------------                               LABEDIT    }

{--- save label field in label table---} procedure savelabel;
var     lop:integer;
begin   {store label data}
        lop:=cleared+sgc5l;
                if newentry then begin
                        if len<1 then [return];
                        nlabs:=nlabs+1; labpnt:=nlabs;
                        labelfil[labpnt].titl := allmqq(sizeof(labelfil[labpnt].titl^));
                        labelfil[labpnt].seql:=seqm;
                    end;   {if-begin}
                labelfil[labpnt].rowl:=row;
                labelfil[labpnt].coll:=col;
                labelfil[labpnt].lenl:=len;
                lop:=getlabel(labelfil[labpnt].titl^,len,roworg,
                            colorg,row,col);
        labtith:=labelfil[labpnt].titl;
        lablenh:=labelfil[labpnt].lenl;
        newentry:=false;
end;
procedure labedit;
var     lop,rw,cm,lg:integer;
        nam:lstring(8);
        ncols,dummy,i:integer;
        junk : word;
```

```
label 20;
begin
  20:    lop:=cleared + sgc5l;                {link screen}
         nam:=null;
         nulnam(8,nam);
         lop:=setbakcol(nam,bakcol);    {set background color}
         dtype:=0;
         lop:=kezin(roworg,colorg,rowsz,colsz,dtype,
                    row,col,len,curpos,labcolor);
         case lop of
         0,2:   [return];
         1:     [savelabel; return];
         11:    begin                    {color}
                ncols:=1; dummy:=0;
                msg1:='   1..Label Color   ';
                msg2:=null;msg3:=null;msg4:=null;
                palette(ncols,labcolor,dummy,dummy,dummy);
                goto 20;
                end;
         13:    [if not (labtith=nill) then
                    if not (lablenh<1) then
                        [lop:=dislabel(labtith^,lablenh,roworg,colorg,
                                row,col);
                        len:=lablenh;
                        if curpos>len then curpos:=len];
                goto 20];
         24:    begin            {delete}
                if newentry then [return];
                junk := fremqq(labelfil[labpnt].titl);
                for i:= labpnt to nlabs do
                        begin
                        labelfil[i]:=labelfil[i+1];
                        end;   {for}
                nlabs:=nlabs-1;
                end;    {case 49}
         45:    [rw:=row; cm:=col; lg:=len;
                lop:=cleared +sgc26l(rw,cm,lg);
                lop:=backgrd+labels+markfld+displayd;
                lop:=keyin;
                if lop=2 then goto 20;
                savelabel;
                rowh:=row; colh:=col; lenh:=len;
                eradatfld;
                if rw<1 then rw:=1;
                if rw>rowsz then rw:=rowsz;
                if cm<1 then cm:=1;
                if (cm+lg)>colsz then cm:=colsz-lg;
                row:=rw; col:=cm;
                if len<1 then goto 20;
                with labelfil[labpnt] do
                        [rowl:=row;
                         coll:=col];
                dislabfld(labpnt);
                goto 20];
         46:    [goto 20];       {--copy--}
         47:    [savelabel;
```

```
                rowh:=row; colh:=col; lenh:=len;
                eradatfld;
                col:=(colsz-len) div 2;
                if col<1 then col:=1;
                if newentry then goto 20;
                labelfil[labpnt].coll:=col;
                dislabfld(labpnt);
                goto 20];
        end; {case}
end; {labedit}
{   Search label table for existing Label        FINDLAB    }
procedure findlab;
var     i:integer;
begin
        newentry:= true;
        if nlabs = 0 then [newentry:= true; return];
        for i:= 1 to nlabs do
        begin
        if labelfil[i].rowl= row then
                if col >= labelfil[i].coll then
                        if col <
                           (labelfil[i].coll+labelfil[i].lenl) then
                        begin
                                newentry:=false;
                                labpnt:=i;
                                labtith:=labelfil[i].titl;
                                lablenh:=labelfil[i].lenl;
                                return;
                        end; {begin then}
        end; {for}
end;    {findlab}
{ Label Locate                                   LABLOC     }
procedure labloc;
begin
        findlab;
        if newentry then [len:=0;curpos:=0]
        else begin
                row:= labelfil[labpnt].rowl;
                col:= labelfil[labpnt].coll;
                len:= labelfil[labpnt].lenl;
                curpos:=0;
        end;
end;
{  Re-Display labels                             DISPLABS   }
procedure displabs;
var i,j,k,dop:integer;
begin
        dop:=cleared+sgc5l;
        if nlabs > 0 then
        for i:= 1 to nlabs do
        begin
        if coloredt then
              [with labelfil[i] do
                 [j:=ord(titl^[0]);
                  for k:=1 to j do
                        if (k mod 2)=0 then
                                if ord(titl^[k])=oldcolor then
```

```
                                titl^[k]:=chr(newcolor)]];
        dop:=dislabel(labelfil[i].titl^,labelfil[i].lenl,
                roworg,colorg,
                labelfil[i].rowl,labelfil[i].coll);
        end;
end;

{ Display Help Message                                HELPMSG   } procedure helpmsg(consts funcno,color,msgno:integer);
var     msg:lstring(8);
        hop,j:integer;
begin
        msg[0]:=chr(8);
        msg[1]:=' ';
        msg[2]:=chr(color);
        msg[4]:=chr(color);
        msg[6]:=chr(color);
        msg[8]:=chr(color);
        msg[7]:=' ';
        case ((funcno-1)div 10) of
                0:[msg[3]:='f'];
                1:[msg[3]:='c'];
                2:[msg[3]:='a'];
                3:[msg[3]:='F'];
                end;
        case (funcno mod 10) of
                1..9:[msg[5]:=chr((funcno mod 10)+48)];
                0:[msg[5]:='1';msg[7]:='0'];
                end;
        hop:=cleared +sgc5l;
        j:=4;
        hop:=dislabel(msg,j,roworg,colorg,helpfil[msgno].rowh,
                helpfil[msgno].colh);
end;
{ display all help messages                           DISHELPS  }
procedure dishelps;
var i:integer;
begin
        for i:= 1 to nhelps do
                [if coloredt then
                        with helpfil[i] do
                                if colorh=oldcolor then
                                        colorh:=newcolor;
                helpmsg(i,helpfil[i].colorh,i)];
end;

{-- display the editd  (data) field---}
procedure disdatfld;
var     k,j:integer;
        begin
        k:=cleared+sgc5l;
        k:=editd.lend*2;
        disreg[0]:=chr(k);
                for j:=1 to k do
                [if (j mod 2)=1 then disreg[j]:=chr(176)
```

```
                else disreg[j]:=chr(editd.colord[1])];
        j:=dislabel(disreg,editd.lend,roworg,colorg,
                        editd.rowd,editd.cold);
        end;
{ Re-Display data fields                        DISDATS  }
procedure disdats(consts fcol:integer);
var i,j,k,dop:integer;
begin
        dop:=cleared+sgc5l;
        for i:= 1 to ndats do
        begin
        if coloredt then with datafil[i] do
                [for j:=1 to 4 do
                    if colord[j]=oldcolor then colord[j]:=newcolor];
        k:=datafil[i].lend*2;
        disreg[0]:=chr(k);
                for j:=1 to k do
                [if (j mod 2)=1 then disreg[j]:=chr(176)
                        else disreg[j]:=chr(datafil[i].colord[fcol])];
        dop:=dislabel(disreg,datafil[i].lend,roworg,colorg,
                        datafil[i].rowd,datafil[i].cold);
        end;
end;
{ Search table for data field entry             FINDDAT  }
procedure finddat;
var     i:integer;
begin
        newentry:= true;
        if ndats = 0 then [newentry:= true; return];

for i:= 1 to ndats do
        begin
        if datafil[i].rowd = row then
                if col >= datafil[i].cold then
                        if col <
                          (datafil[i].cold+datafil[i].lend) then
                        begin
                                newentry:=false;
                                datpnt:=i;
                                return;
                        end;  {begin then}
        end; {for}
end;    {findlab}
{ Data Locate                                   DATLOC   }
procedure datloc(vars eop:integer);
var     i:integer;
        bits:dimbits;
begin
        finddat;
        if newentry then begin
                case eop of
                13:     [editd:=strd];
                14:     [editd:=reald];
                15:     [editd:=intd];
                16:     [editd:=wordd];
                17:     [editd:=boold];
                otherwise [];
                end;
```

```
                        editd.rowd:=row;editd.cold:=col;curpos:=0;
                end
        else
                        begin
                           editd:=datafil[datpnt];           {?}
                           bitsbyte(bits,editd.optd[3]);
                           if bits[1] = 1 then eop:=14;     {real}
                           if bits[3] = 1 then eop:=15;     {integer}
                           if bits[4] = 1 then eop:=16;     {word}
                           if bits[5] = 1 then eop:=17;     {boolean}
                           if bits[6] = 1 then eop:=13;     {string}
                           curpos:=0;
                           end;
end;
{ Initialize data defaults                                   DATAINIT }
procedure datainit;
var i:integer;
    initd : datarec;
begin
{   Function Key Data Variables  } strd.rowd := 0;
        strd.cold := 0;
        strd.lend := 0;
        strd.seqd := 0;
        reald := strd;
        initd := strd;
        wordd := strd;
        boold := strd;
        with labelfil[1] do begin
            rowl := 0;
            coll := 0;
            lenl := 0;
            seql := 0;
            titl := nill;
        end;
        for i := 1 to 150 do begin
            labelfil[i] := labelfil[1];
            datafil[i] := strd;
        end;
        with helpfil[1] do begin
            fncno := 0;
    rowh := 0;
    colh := 0;
    colorh := 0;
end;
with funcfil[1] do begin
    faction := 0;
    fvalue := 0;
end;
for i := 1 to 40 do begin
    helpfil[i] := helpfil[1];
    funcfil[i] := funcfil[1];
end;
nfunset:=22;
funcset[1].key:='ret';          funcset[1].code:=28;
funcset[2].key:='ctrl/rtn';     funcset[2].code:=17;
funcset[3].key:='-cr';          funcset[3].code:=2;
```

```
        funcset[4].key:='cr';              funcset[4].code:=3;
        funcset[5].key:='curup';            funcset[5].code:=6;
        funcset[6].key:='curdown';          funcset[6].code:=7;
        funcset[7].key:='curleft';          funcset[7].code:=5;
        funcset[8].key:='curright';         funcset[8].code:=4;
        funcset[9].key:='curlftb';          funcset[9].code:=8;
        funcset[10].key:='currtb';          funcset[10].code:=9;
        funcset[11].key:='curlasf';         funcset[11].code:=12;
        funcset[12].key:='curfirf';         funcset[12].code:=11;
        funcset[13].key:='esc';                     funcset[13].code:=16;
        funcset[14].key:='clrblink';        funcset[14].code:=23;
        funcset[15].key:='blankf';          funcset[15].code:=24;
        funcset[16].key:='label';           funcset[16].code:=30;
        funcset[17].key:='data';            funcset[17].code:=32;
        funcset[18].key:='fldmrk';          funcset[18].code:=31;
        funcset[19].key:='help';            funcset[19].code:=33;
        funcset[20].key:='page0';           funcset[20].code:=39;
        funcset[21].key:='page1';           funcset[21].code:=40;
        funcset[22].key:='page2';           funcset[22].code:=41;
        nvars:=0;
        drv:='B';
        nhelps:=0;
        monsz:=80;
        dpage:=0;
        roworg:=1;
        colorg:=1;
        rowsz:=24;
        colsz:=80;
        disedc:=0;
        bakcol:=7;
        helpcol:=bakcol;
{ color library initial and defautls}
        libmsg:='   ABCDE   ';
        colib[1]:=7;            {black and white}
        nolib:=1;
        nopnt:=1;
        nlabs:=0;
        seqm:=0;
        labcolor:=7;
        ndats:=0;
        for i:=1 to 4 do [reald.colord[i]:=bakcol];
        for i:=1 to 5 do [reald.optd[i]:=0];
        for i:=1 to 3 do [reald.ofst[i]:=0];
        for i:=1 to 3 do [reald.idxd[i]:=0];
        strd:=reald;
        intd:=reald;
        wordd:=reald;
        boold:=reald;
        strd.optd[3]:=32;       {string type}
        reald.optd[3]:=1;       {real type}
        intd.optd[3]:=4;        {integer type}
        wordd.optd[3]:=8;       {word type}
        boold.optd[3]:=16;      {boolean type}
        boold.idxd[1]:= wrd('T')*256+wrd('F')+128;
end;
```

```
{ Pack Option Bytes                                  OPTPACK    }
procedure optpack( vars eop:integer) [public];
consts fr1:='@';
var rtndat:boolean;
        bits:dimbits;
begin
        bits[1]:=ord(not v1[1]);          {input allowed}
        bits[2]:=ord(not v1[2]);
        bits[3]:=ord(not v1[2]);          {input requrired}
        bits[4]:=ord(not v1[4]);          {Mark data fields}
        bits[5]:=ord(v1[3]);     {Display data}
        if editd.iname=null then bits[6]:=0 else bits[6]:=1;
                                 {Return Data}
        bits[7]:=0;
        bits[8]:=0;
        bytebits(bits,editd.optd[1]);
{ sign options, byte 2}
        bits[1]:=ord(not fr1[6]);         { leading/trailing}
        bits[2]:=0;bits[3]:=0;
        if fr1[7] then bits[3]:=1;        { () }
        if fr1[8] then [bits[2]:=1;bits[3]:=1];       { [] }
        if fr1[9] then [bits[2]:=0;bits[3]:=1];
        bits[4]:=0;
        bits[5]:=0;bits[6]:=0;   {left, right, center}
        if fr1[2] then bits[5]:=1;
        if fr1[3] then bits[6]:=1;
        bits[7]:=ord(not fr1[10]);        { comma's}
        bits[8]:=0;
        bytebits(bits,editd.optd[2]);
{leading trailing chr, byte 4}
        if lchr = null then editd.optd[4]:=0
        else
                begin
                editd.optd[4]:=ord(lchr[1]);
                if not fr1[4] then editd.optd[4]:=editd.optd[4]+128;
                end;
{ Miscellaneous, byte 5}
        bits[1]:=ord(v1[5]);
        bits[2]:=ord(v1[6]);
        bits[3]:=ord(fr1[5]);
        bits[4]:=ord(not fr1[5]);
        bits[5]:=ord(b3);
        bits[6]:=0;
        bits[7]:=0;
        bits[8]:=0;
        bytebits(bits,editd.optd[5]);
{ Decimal index, and name, used by boolean for t,f character storage}
        if eop = 17 then
                [editd.idxd[1]:=(wrd(not b2)*128 + wrd(bc2[1]))*256+
                                wrd(not b1)*128+wrd(bc1[1])]
                else [editd.decname:=idp;
                        editd.idxd[1]:=idp1];
                bitsbyte(bits,editd.optd[3]);
        if eop=13 then
                if v1[7] then bits[7]:=1 else bits[7]:=0;
        if (eop=14) or (eop=15) then
                if v1[7] then bits[2]:=1 else bits[2]:=0; {doub prec}
```

```
              if v1[8] then bits[8]:=1 else bits[8]:=0;
              bytebits(bits,editd.optd[3]);
       if eop=14 then [if fr1[5] then editd.ofst[1]:=decplac];
end;  {packopt}
{conver packed options 1-5 to true false values       OPTUNPACK   }
procedure optunpack(vars eop:integer) [public];
var bits:dimbits;
       vx:word;
       rop:integer;
begin
       bitsbyte(bits,editd.optd[1]);
              if bits[1]=0 then v1[1]:=true else v1[1]:=false;
              if bits[3]=0 then v1[2]:=true else v1[2]:=false;
              if bits[5]=1 then v1[3]:=true else v1[3]:=false;
              if bits[4]=0 then v1[4]:=true else v1[4]:=false;
       bitsbyte(bits,editd.optd[5]);
              if bits[1]=1 then v1[5]:=true else v1[5]:=false;
              if bits[2]=1 then v1[6]:=true else v1[6]:=false;
              if bits[3]=1 then fr1[5]:=true else fr1[5]:=false;
              if bits[5]=1 then  b3:=true else  b3:=false;
       bitsbyte(bits,editd.optd[2]);
              if bits[1]=0 then fr1[6]:=true else fr1[6]:=false;
       rop:=bits[2]+2*bits[3];
       if rop=0 then [fr1[7]:=false;fr1[8]:=false;fr1[9]:=false];
       if rop=1 then [fr1[7]:=true ;fr1[8]:=false;fr1[9]:=false];
       if rop=2 then [fr1[7]:=false;fr1[8]:=true ;fr1[9]:=false];
       if rop=3 then [fr1[7]:=false;fr1[8]:=false;fr1[9]:=true ];
       rop:=bits[5]+2*bits[6];
       if rop=0 then [fr1[1]:=true ;fr1[2]:=false;fr1[3]:=false];
       if rop=1 then [fr1[1]:=false;fr1[2]:=true ;fr1[3]:=false];
       if rop=2 then [fr1[1]:=false;fr1[2]:=false;fr1[3]:=true ];
              if bits[7]=0 then fr1[10]:=true else fr1[10]:=false;
       rop:=editd.optd[4] div 128;
       lchr[1]:= chr(editd.optd[4] mod 128);
       if ord(lchr[1])>0 then lchr[0]:=chr(1) else lchr:=null;
              if rop=0 then fr1[4]:=true else fr1[4]:= false;
              bitsbyte(bits,editd.optd[3]);
       if eop=13 then               {string}
              if bits[7] = 1 then v1[7]:= true else v1[7]:= false;
       if (eop=14) or (eop=15) then           {doubple prec}
              if bits[2] = 1 then v1[7]:= true else v1[7]:= false;
       if bits[8] = 1 then v1[8]:= true else v1[8]:= false;
       if eop=17 then begin
              vx:= editd.idxd[1] div 256;
              if (vx div 128) = 0 then b2:= true else b2:=false;
              bc2[1]:= chr(vx mod 128);
              bc2[0]:= chr(1);
              vx:= editd.idxd[1] mod 256;
              if (vx div 128)= 0 then b1:= true else b1:=false;
              bc1[1]:= chr(vx mod 128);
              bc1[0]:= chr(1);
              end;
       if eop=14 then [if fr1[5] then decplac:=editd.ofst[1]];
              if not(eop=17) then [idp:=editd.decname;
                                   idp1:=editd.idxd[3]]
                           else [idp:=null;idp1:=0];
                     ifv:=editd.iname;idv:=editd.ddname;
   end;
```

```
{---color palette call procedure---} procedure colorcat(consts eop:integer);
var ncols:integer;
            begin                       {color}
            IF ((eop>12) and (eop<18)) then msg4:='a';
            case eop of
            13:    begin ncols:=3;                   {string}
                   msg1:='1 .. String Display  ';
                   msg2:='2 .. Keyboard Input  ';
                   msg3:='3 .. Error           ';
                   msg4:=null;
                   palette(ncols,editd.colord[1],editd.colord[3],
                        editd.colord[4],editd.colord[2]);
                   end;
            14:    begin ncols:=4;                   {real}
                   msg1:='1 (+) Real Display  ';
                   msg2:='2 (-) Real Display  ';
                   msg3:='3 .. Keyboard Input  ';
                   msg4:='4 .. Error           ';
                   palette(ncols,editd.colord[1],editd.colord[2],
                        editd.colord[3],editd.colord[4]);
                   end;
            15:    begin ncols:=4;                   {Integer}
                   msg1:='1 (+) Integer        ';
                   msg2:='2 (-) Integersplay  ';
                   msg3:='3 .. Keyboard Input  ';
                   msg4:='4 .. Error           ';
                   palette(ncols,editd.colord[1],editd.colord[2],
                        editd.colord[3],editd.colord[4]);
                   end;
            16:    begin ncols:=3;                   {word}
                   msg1:='1 ... Word Display  ';
                   msg4:=null;
                   msg2:='2 .. Keyboard Input  ';
                   msg3:='3 .. Error           ';
                   palette(ncols,editd.colord[1],editd.colord[3],
                        editd.colord[4],editd.colord[2]);
                   end;
            17:    begin ncols:=4;                   {boolean}
                   msg1:='1 .. True Color      ';
                   msg2:='2 .. False Color     ';
                   msg3:='3 .. Keyboard Input  ';
                   msg4:='4 .. Error           ';
                   palette(ncols,editd.colord[1],editd.colord[2],
                        editd.colord[3],editd.colord[4]);
                   end;
            end;  {color case}
            end;  {begin}
{ Real option input                              REALOPT   }
procedure realopt(vars eop:integer);
var    bits:dimbits;
       rop,xxx:integer;
       nam:lstring(8);
       displl:boolean;
```

```
label 100,101,102;
begin
        with editd do
                [rowh:=rowd;
                colh:=cold;
                lenh:=lend;
                colorh:=colord[1]];
        optunpack(eop);         {set booleans true,false}
102:    rop:=cleared;
        case eop of
        13:     [nam:=null;
                nulnam(8,nam);
                with editd do rop:=sgc17l(v1[1],rowd,cold,lend
                    ,ifv,idxd[3],idv,idxd[2],fr1[1])];
        14:     [nam:=null;
                with editd do rop:=sgc12l(fr1[1],v1[1],rowd,cold,lend
                    ,ifv,idxd[3],idv,idxd[2],
                    idp,idp1,lchr,decplac)];
        15:     [nam:=null;
                with editd do rop:=sgc18l(v1[1],rowd,cold,lend
                    ,ifv,idxd[3],idv,idxd[2],fr1[1],lchr)];
        16:     [nam:=null;
                with editd do rop:=sgc19l(v1[1],rowd,cold,lend
                    ,ifv,idxd[3],idv,idxd[2],fr1[1],lchr)];
        17:     [nam:=null;
                with editd do
                rop:=sgc13l(v1[1],rowd,cold,lend,
                    ifv,idxd[3],idv,idxd[2],bc1,b1,bc2,b2,b3)]:
        end;
        rop:= backgrd +labels;
100:    rop:= markfld + displayd;
101:    rop:=keyin;
        xxx:=readd;
        case rop of
        0,2:    [return];
        1:      begin
                editd.iname:=ifv;editd.ddname:=idv;
                if v1[1] then[if editd.iname = null
                    then [editd.iname:= editd.ddname;ifv:=idv;
                            editd.idxd[3]:=editd.idxd[2]]];
                if v1[3] then[if editd.ddname = null
                    then [editd.ddname:= editd.iname;idv:=ifv;
                            editd.idxd[2]:=editd.idxd[3]]];
                optpack(eop);
                if(((editd.optd[1] and 1)=0) and (editd.iname=null))then
                        [xxx:=1;xxx:=seterror(nam,xxx);
                        xxx:=12;xxx:=seterror(nam,xxx);goto 101];
                if(not((editd.optd[1] and 16)=0)and(editd.ddname=null))
                        then [xxx:=3;xxx:=seterror(nam,xxx);
                        xxx:=14;xxx:=seterror(nam,xxx);goto 101];
                if eop =14 then begin
                        if((editd.decname = null) and
                                ((editd.optd[5] and 4) =0))then
                        [xxx:=22;xxx:=seterror(nam,xxx);
                        xxx:=16;xxx:=seterror(nam,xxx);goto 101];
                        if (not(editd.decname=null) and
```

```
                        not((editd.optd[5] and 4)=0))then
            [xxx:=22;xxx:=seterror(nam,xxx);
            xxx:=16;xxx:=seterror(nam,xxx);goto 101];
            end;
    if((editd.iname= null) and
                ((editd.optd[5] and 1)=1))then
            [xxx:=5;xxx:=seterror(nam,xxx);
            xxx:=12;xxx:=seterror(nam,xxx);goto 101];
    if((editd.ddname= null) and
                ((editd.optd[5] and 2)=2))then
            [xxx:=6;xxx:=seterror(nam,xxx);
            xxx:=14;xxx:=seterror(nam,xxx);goto 101];
    if (editd.optd[5] and 2)=2 then begin
            if not(editd.iname=editd.ddname) then
            [xxx:=6;xxx:=seterror(nam,xxx);
            xxx:=14;xxx:=seterror(nam,xxx);
            xxx:=12;xxx:=seterror(nam,xxx);goto 101];
            if not(editd.idxd[2]=editd.idxd[3]) then
            [xxx:=6;xxx:=seterror(nam,xxx);
            xxx:=13;xxx:=seterror(nam,xxx);
            xxx:=15;xxx:=seterror(nam,xxx);goto 101];
            end;
    eradatfld;
    disdatfld;
    return;
    end;
    11:     [v1[1]:= not v1[1]; if not v1[1] then v1[2]:= false];
    12:     [v1[2]:= not v1[2]; if not v1[1] then v1[2]:= false];
    13:     [v1[3]:= not v1[3]];
    14:     [v1[4]:= not v1[4]];
    15:     [v1[5]:=not v1[5]];
    16:     [v1[6]:= not v1[6];
            if v1[6] then v1[5]:=v1[6]];
    17:     [v1[7]:= not v1[7]];
    18:     [v1[8]:= not v1[8]];
    19:     [colorcat(eop); goto 102];
    41:     [fr1[1]:=true;fr1[2]:=false;fr1[3]:=false;
            b1:=b1 xor true];
    42:     [fr1[1]:=false;fr1[2]:=true ;fr1[3]:=false;
            b2:=b2 xor true];
    43:     [fr1[1]:=false;fr1[2]:=false;fr1[3]:=true ;
            b3:=b3 xor true];
    44:     [fr1[4]:= not fr1[4]];
    45:     [fr1[5]:=not fr1[5]];
    46:     [fr1[6]:=not fr1[6]];
    47:     [if fr1[7]=true then fr1[7]:=false
            else
                    [fr1[7]:=true ;fr1[8]:=false;fr1[9]:=false]];
    48:     [if fr1[8]=true then fr1[8]:=false
            else
                    [fr1[7]:=false;fr1[8]:=true ;fr1[9]:=false]];
    49:     [if fr1[9]=true then fr1[9]:=false
            else
                    [fr1[7]:=false;fr1[8]:=false;fr1[9]:=true]];
    50:     [fr1[10]:=fr1[10] xor true];
    end;  {op case}
    goto 100;
end;
```

{--- save a data field---}

```
procedure savedat(vars eop:integer);
begin
            if newentry then begin
                    if editd.lend<1 then [return];
                    ndats:=ndats+1;
                    datafil[ndats]:=editd;
                    end
            else [datafil[datpnt]:= editd];
            case eop of
            13:     [strd:=editd];
            14:     [reald:=editd];
            15:     [intd:=editd];
            16:     [wordd:=editd];
            17:     [boold:=editd];
            end;
        newentry:=false;
end;
{            Data Field Edit                   DATAEDIT   }
procedure dataedit(vars eop:integer);
        var     dop,rw,cm,lg:integer;
                nam:lstring(8);
                i:integer;
        label   30;
        begin
                curpos:=0;
        30:     case eop of
                13:     [dop:=cleared + sgc6l; nam:=null];  {string}
                14:     [dop:=cleared + sgc7l; nam:=null];  {real}
                15:     [dop:=cleared + sgc8l; nam:=null];  {integer}
                16:     [dop:=cleared + sgc9l; nam:=null];  {word}
                17:     [dop:=cleared + sgc10l; nam:=null]; {boolean}
                end; {case}
                dop:=setbakcol(nam,bakcol);
                dtype:=1;
                dop:= kezin(roworg,colorg,rowsz,colsz,dtype,
                        editd.rowd,editd.cold,editd.lend,
                        curpos,editd.colord[1]);
                case dop of
                0,2:    [return];
                1:      [savedat(eop); return];
                11:     [colorcat(eop); disdatfld;  goto 30];
                13:     [realopt(eop); goto 30];
                24:     begin           {delete}
                        if newentry then [return]
                        else begin
                                for i:= datpnt to ndats do
                                [datafil[i]:=datafil[i+1]];
                                ndats:=ndats-1;
                                end;
                        end; {case 39}
                45:     [with editd do
                                [rw:=rowd; cm:=cold; lg:=lend];
                        dop:=cleared +sgc26l(rw,cm,lg);
```

```
                dop:=backgrd+labels+markfld+displayd;
                dop:=keyin;
                if dop=2 then goto 30;
                with editd do
                        [rowh:=rowd; colh:=cold; lenh:=lend];
                eradatfld;
                if rw<1 then rw:=1;
                if rw>rowsz then rw:=rowsz;
                if cm<1 then cm:=1;
                if (cm+lg)>colsz then cm:=colsz-lg;
                if lg<1 then lg:=1;
                with editd do
                        [rowd:=rw;
                        cold:=cm;
                        lend:=lg];
                disdatfld;
                goto 30];
    46:     [goto 30];          {--copy--}
    47:     [with editd do
                        [rowh:=rowd; colh:=cold; lenh:=lend];
                eradatfld;
                with editd do
                [cold:=(colsz-lend) div 2;
                if cold<1 then cold:=1];
                disdatfld;
                goto 30];
            end;  {case dop}
end; {data edit}
{help edit                                         HELPEDIT    }
procedure helpedit;
var hop,i,ncols:integer;
        nam:lstring(8);
        hpos:integer;
label   900,901;
begin
        newentry:=false;
        nam:=null;
        for i:=1 to nhelps do
                [if row=helpfil[i].rowh then
                        if col>=helpfil[i].colh then
                                if col<(helpfil[i].colh +4) then
                                [hpos:=i;goto 900]];
                newentry:=true;
                nhelps:=nhelps+1;hpos:=nhelps;
                helpfil[hpos].rowh:=row;
                helpfil[hpos].colh:=col;
                helpfil[hpos].colorh:=helpcol;
                helpfil[hpos].fncno:=nhelps;
                helpfil[hpos].hname:=null;
    900:    hop:=cleared+sgc22l(helpfil[hpos].hname);
            hop:=labels+markfld +displayd;
    901:    hop:=keyin;
            case hop of
            0,2:    [if newentry then nhelps:=nhelps-1;
                    return];
            1,3,4:  [hop:= readd; helpmsg(hpos,helpfil[hpos].colorh,
                                        hpos);
```

```
                if not(helpfil[hpos].hname=null)then [return];
                ncols:=1;hop:=seterror(nam,ncols); goto 901];
    11:     [hop:=readd;
                ncols:=1;msg1:='1  Help Mark Color   ';
                msg2:=null;msg3:=null;msg4:=null;
                palette(ncols,helpcol,hop,hop,hop);
                helpfil[hpos].colorh:=helpcol;
                helpmsg(hpos,helpcol,hpos);
                goto 900];
    12:     [for i:= hpos to (nhelps -1) do
                    [helpfil[i]:=helpfil[i+1]];
                nhelps:=nhelps-1;
                for i:=1 to nhelps do [helpfil[i].fncno:=i];
                return];
        end;{case}
  end;
{--- color edit palette call---} procedure coledx;
var     dum,ncols:integer;
begin
        if oldcolor=0 then oldcolor:=1;
        if newcolor=0 then newcolor:=1;
        ncols:=2;
        msg1:='1 .. Old Color       ';
        msg2:='2 .. New Color       ';
        msg3:=null;
        msg4:=null;
        palette(ncols,oldcolor,newcolor,dum,dum);
end;
{--color edit changes for function messages--} procedure funccolchg(vars msg:lstring);
var i,j:integer;
begin
        i:=ord(msg[0]);
        for j:=1 to i do
            if (j mod 2)=0 then
                if (ord(msg[j]))=oldcolor then
                    msg[j]:=chr(newcolor);
end;
{           color edit                }
procedure colxxdit;
var
        nam,dum:lstring(1);
        i,eop:integer;
        ren:boolean;
label 1010;
begin
        ren:=false;
1010:   nam:=null;
        eop:=cleared+sgc27l(dum);
        if not ren then
        [eop:=setbakcol(nam,bakcol);    {background}
        eop:=setorigin(nam,roworg,colorg);
        eop:=setedii(nam,rowsz,colsz)];
        if ren then eop:=kexren
```

```
        else eop:=kexin;          {establish origin}
    ren:=true;
    case eop of
        2:      [coloredt:=false;  return];
        11:     coledx;
        12:     [coloredt:=true;
                if newcolor<1 then coledx;
                if oldcolor<1 then coledx;
                displabs];
        13:     [coloredt:=true;
                if newcolor<1 then coledx;
                if oldcolor<1 then coledx;
                disdats(1)];
        14:     [coloredt:=true;
                if newcolor<1 then coledx;
                if oldcolor<1 then coledx;
                dishelps];
        15:     [coloredt:=true;
                if newcolor<1 then coledx;
                if oldcolor<1 then coledx;
                for i:=1 to 4 do
                        [if not (funcmsg[i]=null) then
                                funccolchg(funcmsg[i])]];
        otherwise [];
        end; {case}
        goto 1010;
end;
{        Display Edit                                    DISPEDIT   }
procedure dispedit;
var
        nam:lstring(8);
        dum:lstring(1);
        xxx,i,rowx,colx,eop:integer;
        ren:boolean;
label 10,11;
begin
        ren:=false; colonedt:=false; oldcolor:=0; newcolor:=0;
   10:  nam:=null;
        eop:=cleared+sgc21l(dum);
        if not ren then
        [eop:=setbakcol(nam,bakcol);    {background}
        eop:=setorigin(nam,roworg,colorg);
        eop:=setedii(nam,rowsz,colsz)];
        if ren then eop:=kexren
                else eop:=kexin;        {establish origin}
        ren:=true;
   11:  case eop of
        0,1,2: [goto 10];
        11:     [xxx:=cursorpos(nam,row,col);
                datloc(eop); if newentry then [labloc;
                        if newentry then goto 10
                                        else eop:=12;goto 11];
                if newentry then goto 10 else goto 11];
        12:     begin
                        eop:=cursorpos(nam,row,col);
                        labloc;         {locate label position}
                        labedit;        {edit label}
                        goto 10;
                end;
```

```
13..17:        begin            {data field edits}
           xxx:=cursorpos(nam,row,col);
           datloc(eop);
           realopt(eop);
           dataedit(eop);
           goto 10;
           end;
18:        begin            {Help edit}
           xxx:=cursorpos(nam,row,col);
           helpedit;
           goto 10;
           end;
19:        [seqm:=seqm+1;eop:=cursorpos(nam,row,col);
           datloc(eop);if not newentry then
                   [datafil[datpnt].seqd:=seqm;goto 10];
           labloc;if not newentry then
                   [labelfil[labpnt].seql:=seqm;goto 10];
           goto 10];
21:        [displabs;disdats(1);ren:=false;goto 10];   {display}
22:        [displabs;ren:=false;goto 10];              {display labs}
23:        [disdats(1);ren:=false;goto 10];            {+data}
24:        [disdats(2);ren:=false;goto 10];            {-data}
25:        [disdats(3);ren:=false;goto 10];            {input}
26:        [disdats(4);ren:=false;goto 10];            {error}
27:        [dishelps;ren:=false;goto 10];              {Help Mess.}
30:        [eop:=backgrd;ren:=false;goto 10];          {clear}
31:        [macroinfo;ren:=false;goto 10];             {macro information}
32:        [xxx:=cursorpos(nam,row,col);
                   roworg:=row;colorg:=col;
                   if (rowsz+roworg)>25 then rowsz:=25-roworg;
                   if (colsz+colorg-1)>monsz then
                                   colsz:=monsz-colorg+1;
                   ren:=false; goto 10];
33:        [xxx:=cursorpos(nam,row,col);
           rowsz:=row;
           colsz:=col;goto 10];
34:        [clearfil; goto 10];
35:        [xxx:=cursorpos(nam,rowx,colx);
           for i:=1 to nlabs do with labelfil[i] do
                   [rowl:=rowl-rowx; if rowl<1 then rowl:=1;
                   coll:=coll-colx; if coll<1 then coll:=1];
           for i:=1 to ndats do with datafil[i] do
                   [rowd:=rowd-rowx; if rowd<1 then rowd:=1;
                   cold:=cold-colx; if cold<1 then cold:=1];
           for i:=1 to nhelps do with helpfil[i] do
                   [rowh:=rowh-rowx; if rowh<1 then rowh:=1;
                   colh:=colh-colx; if colh<1 then colh:=1];
           goto 10];
36:        [colxxdit; coloredt:=false;  goto 10];
41:        [funkedit; ren:=false; goto 10];
42:        [readfil; displabs; disdats(1); ren:=false; goto 10];
43:        [writeln('stack before: ',stkseg:1,':',stkptr:1); readln;
           writefil;
           writeln('stack after:  ',stkseg:1,':',stkptr:1); readln;}
           ren:=false; goto 10];
```

```
            44:     [sgcrepo;goto 10];              {print}
            45:     [return];
            end; {case}
end;
{ ----- Main Entry Point  -----}
var mop:integer;
    dumi:integer;
    pthh:lstring(64);
    drvh:lstring(1);
    dum:boolean;
begin
        nulnam(64,pthh);
        mop:=getsd(pth);
        if not (pth = null) then
                [pthh:='\';concat(pthh,pth)];
        drvh[0]:=chr(1);
        mop:=getdfd;
        drvh[1]:=chr(mop+65);
        datainit;
        dispedit;
        dum:=reddir(drvh,pthh,true);
        mop:=cleared+syncorpl;
        mop:=backgrd;
        mop:=labels+displayd;
  end.
{ SCREEN GENERATION COMPILER (SGC) - Source Code documentation       }
{ Copyright(c) 1987 Syndetic Corporation. All Rights Reserved        }
{----- SGC program secondary  module-----}
{----- Screen Read, define, & interface  }
{       handles drives, paths, etc.      }
module sgcred [];
(*
{$debug+}
{$line+}
*)
function fremqq(ptr : adsmem) : word; extern;
function allmqq(siz : word) : adsmem; extern;
const nill = adsmem (0,0);
var     [extern]
        drno,atrb,dent:integer;
        cont:boolean;
        drv,dumstr:lstring(1);
        svpath,pth:lstring(64);
        xnam,itm:lstring(21);
        tic,valid,xend:boolean;
        fpos,pos,fir:integer;
        fdats,flabs:integer;
        segnam,oname,kname:lstring(21);
        firf,lasf,kmsg:integer;

var     [extern]        file1,file2:text;

{ Type Declarations } type    dimbits=array [1..8] of integer;
```

{ Global Variable Declarations } var [extern]

{ Display Value Parameters and Variables }

```
        masop:integer;     {master (outer) function number}
        monsz:integer;          {Monitor size, 40, or 80 }
        dpage:integer;     {screen page for display}
        roworg:integer;         {Display row origin}
        colorg:integer;         {Display column origin}
        rowsz:integer;     {Row size of Display}
        colsz:integer;     {Column Size of Display}
        disedc:integer;         {Edit control of Display}
        bakcol:integer;         {Background Color}
        pop:integer;       {Return status of SDSET}
```

{ Working Variables }

```
        zname:lstring(20);
        dname:lstring(8);
        field:integer;
        error:boolean;
        funct,cntlt,altt,shftt:boolean;
        db,dw,dd:lstring(13);
        dwo:lstring(20);
```

{ Color Library Variables }

```
        nolib:integer;          {library size}
        nopnt:integer;
        colib:array [1..20] of integer;          {library}
```

{color working variables }

```
        msg1:lstring(20);
        msg2:lstring(20);
        msg3:lstring(20);
        msg4:lstring(20);
        libmsg:lstring(20);
```

{ Label definition file}

```
type    link = ads of titldat;
        titldat = lstring (160);

type    labelrec=record
                rowl:integer;
                coll:integer;
                lenl:integer;
                seql:integer;
                titl:link;
                xnam:lstring(5);
        end;    {labelrec}
```

```
var [extern]
        labelfil:array [1..150] of labelrec;
        nlabs:integer;
        labpnt:integer;
        labcolor:integer;
        labptr:link;
        newentry:boolean;
        row,col,len,curpos,dtype:integer;
        seqm:integer;
        out:lstring(80);
        lbname:lstring(5);

{ Data File Definition } type datarec=record
        rowd,cold,lend,seqd:integer;
        colord:array [1..4] of integer;
        optd:array [1..5] of integer;
        ofst:array [1..3] of integer;
        idxd:array [1..3] of word;
        iname,ddname,decname:lstring(20);
end;
var [extern]
        datafil:array [1..150] of datarec;
        ndats,datpnt:integer;

{ Function Key Data Variables } type    funcrec = record
                faction:integer;
                fvalue:integer;
                end;

funsetr = record
                key:lstring(8);
                code:integer;
                end;

var [extern]
        funcfil:array [1..40] of funcrec;
        funcset:array [1..22] of funsetr;
        funcmsg:array [1..4] of titldat;
        inot:lstring(8);
        nfunset:integer;

{ Interface Variable File } type    variflrec = record
                vname:lstring(20);
                vtype:integer;
                vxna:lstring(5);
                end;

var     [extern]
        varifl:array [1..100] of variflrec;
        nvars:integer;
```

```
{ Help Table File } type    helprec = record
                fncno:integer;
                rowh:integer;
                colh:integer;
                colorh:integer;
                hname:lstring(8);
                end;

var     [extern]
        helpfil:array [1..40] of helprec;
        nhelps:integer;
        eop:integer;
        editd:datarec;

{ Compiler variable initial defaults} var [extern]
        strd:datarec;    {string data field}
        reald:datarec;   {real data field}
        intd:datarec;    {integer data field}
        wordd:datarec;   {word data field}
        boold:datarec;   {boolean data field} function FIRDIS(vars name:lstring):integer; extern; {set first display}
function LASDIS(vars name:lstring):integer; extern; {set last display}
function BACKGRD:integer; extern;              {clear background}
function LABELS:integer; extern;               {Draw labels}
function MARKFLD:integer; extern;              {mark data fields}
function DISPLAYD:integer; extern;             {Display data values}
function READD:integer; extern;
function KEYIN:integer; extern;                {Input with keyboard}
function RENKEYIN:integer; extern;             {Re-enter keyboard inp}
function CLEARED:integer; extern;              {Clear editor of links}
function GETCURFLD(vars NAME:lstring;          {Get cursor field}
            vars FIELD:integer):integer; extern;
function SETCURFLD(vars NAME:lstring;          {Set cursor field}
            vars FIELD:integer):integer; extern;
function CURSORPOS(vars NAME:lstring;       {Get cursor name,row,col}
            vars ROW:integer;
            vars COLUMN:integer):integer; extern;
function SETCOLOR(vars NAME:lstring;           {Set field color}
            vars FIELD:integer;
            vars COLOR:integer):integer; extern;
function SETERROR(vars NAME:lstring;       {Set field to error color}
            vars FIELD:integer):integer; extern;
function SETORIGIN(vars NAME:lstring;          {Set display origin}
            vars ROW:integer;
            vars COLUMN:integer):integer; extern;
function SETBAKCOL(vars NAME:lstring;          {Set background color}
            vars COLOR:integer):integer; extern;
function SETLABFLD(vars NAME:lstring;          {Set label limits}
            vars FIRST:integer;
            vars LAST:integer):integer; extern;
```

```
function SETDATFLD(vars NAME:lstring;            {Set data field limits}
                vars FIRST:integer;
                vars LAST:integer):integer; extern;
function SETPAGE( vars NAME:lstring;             {Set display page}
                vars PAGE:integer):integer;  extern;
function SCROLROW(vars NAME:lstring;             {scroll up or down}
                vars ROWS:integer):integer; extern;
function SCROLCOL(vars NAME:lstring;             {scroll right or left}
                vars COLUMNS:integer):integer; extern;
procedure palette(vars numcols:integer;
            vars col1,col2,col3,col4:integer); extern;
procedure macroinfo; extern;
procedure funkedit; extern;
procedure bitsbyte(vars bits:dimbits; vars bytes:integer); extern;
procedure bytebits(vars bits:dimbits;vars bytes:integer); extern;
procedure funcdisp; extern;
procedure sgcrepo;  extern;
procedure writefil; extern;
procedure clibstor(consts color:integer);       extern;
FUNCTION DIREDT(vars drv,labl,xtm:lstring):INTEGER;  EXTERN;

{$include:'\sgcscr\sgcscrlb.pas'}
(* * * *   I N C L U D E   R E P L A C E S   T H E S E   E X T E R N S  * * * *

{ save screen }

FUNCTION SGC2Ol(vars nam:LSTRING;
         vars v1:boolean;
         vars drv:lstring;
         vars svpath:lstring):INTEGER;   EXTERN;
FUNCTION fildirtl(vars drv:LSTRING;
         vars pth:LSTRING):INTEGER;  EXTERN;
FUNCTION DIRREDl(vars itm:LSTRING):INTEGER;  EXTERN;
FUNCTION DIRDATl(vars itm:LSTRING;
         vars dum:INTEGER):INTEGER;  EXTERN;
FUNCTION MOREl:INTEGER;  EXTERN;
* * * *   E N D   O F   C O M M E N T E D   P A R T   * * * *)

FUNCTION FNDENT(VARS path:LSTRING;              {Find a file}
            VARS NAM:LSTRING;
            VARS ATRB:INTEGER):INTEGER;
            EXTERN;
       {returns: 0--found
                 2--file not found
                18--no more files}

FUNCTION NEXENT(VARS nam:LSTRING;               {Next File}
            VARS ATRB:INTEGER):INTEGER;
            EXTERN;
       {returns: 0--found
                18--no more files}

FUNCTION CREATSD(VARS nam:LSTRING):INTEGER;     {create sub-drectory}
            EXTERN;
       {returns: 0--found
                 3--path not found
                 5--access denied}
```

```
FUNCTION SETSD(VARS nam:LSTRING):INTEGER;        {Set default Sub-dir}
             EXTERN;
        {returns: 0--set
                  3--path not found}

FUNCTION GETSD(VARS nam:LSTRING):INTEGER;        {Returns deflt Sub-dir}
             EXTERN;
        {returns: 0--set
                  15--invalid drive}

PROCEDURE SETDFD(consts drno:INTEGER);           {Set Default Drive}
             EXTERN;
        {drno = 0 for A, 1 for b, etc.}

FUNCTION GETDFD:INTEGER;                         {Returns Default Drive}
             EXTERN;
        {GETDFD = 0 for A, 1 for b, etc.}

FUNCTION RENAMF(VARS oldnam:lstring;             {Rename file}
                VARS newnam:LSTRING):INTEGER;
             EXTERN;
        {oldnam--original name
         newnam--name after change returns 0--done
                 3--path not found
                 17--Not same device.

Note:  Renaming can move file from one sub-drectory to
               another}

FUNCTION DELDIR(VARS nam:LSTRING):INTEGER;       {Delete sub-directory}
             EXTERN;
        {Returns 0--done
                 3--path not found
                 5--access denied}

FUNCTION DELFIL(VARS nam:LSTRING):INTEGER;       {Delete file}
             EXTERN;
        {Returns 0--done
                 2--file not found
                 5--access denied}

FUNCTION reddir(vars drv:lstring;
                vars svpath:lstring;
                consts cont:boolean):boolean;    extern;
procedure nulnam(consts k:integer; vars nam:lstring); extern;

{----See if file exists----}
function findfil(vars fname:lstring):boolean [public];
begin
        atrb:=0; if fndent(fname,fname,atrb)=0 then findfil:=true
                        else findfil:=false;
end;

{ extract next value from out string }
function nextval:integer;
```

```
{requires tic,end,valid,pos }
var     val:integer;
label   700;
begin
           val:=0;
           error:=false;xend:=false;valid:=false;
       700:   if pos>ord(out[0]) then
                  [xend:=true;nextval:=val;return];
           if out[pos]=',' then [nextval:=val;pos:=pos+1;return];
           if ord(out[pos])=39 then [tic:=true;pos:=pos+1;goto 700];
           if tic then [nextval:=ord(out[pos]);valid:=true;
                       pos:=pos+1;return];
           if out[pos]=' ' then [pos:=pos+1;goto 700];
           if (out[pos]<'0')or(out[pos]>'9') then
                  [pos:=pos+1;error:=true; return];
           valid:=true;
           val:=val*10 + ord(out[pos])-48;
           pos:=pos+1;goto 700;
end; {nextval}

{ get value, read new line if necessary } function getval:integer;
label   702;
begin
           if xend then [readln(file1,out);tic:=false;pos:=fpos];
       702:   getval:=nextval;
           if valid then [return];
           if xend then [readln(file1,out);tic:=false;pos:=fpos];
           goto 702;
end;

{ Get name } procedure getname;
var     i,j:integer;

begin
           if xend then [readln(file1,out)];
           j:=0;zname:=null;
           valid:=false;error:=false;xend:=false;
           if fir>ord(out[0]) then [xend:=true;return];
           for i:=fir to ord(out[0]) do
                  begin
                  if out[i]=' ' then [if valid then [return]]
                  else begin
                  if out[i] =':' then [return];
                  if j>7 then [zname[0]:=chr(j);return];
                  valid:=true;
                  j:=j+1;zname[j]:=out[i];
                  if ord(zname[j])>96 then
                              zname[j]:=chr(ord(zname[j])-32);
                  zname[0]:=chr(j);
                  end; {else}
                  end; {for begin}
end;

{ Read screen basic data }
```

```
procedure redbasic;
var     i,j:integer;
begin
        zname:=null;
        while not(zname='SEGMENT') do
                [readln(file1,out);
                fir:=9;getname];
        fir:=1; getname; segnam:=zname;
        zname:=null;fpos:=13;
        while not(zname=oname) do
                [readln(file1,out);
                fir:=1;getname];
        pos:=fpos;
        disedc:=getval;
        rowsz:=getval;
        colsz:=getval;
        roworg:=(1+getval);
        colorg:=(1+getval);
        fdats:=ndats+1;flabs:=nlabs+1;
        nlabs:=nlabs+getval;
        ndats:=ndats+getval;
        for i:=1 to 10 do [j:= getval];                 {skip}
        monsz:=getval;
        j:=getval;j:=getval;
        bakcol:=getval;
        readln(file1);xend:=true;       {skip line}
        dpage:= getval;
end;
{read interface variable table} procedure redifv;
var xname:lstring(5);
        i,j,k:integer;

begin
        xname:='IFTAB';
        fir:=1;getname;
        while not(zname=xname) do [readln(file1,out);
                                fir:=1;getname;
                                if zname = 'LTAB' then [return]];
        if zname = 'LTAB' then [return];
        pos:=13;fpos:=13;tic:=false;
        nvars:=getval;
        if nvars<1 then [xend:=true;return];
        fpos:=24;xend:=true;
        for i:=1 to nvars do begin
                xend:=true;
                varifl[i].vtype:=getval;
                k:=getval;
                varifl[i].vname[0]:=chr(getval);
                readln(file1,out);
                end;
        xend:=true;fpos:=13;
        for i:=1 to nvars do begin
                for j:= 1 to ord(varifl[i].vname[0]) do
                        [varifl[i].vname[j]:=chr(getval)];
                end;{for begin}
end;
```

{read labels and table data   }

```
procedure redlabels;
var xname:lstring(5);
        i,j,k:integer;

begin
        if flabs>nlabs then [return];
        xname:='LTAB';
        fir:=1;getname;
        while not(zname=xname) do [readln(file1,out);
                                fir:=1;getname];
        pos:=13;tic:=false;
        fpos:=13;
        for i:=flabs to nlabs do begin
                labelfil[i].rowl:=getval+1;
                labelfil[i].coll:=getval+1;
                labelfil[i].lenl:=getval;
                readln(file1,out);
                xend:=true;
                end;
        xend:=true;fpos:=13;
        for i:=flabs to nlabs do begin
                if labelfil[i].titl=nill then
                        [labelfil[i].titl := allmqq(sizeof(labelfil[i].titl^))];
                labelfil[i].titl^[0]:=chr(labelfil[i].lenl*2);
                for j:=1 to (labelfil[i].lenl*2) do
                        [labelfil[i].titl^[j]:=chr(getval)];
        end; {for begin}
end;
```

{read data table data        }

```
procedure reddataf;
var xname:lstring(5);
        i,j,k,qc:integer;

begin
        if fdats>ndats then [return];
        xname:='DTAB';
        fir:=1;getname;
        while not(zname=xname) do [readln(file1,out);
                                fir:=1;getname];
        pos:=13;tic:=false;fpos:=13;
        for i:=fdats to ndats do begin
                datafil[i].rowd:=getval+1;
                datafil[i].cold:=getval+1;
                for j:= 1 to 4 do
                        [datafil[i].colord[j]:=getval];
                datafil[i].lend:=getval;
                for j:= 1 to 5 do
                        [datafil[i].optd[j]:=getval];
                        qc:=91;
                for j:= 1 to 3 do
                        [datafil[i].ofst[j]:=getval];
                for j:= 1 to 3 do
                        [datafil[i].idxd[j]:=
                            (wrd(getval)+(256*wrd(getval)))];
```

```
            if (datafil[i].optd[3] and 1)=1 then
                    [if (datafil[i].optd[5] and 4)=0 then
                [k:=datafil[i].ofst[1];
                if k>0 then datafil[i].decname:=varifl[k].vname]];
                k:=datafil[i].ofst[3];
                if k>0 then datafil[i].iname:=varifl[k].vname;
                k:=datafil[i].ofst[2];
                if k>0 then datafil[i].ddname:=varifl[k].vname;
                end;
end;

{read one function code block } procedure getfunc;
var     msg:boolean;
        i,k:integer;
begin
        fpos:=13;fir:=13;getname;
        if zname='0' then msg:=false else msg:=true;
        xend:=true;

for i:= firf to lasf do begin
                funcfil[i].faction:=getval;
                k:=getval;k:=getval;
                funcfil[i].fvalue:=getval;
                end;
        if msg then begin
                funcmsg[kmsg,0]:=chr(160);
                for i:= 1 to 160 do
                [funcmsg[kmsg,i]:=chr(getval)];
                end;
end;

{read help table} procedure redhelp;
var     k:integer;
label   711;
begin
        fpos:=13;fir:=1;getname;nhelps:=0;
        while not(zname='HELPT') do
                [readln(file1,out);
                fir:=1;getname];

711:    pos:=13;k:=getval;
        if k=255 then [return];
        nhelps:=nhelps+1;
        helpfil[nhelps].fncno:=k;
        helpfil[nhelps].rowh:=getval+1;
        helpfil[nhelps].colh:=getval+1;
        helpfil[nhelps].colorh:=getval;
        xend:=true;
        fir:=13;getname;
        helpfil[nhelps].hname:=zname;
        xend:=true;
        goto 711;
end;
```

{read function data }

```
procedure redfunc;
label 710;
begin
        fir:=1;getname;
        while zname=null do [readln(file1,out);fir:=1;getname];
710:    fir:=1;getname;
        if zname='FUNCT' then
                [firf:=1 ;lasf:=10;kmsg:=1;getfunc;goto 710];
        if zname='CNTLT' then
                [firf:=11;lasf:=20;kmsg:=2;getfunc;goto 710];
        if zname='ALTT' then
                [firf:=21;lasf:=30;kmsg:=3;getfunc;goto 710];
        if zname='SHFTT' then
                [firf:=31;lasf:=40;kmsg:=4;getfunc;goto 710];
end;

procedure clearfil [public];
var i:integer;
    junk : word;
begin
                for i:=1 to ndats do
                        with datafil[i] do
                                [iname:=null;
                                 ddname:=null;
                                 decname:=null;
                                 seqd:=0];
                for i:= 1 to nlabs do
                        [labelfil[i].titl:=nill;
                         labelfil[i].seql:=0];
                for i:= 1 to 40 do
                        [funcfil[i].faction:=0];
                for i:=1 to 4 do
                        [funcmsg[i]:=null];
                nlabs:=0;ndats:=0;nhelps:=0;nvars:=0; seqm:=0;
end;

{--- build color library---}
procedure bldcolib;
var     i,j,k:integer;
begin
        for i:=1 to nlabs do
                [j:=2;
                 while (j< ord(labelfil[i].titl^[0])) do
                        [k:=ord(labelfil[i].titl^[j]);
                         clibstor(k);
                         j:=j+2]];
        for i:=1 to ndats do
                [for j:=1 to 4 do
                        [clibstor(datafil[i].colord[j])]];
end;

procedure readfilx(vars va:boolean);
var
        j,i,m:integer;
        dirfnd:boolean;
```

```
begin
        if (not findfil(kname)) then return;
        assign(file1,kname);
        reset(file1);if eof(file1) then [return];
        if not va then clearfil;
        redbasic;
        redifv;
        redlabels;
        reddataf;
        redfunc;
        redhelp;
        close(file1);
        bldcolib;
end;
procedure nameset;
var     i:integer;
begin
        for i:= 1 to ord(kname[0]) do
                        [if kname[i]='.' then [kname[0]:=chr(i-1);
                                                    break];
                        if ord(kname[i])>96 then
                                    kname[i]:=chr(ord(kname[i])-32)];
        for i:=0 to 21 do oname[i]:=chr(0);
        oname:=kname;
        out:='.ASM'; concat(kname,out);
        end;

{------------------------------------------}
{   read File From Disk                    }
{------------------------------------------}
procedure readfil [public];
var     dum,va:boolean;
        f1r:lstring(21);
        pop,j,i,m:integer;
        nam:lstring(8);
        labl:lstring(42);

label   704,705;

begin
        labl:=' DISPLAY FILES ';
        f1r:=chr(176);
        nam:=null;
        nulnam(8,nam);
        j:=getdfd;
        drv[0]:=chr(1);
        drv[1]:=chr(j+65);
        nulnam(64,svpath);
        nulnam(64,pth);
        j:=101;
        j:=getsd(pth);
        if not (pth=null) then
                [svpath:='\'; concat(svpath,pth)];
        va:=false;
705:    pop:=cleared+sgc20l(kname,va,drv,svpath);
        pop:=backgrd+labels+markfld;
        pop:=displayd;
```

```
704:    pop:= keyin;
        nulnam(21,kname);
        nulnam(64,svpath); i:=readd;
        case pop of
        0,2:    [return];
        1,12:   [
                if kname=null then [pop:=1;
                                pop:= seterror(nam,pop);
                                goto 704];
                if (not reddir(drv,svpath,false)) then
                        [pop:=3; pop:=seterror(nam,pop);
                        pop:=4; pop:=seterror(nam,pop);
                                goto 704];
                nameset;
                readfilx(va)];
        11:     [va:=not va; goto 705];
        20:     [if (not reddir(drv,svpath,false)) then
                        [pop:=3; pop:=seterror(nam,pop);
                        pop:=4; pop:=seterror(nam,pop);
                                goto 704];
                pop:=diredt(drv,labl,kname);
                if not (pop=11) then goto 705;
                nameset;
                readfilx(va)];
        otherwise [];
        end; {case};
end;
end.
{ END OF LISTING: SGCRED.PAS }
{ SCREEN GENERATION COMPILER (SGC) - Source Code documentation
{ Copyright(c) 1987 Syndetic Corporation. All Rights Reserved
{----- SGC program secondary module-----}
{       Write data to disk file         }
module sgcprt [];
(*
{$debug+}
{$line+}
*)
var     [extern]
        drno,atrb,dent:integer;
        drv,dumstr:lstring(1);
        svpath,pth:lstring(64);
        xnam,itm:lstring(21);
        tic,valid,xend:boolean;
        fpos,pos,fir:integer;
        fdats,flabs:integer;
        segnam,oname,kname:lstring(21);
        firf,lasf,kmsg:integer;

var     [extern]        file1,file2:text;

{ Type Declarations } type    dimbits=array [1..8] of integer;

{ Global Variable Declarations }
```

```
var [extern]

{ Display Value Parameters and Variables } masop:integer;    {master (outer) function number}
        monsz:integer;         {Monitor size, 40, or 80 }
        dpage:integer;    {screen page for display}
        roworg:integer;        {Display row origin}
        colorg:integer;        {Display column origin}
        rowsz:integer;    {Row size of Display}
        colsz:integer;    {Column Size of Display}
        disedc:integer;        {Edit control of Display}
        bakcol:integer;        {Background Color}

{ Working Variables } zname:lstring(20);
        dname:lstring(8);
        field:integer;
        error:boolean;
        funct,cntlt,altt,shftt:boolean;
        db,dw,dd:lstring(13);
        dwo:lstring(20);

{ Color Library Variables } nolib:integer;       {library size}
        nopnt:integer;
        colib:array [1..20] of integer;        {library}

{color working variables } msg1:lstring(20);
        msg2:lstring(20);
        msg3:lstring(20);
        msg4:lstring(20);
        libmsg:lstring(20);

{ Label definition file} type    link = ads of titldat;
        titldat = lstring (160);

type    labelrec=record
            rowl:integer;
            coll:integer;
            lenl:integer;
            seql:integer;
            titl:link;
            xnam:lstring(5);
        end; {labelrec}
```

```
var [extern]
        labelfil:array [1..150] of labelrec;
        nlabs:integer;
        labpnt:integer;
        labcolor:integer;
        labptr:link;
        newentry:boolean;
        row,col,len,curpos,dtype:integer;
        seqm:integer;
        out:lstring(80);
        lbname:lstring(5);

{ Data File Definition } type datarec=record
        rowd,cold,lend,seqd:integer;
        colord:array [1..4] of integer;
        optd:array [1..5] of integer;
        ofst:array [1..3] of integer;
        idxd:array [1..3] of word;
        iname,ddname,decname:lstring(20);
end;
var [extern]
        datafil:array [1..150] of datarec;
        ndats,datpnt:integer;

{   Function Key Data Variables   } type    funcrec = record
                faction:integer;
                fvalue:integer;
                end;

funsetr = record
                key:lstring(8);
                code:integer;
                end;

var [extern]
        funcfil:array [1..40] of funcrec;
        funcset:array [1..22] of funsetr;
        funcmsg:array [1..4] of titldat;
        inot:lstring(8);
        nfunset:integer;

{ Interface Variable File } type    variflrec = record
                vname:lstring(20);
                vtype:integer;
                vxna:lstring(5);
                end;

var     [extern]
        varifl:array [1..100] of variflrec;
        nvars:integer;
```

{ Help Table File }

```
type    helprec = record
                fncno:integer;
                rowh:integer;
                colh:integer;
                colorh:integer;
                hname:lstring(8);
                end;

var     [extern]
        helpfil:array [1..40] of helprec;
        nhelps:integer;

eop:integer;
        editd:datarec;
```

{ Compiler variable initial defaults}

```
var [extern]
        strd:datarec;   {string data field}
        reald:datarec;  {real data field}
        intd:datarec;   {integer data field}
        wordd:datarec;  {word data field}
        boold:datarec;  {boolean data field} function FIRDIS(vars name:lstring):integer; extern; {set first display}
function LASDIS(vars name:lstring):integer; extern; {set last display}
function BACKGRD:integer; extern;                   {clear background}
function LABELS:integer; extern;                    {Draw labels}
function MARKFLD:integer; extern;                   {mark data fields}
function DISPLAYD:integer; extern;                  {Display data values}
function READD:integer; extern;
function KEYIN:integer; extern;                     {Input with keyboard}
function RENKEYIN:integer; extern;                  {Re-enter keyboard inp}
function CLEARED:integer; extern;                   {Clear editor of links}
function GETCURFLD(vars NAME:lstring;               {Get cursor field}
            vars FIELD:integer):integer; extern;
function SETCURFLD(vars NAME:lstring;               {Set cursor field}
            vars FIELD:integer):integer; extern;
function CURSORPOS(vars NAME:lstring;               {Get cursor name,row,col}
            vars ROW:integer;
            vars COLUMN:integer):integer; extern;
function SETCOLOR(vars NAME:lstring;                {Set field color}
            vars FIELD:integer;
            vars COLOR:integer):integer; extern;
function SETERROR(vars NAME:lstring;                {Set field to error color}
            vars FIELD:integer):integer; extern;
function SETORIGIN(vars NAME:lstring;               {Set display origin}
            vars ROW:integer;
            vars COLUMN:integer):integer; extern;
function SETBAKCOL(vars NAME:lstring;               {Set background color}
            vars COLOR:integer):integer; extern;
function SETLABFLD(vars NAME:lstring;               {Set label limits}
            vars FIRST:integer;
            vars LAST:integer):integer; extern;
```

```
function SETDATFLD(vars NAME:lstring;            {Set data field limits}
            vars FIRST:integer;
            vars LAST:integer):integer; extern;
function SETPAGE( vars NAME:lstring;             {Set display page}
            vars PAGE:integer):integer;  extern;
function SCROLROW(vars NAME:lstring;             {scroll up or down}
            vars ROWS:integer):integer; extern;
function SCROLCOL(vars NAME:lstring;             {scroll right or left}
            vars COLUMNS:integer):integer; extern;

FUNCTION FNDENT(VARS path:LSTRING;               {Find a file}
            VARS NAM:LSTRING;
            VARS ATRB:INTEGER):INTEGER;
            EXTERN;
       {returns: 0--found
                 2--file not found
                 18--no more files}

FUNCTION NEXENT(VARS nam:LSTRING;                {Next File}
            VARS ATRB:INTEGER):INTEGER;
            EXTERN;
       {returns: 0--found
                 18--no more files}

FUNCTION CREATSD(VARS nam:LSTRING):INTEGER;      {create sub-drectory}
            EXTERN;
       {returns: 0--found
                 3--path not found
                 5--access denied}

FUNCTION SETSD(VARS nam:LSTRING):INTEGER;        {Set default Sub-dir}
            EXTERN;
       {returns: 0--set
                 3--path not found}

FUNCTION GETSD(VARS nam:LSTRING):INTEGER;        {Returns deflt Sub-dir}
            EXTERN;
       {returns: 0--set
                 15--invalid drive}

PROCEDURE SETDFD(consts drno:INTEGER);                 {Set Default Drive}
            EXTERN;
       {drno = 0 for A, 1 for b, etc.}

FUNCTION GETDFD:INTEGER;                         {Returns Default Drive}
            EXTERN;
       {GETDFD = 0 for A, 1 for b, etc.}

FUNCTION RENAMF(VARS oldnam:lstring;             {Rename file}
            VARS newnam:LSTRING):INTEGER;
            EXTERN;
       {oldnam--original name
        newnam--name after change returns 0--done
                3--path not found
                17--Not same device.
        Note: Renaming can move file from one sub-drectory to
              another}
```

```
FUNCTION DELDIR(VARS nam:LSTRING):INTEGER;       {Delete sub-directory}
            EXTERN;
       {Returns 0--done
               3--path not found
               5--access denied}

FUNCTION DELFIL(VARS nam:LSTRING):INTEGER;       {Delete file}
            EXTERN;
       {Returns 0--done
               2--file not found
               5--access denied}

FUNCTION REDDIR(VARS drv,pth:lstring;
            consts setdir:boolean):boolean;   EXTERN;

procedure bitsbyte(vars bits:dimbits; vars bytes:integer); extern;

FUNCTION DIREDT(vars drv,labl,xtm:lstring):integer;    EXTERN;
procedure nulnam(consts k:integer; vars nam:lstring);    extern;

(*{$include:'\sgcscr\sgcscrlb.pas'}*)

(* * * *   I N C L U D E   R E P L A C E S   T H I S   E X T E R N   * * * *)
FUNCTION SGC16l(vars scrnam:LSTRING;
         vars drv:LSTRING;
         vars svpath:LSTRING;
         vars segnam:LSTRING):INTEGER;   EXTERN;
(* * * *   E N D   O F   C O M M E N T E D   P A R T   * * * *)
{ store names in interface file} function stornam(consts xtype:integer):integer   [public];
var    i,j,ztype:integer;
       bits:dimbits;
begin
       j:=xtype; bitsbyte(bits,j);
       if bits[1]=1 then [if bits[2]=0 then ztype:=1 else ztype:=2];
       if bits[3]=1 then [if bits[2]=0 then ztype:=4 else ztype:=5];
       if bits[4]=1 then ztype:=8;
       if bits[5]=1 then ztype:=16;
       if bits[6]=1 then ztype:=32;
if nvars>0 then
       for i:=1 to nvars do
               if zname=varifl[i].vname then
                       if ztype=varifl[i].vtype then [error:=false;
                              stornam:=i;return]
                       else    [error:=true;
                              stornam:=i;return];
       nvars:=nvars+1;
        varifl[nvars].vname:=zname;
       varifl[nvars].vtype:=ztype;
       error:=false;
       stornam:=nvars;
end;

{ Build Interface }
```

```
procedure buildintf;
var     i:integer;
begin
        nvars:=0;       {rebuild table}
        if ndats <1 then [return];
        for i:= 1 to ndats do begin
                if datafil[i].iname<>null then
                    [zname:=datafil[i].iname;
                     datafil[i].ofst[3]:=stornam(datafil[i].optd[3])];
                if datafil[i].ddname<>null then
                    [zname:=datafil[i].ddname;
                     datafil[i].ofst[2]:=stornam(datafil[i].optd[3])];
            if (datafil[i].optd[3] and 1)=1 then
               if (datafil[i].optd[5] and 4)=0 then
                   if not(datafil[i].decname=null) then
                       [zname:=datafil[i].decname;
                        datafil[i].ofst[1]:=stornam(4)];
        end; {for}
end;

{ pack numeric data into output with leading comma if not first}
procedure packout(vars out:lstring;consts val:word;vars first:boolean);
var     code:lstring(8);
        i,j:integer;
        rfin,
        fin:boolean;
begin
        fin:=encode(code,val:-8);
        if fin then rfin:=true;
        i:=ord(out[0]);
        if not first then [i:=i+1;out[i]:=','];
        for j:=1 to 8 do
                [if code[j]<>' ' then
                        [i:=i+1;out[i]:=code[j]]];
        out[0]:=chr(i);first:=false;
end;
{next label name}
procedure nextname(vars name:lstring);
var     i,j:integer;
        again:boolean;
label   600;
begin
        i:=1;again:=false;
 600:   j:=ord(name[i]);j:=j+1;
        if j<65 then j:=65;
        if j<91 then again:=false
            else [j:=65;again:=true];
        name[i]:=chr(j);i:=i+1;
        if again then goto 600;
end;
{ embed label in string }
procedure embed(consts i:integer;vars out:lstring;vars inx:lstring);
var     k:integer;
begin
        for k:=i to (i+ord(inx[0])-1) do
                [out[k]:=inx[k-i+1]];
```

```
end;
{output label}
{ output interface variable table}
procedure prtifvar;
var     fir:boolean;
        i,j,m:integer;
        k:word;
begin
        out:=db;fir:=true;dname:='iftab';
        embed(1,out,dname);
        k:=wrd(nvars);packout(out,k,fir);
        packout(out,9,fir);
        writeln(file1,out);
if nvars<1 then [return];
        for i:= 1 to nvars do begin
        nextname(lbname);varifl[i].vxna:=lbname;
        out:=null;fir:=true;
        k:=wrd(varifl[i].vtype);packout(out,k,fir);
        case varifl[i].vtype of
                1: k:=4;
                2: k := 8;
                4: k:=2;
                5: k := 4;
                8: k:=2;
                16: k:=2;
                32: k:=0;

end;
        packout(out,k,fir);
        k:=wrd(varifl[i].vname[0]);packout(out,k,fir);
        writeln(file1,db,'4 dup (0),',out);
        writeln(file1,dwo,lbname);
        end; {for}
        for i:= 1 to nvars do begin
        out:=db;fir:=true;
        embed(1,out,varifl[i].vxna);
        j:=ord(varifl[i].vname[0]);
        for m:=1 to j do
                [k:=wrd(varifl[i].vname[m]);packout(out,k,fir)];
        writeln(file1,out);
        end;
end;
{ Output help external statments }
procedure helpext;
var i,j:integer;
        prt:boolean;
begin
        if nhelps<1 then [return];
        for i:= 1 to nhelps do begin
           prt:=true;
                for j:= 1 to i do
                   [if i<>j then if helpfil[i].hname = helpfil[j].hname
                        then prt:= false];
                if prt then
                   writeln(file1,'          extrn ',helpfil[i].hname,
                        ':far');
```

```
                end;
end;
{ output Help table data } procedure helpprt;
var     fir:boolean;
        k:word;
        i:integer;
begin
        out:=db;fir:=true;dname:='helpt';
        embed(1,out,dname);
if nhelps>0 then begin
        for i:=1 to nhelps do begin
        k:=wrd(helpfil[i].fncno);packout(out,k,fir);
        k:=wrd(helpfil[i].rowh)-1;packout(out,k,fir);
        k:=wrd(helpfil[i].colh)-1;packout(out,k,fir);
        k:=wrd(helpfil[i].colorh);packout(out,k,fir);
        writeln(file1,out,',8 dup (0)');
        writeln(file1,dd,helpfil[i].hname);
        out:=db;fir:=true;
        end;{ for}
        end; {if begin}
        writeln(file1,out,'255,0');
end;
{Determine ouput function table conditions}
procedure funcdet;
var     i:integer;
begin   funct:=false;cntlt:=false;altt:=false;shftt:=false;
        for i:=1 to 10 do
                if funcfil[i].faction >0 then funct:=true;
        for i:=11 to 20 do
                if funcfil[i].faction >0 then cntlt:=true;
        for i:=21 to 30 do
                if funcfil[i].faction >0 then  altt:=true;
        for i:=31 to 40 do
                if funcfil[i].faction >0 then shftt:=true;
        if funcmsg[1]<>null then funct:=true;
        if funcmsg[2]<>null then cntlt:=true;
        if funcmsg[3]<>null then  altt:=true;
        if funcmsg[4]<>null then shftt:=true;
end;
{Set Edit Control Byte to Reflect input and output}
procedure seteditc;
var     i,test:integer;
begin   disedc:=disedc and 252;         {clear low two bytes}
        if ndats >0 then for i:= 1 to ndats do
                [test:=datafil[i].optd[3] and 3;test:=test xor 3;
                if test >0 then disedc:= disedc or 1];
        funcdet;
        if funct then disedc:=disedc or 2;
        if cntlt then disedc:=disedc or 2;
        if  altt then disedc:=disedc or 2;
        if shftt then disedc:=disedc or 2;
end;
procedure labelprt(vars nam,lab:lstring);
var     i,j,l,m:integer;
        fir:boolean;
        k:word;
```

```
begin
        out:=db;fir:=true;
        embed(1,out,nam);
        j:=((ord(lab[0])-1) div 15)+1;
        for i:= 1 to j do begin
                l:=(i-1)*15 +1;
                m:=l+14;if m>ord(lab[0]) then m:=ord(lab[0]);
                for j:=l to m do
                        [k:=wrd(lab[j]);packout(out,k,fir)];
                writeln(file1,out);
                out:=db;fir:=true;
        end; {for i}
end;
procedure labflsort;
var     dummy:labelrec;
        i,j,k:integer;
begin                   {sort}
        if nlabs > 1 then begin              {2 requred for sort}
                for i:=1 to (nlabs -1) do begin
                        for j:= (i+1) to nlabs do
                                if labelfil[i].seql >
                                   labelfil[j].seql then
                                [dummy:=labelfil[i];
                                labelfil[i]:=labelfil[j];
                                labelfil[j]:=dummy];
                end; {for i}
        end; {if begin}
end;
{output label file}
procedure labflprt;
var
        i,j,k:integer;
        fir:boolean;
        kk:word;
begin                   {sort}
        if nlabs <1 then [return];
        labflsort;

{output label data}
        dname:='ltab';
        out:=db;fir:=true;
        embed(1,out,dname);
        for i:= 1 to nlabs do begin
        nextname(lbname);labelfil[i].xnam:=lbname;
        kk:=wrd(labelfil[i].rowl-1);packout(out,kk,fir);
        kk:=wrd(labelfil[i].coll-1);packout(out,kk,fir);
        kk:=wrd(labelfil[i].lenl);packout(out,kk,fir);
        writeln(file1,out);
        writeln(file1,dwo,lbname);
        out:=db;fir:=true;
        end;
        {output labels}
        for i:= 1 to nlabs do begin
                k:=ord(labelfil[i].xnam[0]);
                k:=k+1;labelfil[i].xnam[k]:=':';
                labelfil[i].xnam[0]:=chr(k);
                labelprt(labelfil[i].xnam,labelfil[i].titl^);
                end; {for i}
```

```
end; {labflprt}
procedure datflsort;
var     dummy:datarec;
        i,j:integer;
begin                   {sort}
        if ndats > 1 then begin                 {2 requred for sort}
                for i:=1 to (ndats -1) do begin
                        for j:= (i+1) to ndats do begin
                                if datafil[i].seqd > datafil[j].seqd then begin
                                        dummy:=datafil[i];
                                        datafil[i]:=datafil[j];
                                        datafil[j]:=dummy;
                                    end;
                            end; {for j}
                    end; {for i}
            end; {if begin}
end;
{output data file}
procedure datflprt;
var
        i,j,k:integer;
        fir:boolean;
        kk:word;
begin                   {sort}
        if ndats <1 then [return];

{output label data}
        dname:='dtab';
        out:=db;fir:=true;
        embed(1,out,dname);
        for i:= 1 to ndats do begin
        kk:=wrd(datafil[i].rowd-1);packout(out,kk,fir);
        kk:=wrd(datafil[i].cold-1);packout(out,kk,fir);
        for j:=1 to 4 do
                [kk:=wrd(datafil[i].colord[j]);packout(out,kk,fir)];
        kk:=wrd(datafil[i].lend);packout(out,kk,fir);
        for j:=1 to 5 do
                [kk:=wrd(datafil[i].optd[j]);packout(out,kk,fir)];
        for j:=1 to 3 do
                [kk:=wrd(datafil[i].ofst[j]);packout(out,kk,fir)];
        writeln(file1,out);
        out:=null;fir:=true;
        for j:=1 to 3 do
                [kk:=datafil[i].idxd[j] mod 256;packout(out,kk,fir);
                kk:=datafil[i].idxd[j] div 256;packout(out,kk,fir)];
        writeln(file1,db,out);
        out:=db;fir:=true;
        end;
end;
{ Output Fuction Table Data } procedure prtfuncd(consts ifr,ils:integer);
var     i:integer;
        k:word;
        fir:boolean;
```

```
begin
        for i:= ifr to ils do begin
        out:=null;fir:= true;
        k:=wrd(funcfil[i].faction);packout(out,k,fir);
        writeln(file1,db,out);
        out:=null;fir:=true;
        packout(out,0,fir);
        packout(out,0,fir);
        k:=wrd(funcfil[i].fvalue);packout(out,k,fir);
        writeln(file1,dw,out);
        end;
end;
{ output Function data and labels }
procedure funcprt;
begin
if funct then begin
        out:=dd;dname:='funct';embed(1,out,dname);
        if funcmsg[1]<>null then
                [nextname(lbname);
                writeln(file1,out,lbname)]
        else writeln(file1,out,'0');
        prtfuncd(1,10);
        if funcmsg[1]<>null then labelprt(lbname,funcmsg[1]);
        end;
if cntlt then begin
        out:=dd;dname:='cntlt';embed(1,out,dname);
        if funcmsg[2]<>null then
                [nextname(lbname);
                writeln(file1,out,lbname)]
        else writeln(file1,out,'0');
        prtfuncd(11,20);
        if funcmsg[2]<>null then labelprt(lbname,funcmsg[2]);
        end;
if  altt then begin
        out:=dd;dname:='altt';embed(1,out,dname);
        if funcmsg[3]<>null then
                [nextname(lbname);
                writeln(file1,out,lbname)]
        else writeln(file1,out,'0');
        prtfuncd(21,30);
        if funcmsg[3]<>null then labelprt(lbname,funcmsg[3]);
        end;
if shftt then begin
        out:=dd;dname:='shftt';embed(1,out,dname);
        if funcmsg[4]<>null then
                [nextname(lbname);
                writeln(file1,out,lbname)]
        else writeln(file1,out,'0');
        prtfuncd(31,40);
        if funcmsg[4]<>null then labelprt(lbname,funcmsg[4]);
        end;
end;
{-------------------------------------------}
{   Write File to Disk                      }
{-------------------------------------------}
procedure writefil [public];
```

```
var lsp:lstring(10);
        pop,j,i,m:integer;
        fir,dirfnd:boolean;
        k:word;
        labl:lstring(42);
        nam,tic,l:lstring(1);
label   602,603,604;

begin
        nulnam(1,nam);
        nam:=null;
        j:=getdfd;
        drv[0]:=chr(1);
        drv[1]:=chr(j+65);
        nulnam(64,svpath);
        nulnam(64,pth);
        i:=getsd(pth);
        if not (pth=null) then
                [svpath:='\'; concat(svpath,pth)];
        kname:=oname;
        labl:=' WRITE FILE ';
603:    if segnam=null then segnam:='SCREENTX';
        pop:=cleared+sgc16l(kname,drv,svpath,segnam);
        pop:=backgrd+labels+markfld+displayd;
604:    pop:= keyin;
        nulnam(21,kname);
        nulnam(64,svpath); i:=readd;
        case pop of
        0,2:    [return];
        1,11:.  [goto 602];
        20:     [if not reddir(drv,svpath,true) then
                        [i:=3; i:=seterror(nam,i); goto 604];
                pop:=diredt(drv,labl,svpath); goto 603];
        end; {case};
602:    nulnam(21,kname); nulnam(21,oname); nulnam(64,svpath);
        pop:=readd;
        if not reddir(drv,svpath,true) then
                        [i:=3; i:=seterror(nam,i); goto 604];
        for i:=(ord(segnam[0])+1) to 11 do segnam[i]:=' ';
        segnam[0]:=chr(10);
        for i:=1 to ord(kname[0]) do
                [if ord(kname[i])>96 then
                                kname[i]:=chr(ord(kname[i])-32);
                if kname[i]='.' then
                        [kname[0]:=chr(i-1); break]];
        oname:=kname;
        out:='.asm';
        concat(kname,out);
        l:='l';
        lbname:='aaa';
        lsp:='          ';
        db:='        db ';
        dw:='        dw ';
        dd:='        dd ';
        dwo:='         dw offset ';
        dirfnd:=false;
```

```
dirfnd:=reddir(drv,svpath,dirfnd);
if dirfnd=false then [pop:=4; pop:=seterror(dumstr,pop);
                goto 603];
assign(file1,kname);
rewrite(file1);
writeln(file1,lsp,'name ',oname);
writeln(file1,lsp,'extrn edittab:far');
writeln(file1,lsp,'extrn helptab:far');
writeln(file1,lsp,'extrn sedit:near');
writeln(file1,lsp,'extrn link:near');
writeln(file1,lsp,'extrn setertn:near');
writeln(file1,lsp,'extrn errrtna:near');

helpext;        {help externals} tic[1]:=chr(39);tic[0]:=chr(1);
writeln(file1,segnam,' segment para public ',tic,'code',
                tic);
writeln(file1,lsp,'assume cs:',segnam);
writeln(file1,lsp,'public ',oname);
seteditc;               {edit control i/o}
out:=db;fir:=true;k:=wrd(disedc);packout(out,k,fir);
embed(1,out,oname);writeln(file1,out);
fir:=true;out:=null;
k:=wrd(rowsz);packout(out,k,fir);
k:=wrd(colsz);packout(out,k,fir);
k:=wrd(roworg-1);packout(out,k,fir);
k:=wrd(colorg-1);packout(out,k,fir);
writeln(file1,dw,out);
fir:=true;out:=null;
k:=wrd(nlabs);packout(out,k,fir);
k:=wrd(ndats);packout(out,k,fir);
writeln(file1,db,out);
writeln(file1,db,'0,0,0,0,0');
fir:=true;out:=null;
packout(out,0,fir);
k:=0;if nlabs>1 then k:=wrd(nlabs)-1;
packout(out,k,fir);
packout(out,0,fir);
k:=0;if ndats>1 then k:=wrd(ndats)-1;
packout(out,k,fir);
writeln(file1,db,out);
writeln(file1,db,'25,80,0,0');
out:=null;fir:=true;
k:=wrd(bakcol);packout(out,k,fir);
writeln(file1,db,out);
writeln(file1,db,'5,21,13 dup (0),7,16,0,0');
out:=null;fir:=true;
k:=wrd(dpage);packout(out,k,fir);
writeln(file1,db,out);
writeln(file1,db,'0,0');
writeln(file1,dd,'edittab');
out:=null;fir:=true;
k:=wrd(disedc);packout(out,k,fir);
writeln(file1,db,out);
writeln(file1,dd,oname);
```

```
if nlabs > 0 then writeln(file1,dwo,'ltab')
           else writeln(file1,dw,'0');
if ndats > 0 then writeln(file1,dwo,'dtab')
           else writeln(file1,dw,'0');
writeln(file1,dwo,'helpt');
if funct then writeln(file1,dd,'funct')
           else writeln(file1,dd,'0');
if cntlt then writeln(file1,dd,'cntlt')
           else writeln(file1,dd,'0');
if  altt then writeln(file1,dd,'altt')
           else writeln(file1,dd,'0');
if shftt then writeln(file1,dd,'shftt')
           else writeln(file1,dd,'0');
writeln(file1,dd,'edittab');
writeln(file1,dd,'helptab');
out:=null;fir:=true;
k:=wrd(oname[0]);packout(out,k,fir);
for i:= 1 to ord(oname[0]) do [k:=wrd(oname[i]);
                               packout(out,k,fir)];
if ord(oname[0]) <8 then for i:= 1 to 8-ord(oname[0]) do
                packout(out,0,fir);
writeln(file1,db,out);

datflsort;              {sort data file by sequence}
nvars:=0;
buildintf;              {build interface}
prtifvar;               {interface variables}
labflprt;               {print labels}
datflprt;               {data fields}
funcprt;                {function key print}
helpprt;                {help table output} writeln(file1,segnam,' ends');
writeln(file1,'edit segment byte public ',tic,'code',tic);
writeln(file1,lsp,'assume cs:edit,ds:edit');
writeln(file1,lsp,'public ',oname,l);
writeln(file1,lsp,'extrn rtnstd:near');
writeln(file1,oname,l,' proc far');
writeln(file1,lsp,'push bp');
writeln(file1,lsp,'mov bp,sp');
writeln(file1,lsp,'call setertn');
writeln(file1,lsp,'push bp');
writeln(file1,lsp,'mov si,offset ',oname);
writeln(file1,lsp,'mov dx,seg ',oname);
writeln(file1,lsp,'mov ds,dx');
writeln(file1,lsp,'call link');
writeln(file1,lsp,'call sedit');
writeln(file1,lsp,'mov bx,offset errrtna');
writeln(file1,lsp,'lds si,dword ptr cs:[bx+2]');
writeln(file1,lsp,'les di,dword ptr cs:[bx+6]');
writeln(file1,lsp,'pop bp');
writeln(file1,lsp,'mov ax,dx');
writeln(file1,lsp,'call setertn');
writeln(file1,lsp,'mov ax,0');
writeln(file1,lsp,'jmp rtnstd');
writeln(file1,oname,l,' endp');
```

```
        writeln(file1,'edit ends');
        writeln(file1,'end');
        close(file1);

{ Write Pascal Interface block }
        kname:=oname; out:='.pas';
        concat(kname,out);
        assign(file1,kname);
        rewrite(file1);
        write(file1,'FUNCTION ',oname,l);
        if nvars<1 then [writeln(file1,':INTEGER;   EXTERN;')
                        close(file1)]
        else begin
                for i:=1 to nvars do begin
                if i=1 then write(file1,'(')
                        else write(file1,lsp);
                write(file1,'vars ',varifl[i].vname);
                case varifl[i].vtype of
                   1:   [write(file1,':REAL')];
                   2:   [write(file1,':REAL8')];
                   4:   [write(file1,':INTEGER')];
                   5:   [write(file1,':INTEGER4')];
                   8:   [write(file1,':WORD')];
                   16:  [write(file1,':BOOLEAN')];
                   32:  [write(file1,':LSTRING')];
                end; {case}
                if i<nvars then writeln(file1,';')
                else writeln(file1,'):INTEGER;   EXTERN;');
                end;{for begin}
        msg1[0]:=chr(1);
        msg1[1]:=chr(26);
        writeln(file1,msg1);
        close(file1);
        end;{else begin}
end;
end.
{ END OF SGCPRT.PAS LISTING }
{ SCREEN GENERATION COMPILER (SGC) - Source Code documentation         }
{ Copyright(c) 1987 Syndetic Corporation. All Rights Reserved          }
{----- SGC program secondary module-----}
{       output SGC data in report-style  }
{       format to "file2" (prn, etc)     }
module sgcrpt [];
(*
{$debug+}
{$line+}
*)
var     colprt:boolean;
var     [extern]
        kname,oname:lstring(21);
        drno,atrb,dent:integer;
        drv:lstring(1);
        xnam,itm:lstring(21);
        tic,valid,xend:boolean;
        fpos,pos,fir:integer;
        fdats,flabs:integer;
        firf,lasf,kmsg:integer;
```

```
var     [extern]         file1,file2:text;

{ Type Declarations } type    dimbits=array [1..8] of integer;

{ Global Variable Declarations } var [extern]

{ Display Value Parameters and Variables } masop:integer;    {master (outer) function number}
        monsz:integer;          {Monitor size, 40, or 80 }
        dpage:integer;    {screen page for display}
        roworg:integer;         {Display row origin}
        colorg:integer;         {Display column origin}
        rowsz:integer;    {Row size of Display}
        colsz:integer;    {Column Size of Display}
        disedc:integer;         {Edit control of Display}
        bakcol:integer;         {Background Color}

{ Working Variables } zname:lstring(20);
        dname:lstring(8);
        field:integer;
        error:boolean;
        funct,cntlt,altt,shftt:boolean;
        db,dw,dd:lstring(13);
        dwo:lstring(20);

{ Color Library Variables } nolib:integer;          {library size}
        nopnt:integer;
        colib:array [1..20] of integer;         {library}

{color working variables } msg1:lstring(20);
        msg2:lstring(20);
        msg3:lstring(20);
        msg4:lstring(20);
        libmsg:lstring(20);

{ Label definition file} type    link = ads of titldat;
        titldat = lstring (160);
```

```
type    labelrec=record
                rowl:integer;
                coll:integer;
                lenl:integer;
                seql:integer;
                titl:link;
                xnam:lstring(5);
        end;  {labelrec} var [extern]
        labelfil:array [1..150] of labelrec;
        nlabs:integer;
        labpnt:integer;
        labcolor:integer;
        labptr:link;
        newentry:boolean;
        row,col,len,curpos,dtype:integer;
        seqm:integer;
        out:lstring(80);
        lbname:lstring(5);

{  Data File Definition } type datarec=record
        rowd,cold,lend,seqd:integer;
        colord:array [1..4] of integer;
        optd:array [1..5] of integer;
        ofst:array [1..3] of integer;
        idxd:array [1..3] of word;
        iname,ddname,decname:lstring(20);
end;
var [extern]

datafil:array [1..150] of datarec;
        ndats,datpnt:integer;

{  Function Key Data Variables } type    funcrec = record
                faction:integer;
                fvalue:integer;
                end;

funsetr = record
                key:lstring(8);
                code:integer;
                end;

var [extern]
        funcfil:array [1..40] of funcrec;
        funcset:array [1..22] of funsetr;
        funcmsg:array [1..4] of titldat;
        inot:lstring(8);
        nfunset:integer;

{  Interface Variable File }
```

```
type    variflrec = record
            vname:lstring(20);
            vtype:integer;
            vxna:lstring(5);
            end;

var     [extern]
        varifl:array [1..100] of variflrec;
        nvars:integer;

{ Help Table File } type    helprec = record
            fncno:integer;
            rowh:integer;
            colh:integer;
            colorh:integer;
            hname:lstring(8);
            end;

var     [extern]
        helpfil:array [1..40] of helprec;
        nhelps:integer;

v1:array [1..8] of boolean;
        fr1:array [1..10] of boolean;
        b1,b2,b3:boolean;
        ifv,idv,idp:lstring(20);
        ifv1,idv1,idp1:word;
        decplac,helpcol:integer;
        lchr,bc1,bc2:lstring(1);
        editd:datarec;

{ Compiler variable initial defaults} var [extern]
        strd:datarec;    {string data field}
        reald:datarec;   {real data field}
        intd:datarec;    {integer data field}
        wordd:datarec;   {word data field}
        boold:datarec;   {boolean data field}
var     eop:integer;

function FIRDIS(vars name:lstring):integer; extern; {set first display}
function LASDIS(vars name:lstring):integer; extern; {set last display}
function BACKGRD:integer; extern;           {clear background}
function LABELS:integer; extern;            {Draw labels}
function MARKFLD:integer; extern;           {mark data fields}
function DISPLAYD:integer; extern;          {Display data values}
function READD:integer;  extern;
function KEYIN:integer; extern;             {Input with keyboard}
function RENKEYIN:integer; extern;          {Re-enter keyboard inp}
function CLEARED:integer; extern;           {Clear editor of links}
function GETCURFLD(vars NAME:lstring;       {Get cursor field}
            vars FIELD:integer):integer; extern;
```

```
function SETCURFLD(vars NAME:lstring;              {Set cursor field}
                   vars FIELD:integer):integer; extern;
function CURSORPOS(vars NAME:lstring;              {Get cursor name,row,col}
                   vars ROW:integer;
                   vars COLUMN:integer):integer; extern;
function SETCOLOR(vars NAME:lstring;               {Set field color}
                   vars FIELD:integer;
                   vars COLOR:integer):integer; extern;
function SETERROR(vars NAME:lstring;               {Set field to error color}
                   vars FIELD:integer):integer; extern;
function SETORIGIN(vars NAME:lstring;              {Set display origin}
                   vars ROW:integer;
                   vars COLUMN:integer):integer; extern;
function SETBAKCOL(vars NAME:lstring;              {Set background color}
                   vars COLOR:integer):integer; extern;
function SETLABFLD(vars NAME:lstring;              {Set label limits}
                   vars FIRST:integer;
                   vars LAST:integer):integer; extern;
function SETDATFLD(vars NAME:lstring;              {Set data field limits}
                   vars FIRST:integer;
                   vars LAST:integer):integer; extern;
function SETPAGE( vars NAME:lstring;               {Set display page}
                   vars PAGE:integer):integer;  extern;
function SCROLROW(vars NAME:lstring;               {scroll up or down}
                   vars ROWS:integer):integer; extern;
function SCROLCOL(vars NAME:lstring;               {scroll right or left}
                   vars COLUMNS:integer):integer; extern;
procedure optunpack(vars eop:integer); extern;
procedure funcdisp; extern;
procedure bitsbyte(vars bits:dimbits; vars bytes:integer); extern;
procedure colsplit(color:integer;
               vars blink:integer;
               vars bakcol:integer;
               vars chrcol:integer);   extern;

{$include:'\sgcscr\sgcscrlb.pas'}

(* * * *   I N C L U D E   R E P L A C E S   T H I S   E X T E R N   * * * *
FUNCTION SGC25L(vars v1:BOOLEAN;
        vars v2:BOOLEAN;
        vars v3:BOOLEAN;
        vars v4:BOOLEAN;
        vars v5:BOOLEAN;
        vars colprt:BOOLEAN):INTEGER;  EXTERN;
* * * *   E N D   O F   C O M M E N T E D   P A R T   * * * *)

procedure sgcrepo [public];
var
        chra:ads of byte;
        chrs:byte;
        lsp:lstring(25);
        oc:lstring(1);
        cpi12:lstring(2);
        cpi17,cpi10,:lstring(1);
        rpt:lstring(6);
        prtch:array [178..219] of byte;
        pg,ln:integer;
        colname:array [0..15] of lstring(10);
        bfc,bfcdef:lstring(12);
```

```
procedure initprt;
begin
                                                    {font sizes}
        cpi17[0]:=chr(1);cpi17[1]:=chr(15);
        cpi10[0]:=chr(1);cpi10[1]:=chr(18);
        cpi12[0]:=chr(2);cpi12[1]:=chr(27);cpi12[2]:=chr(77);
        lsp:='                          ';      {margins}
        oc:=' ';                                {signal dummy}
        if colprt then
                [bfc[0]:=chr(12);              {color signal set}
                bfc[1]:=chr(27);
                bfc[2]:=chr(91);
                bfc[3]:=chr(78);
                bfc[4]:=chr(1);
                bfc[5]:=chr(0);
                bfc[6]:=chr(7);
                bfc[7]:=chr(27);
                bfc[8]:=chr(91);
                bfc[9]:=chr(77);
                bfc[10]:=chr(1);
                bfc[11]:=chr(0);
                bfc[12]:=chr(0)]
        else bfc:=null;
        bfcdef:=bfc;
        colname[0]:='Black';           {color name strings}
        colname[1]:='Blue';
        colname[2]:='Green';
        colname[3]:='Cyan';
        colname[4]:='Red';
        colname[5]:='Magenta';
        colname[6]:='Brown';
        colname[7]:='White';
        colname[8]:='Gray';
        colname[9]:='Lt. Blue';
        colname[10]:='Lt. Green';
        colname[11]:='Lt. Cyan';
        colname[12]:='Lt. Red';
        colname[13]:='Lt.Magenta';
        colname[14]:='Yellow';
        colname[15]:='Brt. White';
end;
{print top of box}
procedure top;
var     i:integer;
begin
        write(file2,bfcdef,lsp,chr(32),chr(8),'  ');
        bfc[6]:=chr(0);  bfc[12]:=chr(7);
        if colprt then oc[1]:=chr(32) else oc[1]:='*';
        write(file2,bfc);
        for i:=1 to 82 do
                write(file2,oc);
        writeln(file2);
end;
{ list line }
procedure list(len:integer);
var     j,b,bk,c,k:integer;
begin
```

```
for j:=1 to len do begin
        oc[1]:=chr(chra^);
        if (ord(oc[1])<32) then oc[1]:=chr(32);
        chra.r:=chra.r + 1;
        k:=ord(chra^);
        colsplit(k,b,bk,c);
        case bk of
        0:      [bk:=7];
        1:      [bk:=1];
        2:      [bk:=4];
        3:      [bk:=5];
        4:      [bk:=2];
        5:      [bk:=3];
        6:      [bk:=6];
        7:      [bk:=7]
        end;
            bfc[6]:=chr(bk);
            if c > 7 then c:=c-8;
            case c of
            0:      [if bk = 0 then c:=7 else c:=0];
            1:      [c:=1];
            2:      [c:=4];
            3:      [c:=5];
            4:      [c:=2];
            5:      [c:=3];
            6:      [c:=6];
            7:      [if bk = 7 then c:=0 else c:=7];
            end;
            bfc[12]:=chr(c);
            write(file2,bfc,oc);
            chra.r:=chra.r+1;
        end;
end;
{ read and print screen }
procedure lstscr;
var     i,j,l:integer;

begin
        chra.s:=16#b800;
        chra.r:= 16#1000;       {page 1}
        l:=0;
        write(file2,cpi17);
        write(file2,lsp,'   12345678901234567890123456789012345678 90');
        writeln(file2,'12345678901234567890123456789012345678 90');
        top;
        for i:=1 to 24 do begin
        write(file2,bfcdef,lsp,i:2);            {left margin}
        bfc[6]:=chr(0); bfc[12]:=chr(7);
        if colprt then oc[1]:=chr(32) else oc[1]:='*';     {box left}
        write(file2,bfc,oc);
        list(80);
        bfc[6]:=chr(0); bfc[12]:=chr(7);
        if colprt then oc[1]:=chr(32) else oc[1]:='*';     {box right}
        write(file2,bfc,oc);
        writeln(file2);
        end;
        top;
        bfc[6]:=chr(7); bfc[12]:=chr(0);
        writeln(file2,bfcdef);
```

```
end;
{ print color names }
procedure prtcolor(vars color:integer);
var chrc,bakc,bl:integer;
begin
        chrc:=color mod 16;
        color:=color div 16;
        bakc:=color mod 8;
        bl:=color div 8;
        write(file2,colname[chrc],'/',colname[bakc]);
        if bl=1 then write(file2,'+blink');
end;
{ Page Header }
procedure pagehead;
var     i,j:integer;

begin
        oc[1]:=chr(12);         {form feed}
        writeln(file2,oc,cpi10,bfcdef);
        j:=0;
        kname:=oname;
        writeln(file2,'Screen Generation Compiler');
        write(file2,'Version 1.0, Copyright Syndetic Corp. 1986');
        writeln(file2,'              ',kname,'    Page ',pg:5);
end;
{ write out function messages}
procedure writfunc;
begin
        if funcmsg[1] <> null then
        [chra:=ads funcmsg[1];
        chra.r:=chra.r+1;
        write(file2,cpi10);
        writeln(file2,'        Standard Function Key Message');
        oc[1]:=chr(32);write(file2,cpi17,lsp,oc,oc,oc,oc,oc);
        ln:=0;
        list(80)];
        writeln(file2,cpi10,bfcdef);
        if funcmsg[2] <> null then
        [chra:=ads funcmsg[2];
        chra.r:=chra.r+1;
        writeln(file2,'        Control/Function Key Message');
        oc[1]:=chr(32);write(file2,cpi17,lsp,oc,oc,oc,oc,oc);
        list(80)];
        writeln(file2,cpi10,bfcdef);
        if funcmsg[3] <> null then
        [chra:=ads funcmsg[3];
        chra.r:=chra.r+1;
        writeln(file2,'        Alternate/Function Key Message');
        oc[1]:=chr(32);write(file2,cpi17,lsp,oc,oc,oc,oc,oc);
        list(80)];
        writeln(file2,cpi10,bfcdef);
        if funcmsg[4] <> null then
        [chra:=ads funcmsg[4];
        chra.r:=chra.r+1;
        writeln(file2,'        Shift/Function Key Message');
        oc[1]:=chr(32);write(file2,cpi17,lsp,oc,oc,oc,oc,oc);
        list(80)];
        writeln(file2,cpi10,bfcdef);
```

```
end;
{ Macro information}
procedure writmac;
var     i:integer;
begin
        writeln(file2,cpi10);
        writeln(file2,'                                    Name: ',kname);
        writeln(file2,'                            Monitor Size: ',monsz);
        writeln(file2,'                            Display Page: ',dpage);
        writeln(file2,'                   Origin (row,column): ',roworg,
                                colorg);
        writeln(file2,'          Display Size (rows,columns): ',rowsz,
                                colsz);
        write(file2,'                    Background Color: ');
        i:=bakcol;prtcolor(i);writeln(file2);
        writeln(file2);
        writeln(file2,'              Number of Data Fields: ',ndats);
        writeln(file2,'             Number of Label Fields: ',nlabs);
        writeln(file2,'               Number of Help Marks: ',nhelps);
        if (disedc and 32) <>0 then
        writeln(file2,'    CTRL/RTN generated on cursor wrap around.');
        if (disedc and 64) <>0 then
        writeln(file2,'    Keyboard cleared on entry to display');
        writeln(file2,bfcdef);
end;
{Print control keys}
procedure prtkeys;
begin
        if v1[1] then write(file2,'Inp ');
        if v1[2] then write(file2,'Rqd ');
        if v1[3] then write(file2,'Dis ');
        if v1[4] then write(file2,'MDF ');
        if v1[5] then write(file2,'ROC ');
        if v1[6] then write(file2,'DOC ');
        if eop=13 then
                [if v1[7] then write(file2,'ILB ');
                if v1[8] then write(file2,'ITB ')];
        if (eop=14) or (eop=15) then
                [if v1[8] then write(file2,'NPZ ')];
        if (eop>13) and (eop < 17) then begin
                if fr1[1] then write(file2,'LJ  ');
                if fr1[2] then write(file2,'RJ  ');
                if fr1[3] then write(file2,'Cen ');
                if fr1[10] then write(file2,'CTs ');
                if fr1[4] and (lchr<>null) then
                        write(file2,'L,',lchr,' ');
                if (not fr1[4]) and (lchr<>null) then
                        write(file2,'T,',lchr,' ');
                if eop<>16 then begin
                        if fr1[6] then write(file2,'-L  ')
                                else write(file2,'T-  ');
                        if fr1[7] then write(file2,'(-) ');
                        if fr1[8] then write(file2,'{-} ');
                        if fr1[9] then write(file2,'[-] ');
                        end;
                end;
        if eop =17 then begin
                if b1 then write(file2,'True=L,',bc1,' ')
                        else write(file2,'True=T,',bc1,' ');
```

```pascal
     if b2 then write(file2,'False=L,',bc2,' ')
          else write(file2,'False=T,',bc2,' ');
               if b3 then write(file2,'Deflt=T')
                    else write(file2,'Deflt=F');
               end;
          writeln(file2);
end;

{List Data Fields}
procedure dataprt;
var    i,ztype:Integer;
       bits:dimbits;
begin
     ln:=60;
     for i:=1 to ndats do begin
        editd:=datafil[i];
                                                  {bit sorting}
        bitsbyte(bits, editd.optd[3]);
           if bits[1]=1 then
              [if bits[2]=0 then ztype:=1 else ztype:=2];
           if bits[3]=1 then
              [if bits[2]=0 then ztype:=4 else ztype:=5];
           if bits[4]=1 then ztype:=8;
           if bits[5]=1 then ztype:=16;
           if bits[6]=1 then ztype:=32;
        case ztype of
              1:     [eop:=14];
              2:     [eop:=14];
              4:     [eop:=15];
              5:     [eop:=15];
              8:     [eop:=16];
             16:     [eop:=17];
             32:     [eop:=13];
        end;{case}
        optunpack(eop);
                                                  {page set-up}
        if ln>55 then begin
              pg:=pg+1;pagehead;
                                                  {column titles}
              write(file2,cpi10);
              write(file2,'                                ');
              writeln(file2,'Defined Data Fields');
              write(file2,cpi17);
              write(file2,' Sq Rw Cl Ln Type        ');
              writeln(file2,'Color Fields:  ');
              writeln(file2,'-------------------------------------------------');
              ln:=0;
        end;
                                                  {UL interface Vars}
        if v1[1] then begin
              write(file2,cpi10,
                    'Returned Variable: ',editd.iname);
              if editd.idxd[2] <>0 then
                    write(file2,'(',editd.idxd[2]:3,')');
              if v1[3] then write(file2,' / ');
        end;
if v1[3] then begin
     write(file2,cpi10,
           'Displayed Variable: ',editd.ddname);
```

```
            if editd.idxd[3] <>0 then
                    write(file2,'(',editd.idxd[3]:3,')');
end;
if (v1[1] or v1[3]) then [ln:=ln+1; writeln(file2)];
                                        {Decimal Interface, R}
if eop=14 then begin
    write(file2,cpi17);
    if fr1[5] then [ln:=ln+1;
        writeln(file2,'Fixed Decimal Format, Decimal Places =',
        editd.ofst[1]:2)];
    if not fr1[5] then begin
        ln:=ln+1;
        write(file2,'                    ');
        write(file2,'Decimal Place Variable: ',editd.decname);
                if editd.idxd[1] <>0 then
                        write(file2,'(',editd.idxd[1]:3,')');
                ln:=ln+1;writeln(file2);
        end;
end;
                                        {Sequence and stuff}
write(file2,cpi17);
write(file2,' ',i:3);                   {sequence}
write(file2,editd.rowd:3);              {row}
write(file2,editd.cold:3);              {column}
write(file2,editd.lend:3);              {length}
                                        {type}
case ztype of
        1:      [write(file2,' Real    ')];
        2:      [write(file2,' Real8   ')];
        4:      [write(file2,' Integer ')];
        5:      [write(file2,' Integer4')];
        8:      [write(file2,' Word    ')];
        16:     [write(file2,' Boolean ')];
        32:     [write(file2,' Lstring ')];
end;{case}
                                        {Colors of fields}
write(file2,cpi17);
if eop<>17 then
        [write(file2,'  +Dis:');prtcolor(editd.colord[1])];
if (eop=14) or (eop=15) then
        [write(file2,'  -Dis:');prtcolor(editd.colord[2])];
if eop=17 then
        [write(file2,'  True:');prtcolor(editd.colord[1]);
        write(file2,'  False:');prtcolor(editd.colord[2])];
write(file2,'  Inp:');prtcolor(editd.colord[3]);
write(file2,'  Err:');prtcolor(editd.colord[4]);
writeln(file2);         ln:=ln+2;
                                        {Controls}
write(file2,cpi10,'  Control Parameters:  ');
write(file2,cpi17);
prtkeys; writeln(file2,cpi10); ln:=ln+1;
    end;{loop}
end;{proc} procedure lstfah;
{list function key assignments and help marks}
var     i:integer;
```

```
begin
        pg:=pg+1;pagehead;
        writeln(file2,bfcdef);
        writeln(file2);
        write(file2,cpi10,'                              ');
        writeln(file2,'Function Key Definitions');
        writeln(file2);
        funcdisp;
        chra.s:=16#b800;
        chra.r:=480;
        for i:=1 to 20 do begin
        write(file2,cpi17,bfcdef,'                                ');
        list(80);
        writeln(file2);
        end;

if nhelps<1 then [return];
        writeln(file2,bfcdef);
        writeln(file2);
        writeln(file2);
        writeln(file2,cpi10,'                    Help Mark Definitions');
        writeln(file2,'   Function Key   Row   Col      Name      Color');
        for i:= 1 to nhelps do begin
        write(file2,helpfil[i].fncno:15);
        write(file2,helpfil[i].rowh:8);
        write(file2,helpfil[i].colh:6);
        write(file2,'  ');
        write(file2,helpfil[i].hname:10);
        write(file2,'  ');
        ln:=helpfil[i].colorh;prtcolor(ln);
        writeln(file2);
        end;
end;

{List Labels}
procedure lstlab;
var     i:integer;
begin
        ln:=60;
        for i:=1 to nlabs do begin
        if ln>55 then begin
        pg:=pg+1;pagehead;
        write(file2,cpi10,bfcdef,'                               ');
        writeln(file2,'Labels Defined');
        writeln(file2,cpi17,bfcdef,'       Seq  Row  Col    Label');
        ln:=0;
        end;
        write(file2,cpi17,bfcdef,i:11);
        write(file2,labelfil[i].rowl:5);
        write(file2,labelfil[i].coll:5,' ',cpi17);
        chra:=ads labelfil[i].titl^;
        chra.r:=chra.r+1;
        list(labelfil[i].lenl);
        writeln(file2);
        ln:=ln+1;
        end;
end;
{ Pascal Interface}
```

```
procedure pasitf;
var     i:integer;
begin
        pg:=pg+1;pagehead;
        writeln(file2);
        writeln(file2,cpi10);
        writeln(file2,'          Pascal Interface Code');
        writeln(file2);
        write(file2,'         FUNCTION ',kname,'L');
        if nvars<1 then [writeln(file2,':INTEGER;  EXTERN;')]
        else begin
                for i:=1 to nvars do begin
                if i=1 then write(file2,'(')
                        else write(file2,'                              ');
                write(file2,'vars ',varifl[i].vname);
                case varifl[i].vtype of
                1:      [write(file2,':REAL')];
                4:      [write(file2,':INTEGER')];
                8:      [write(file2,':WORD')];
                16:     [write(file2,':BOOLEAN')];
                32:     [write(file2,':LSTRING')];
                end; {case}
                if i<nvars then writeln(file2,';')
                else writeln(file2,'):INTEGER;  EXTERN;');
                end;{for begin}
        end;{else begin}
end;

{   --- MAIN PROGRAM   --- } var     v1,v2,v3,v4,v5:boolean;
        font:lstring(3);
begin
        colprt:=false;
        v1:=true; v2:=false; v3:=true; v4:=false; v5:=true;
        eop:=cleared+sgc25l(v1,v2,v3,v4,v5,colprt);
        eop:=backgrd+labels+displayd;
        eop:=keyin;
        if eop=2 then return;
        pg:=1;
        assign(file2,'lpt1');
        rewrite(file2);
        initprt;
        writeln(file2,bfcdef);
        font[0]:=chr(3);
        font[1]:=chr(27);
        font[2]:=chr(73);
        font[3]:=chr(2);
        writeln(file2,font,bfcdef);
        pagehead;
if v1 then
        [writeln(file2);
        writeln(file2);
        writeln(file2);
        writeln(file2);
        lstscr;
        writeln(file2);
        writeln(file2);
        writfunc;
```

```
        writeln(file2);
        writmac];
if v2 then
        dataprt;
if v3 then
        lstfah;
if v4 then
        lstlab;
if v5 then
        pasitf;
close(file2);
end;
end.
{ END OF SGCRPT LISTING }
{ SCREEN GENERATION COMPILER (SGC) - Source Code documentation        }
{ Copyright(c) 1987 Syndetic Corporation. All Rights Reserved          }
{----- SGC program tertiary module -----}
{      General Screen & keyboard procs  }
module sgcgp1 [];
(*
{$debug+}
{$line+}
*)
var     [extern]        file1,file2:text;

{ Type Declarations } type    dimbits=array [1..8] of integer;

{ Global Variable Declarations } var [extern]

{ Display Value Parameters and Variables } masop:integer;    {master (outer) function number}
        monsz:integer;         {Monitor size, 40, or 80 }
        dpage:integer;    {screen page for display}
        roworg:integer;        {Display row origin}
        colorg:integer;        {Display column origin}
        rowsz:integer;    {Row size of Display}
        colsz:integer;    {Column Size of Display}
        disedc:integer;        {Edit control of Display}
        bakcol:integer;        {Background Color}

{ Working Variables } zname:lstring(20);
        dname:lstring(8);
        field:integer;
        error:boolean;
        funct,cntlt,altt,shftt:boolean;
        db,dw,dd:lstring(13);
        dwo:lstring(20);

{ Color Library Variables }
```

```
        nolib:integer;              {library size}
        nopnt:integer;
        colib:array [1..20] of integer;        {library}

{color working variables } msg1:lstring(20);
        msg2:lstring(20);
        msg3:lstring(20);
        msg4:lstring(20);
        libmsg:lstring(20);

{ Label definition file} type    link = ads of titldat;
        titldat = lstring (160);

type    labelrec=record
                rowl:integer;
                coll:integer;
                lenl:integer;
                seql:integer;
                titl:link;
                xnam:lstring(5);
        end;  {labelrec} var [extern]
        labelfil:array [1..150] of labelrec;
        nlabs:integer;
        labpnt:integer;
        labcolor:integer;
        labptr:link;
        newentry:boolean;
        row,col,len,curpos,dtype:integer;
        seqm:integer;
        out:lstring(80);
        lbname:lstring(5);

{ Data File Definition } type datarec=record
        rowd,cold,lend,seqd:integer;
        colord:array [1..4] of integer;
        optd:array [1..5] of integer;
        ofst:array [1..3] of integer;
        idxd:array [1..3] of word;
        iname,ddname,decname:lstring(20);
end;
var [extern]
        datafil:array [1..150] of datarec;
        ndats,datpnt:integer;

{ Function Key Data Variables }
```

```
type    funcrec = record
                faction:integer;
                fvalue:integer;
                end;

funsetr = record
                key:lstring(8);
                code:integer;
                end;

var [extern]
        funcfil:array [1..40] of funcrec;
        funcset:array [1..22] of funsetr;
        funcmsg:array [1..4] of titldat;
        inot:lstring(8);
        nfunset:integer;

{ Interface Variable File } type    variflrec = record
                vname:lstring(20);
                vtype:integer;
                vxna:lstring(5);
                end;

var     [extern]
        varifl:array [1..100] of variflrec;
        nvars:integer;

{ Help Table File } type    helprec = record
                fncno:integer;
                rowh:integer;
                colh:integer;
                colorh:integer;
                hname:lstring(8);
                end;

var     [extern]
        helpfil:array [1..40] of helprec;
        nhelps:integer;

eop:integer;
        editd:datarec;

{ Compiler variable initial defaults} var [extern]
        strd:datarec;   {string data field}
        reald:datarec;  {real data field}
        intd:datarec;   {integer data field}
        wordd:datarec;  {word data field}
        boold:datarec;  {boolean data field}
```

```
function FIRDIS(vars name:lstring):integer; extern; {set first display}
function LASDIS(vars name:lstring):integer; extern; {set last display}
function BACKGRD:integer; extern;              {clear background}
function LABELS:integer; extern;               {Draw labels}
function MARKFLD:integer; extern;              {mark data fields}
function DISPLAYD:integer; extern;             {Display data values}
function READD:integer; extern;
function KEYIN:integer; extern;                {Input with keyboard}
function RENKEYIN:integer; extern;             {Re-enter keyboard inp}
function CLEARED:integer; extern;              {Clear editor of links}
function GETCURFLD(vars NAME:lstring;          {Get cursor field}
            vars FIELD:integer):integer; extern;
function SETCURFLD(vars NAME:lstring;          {Set cursor field}
            vars FIELD:integer):integer; extern;
function CURSORPOS(vars NAME:lstring;       {Get cursor name,row,col}
            vars ROW:integer;
            vars COLUMN:integer):integer; extern;
function SETCOLOR(vars NAME:lstring;           {Set field color}
            vars FIELD:integer;
            vars COLOR:integer):integer; extern;
function SETERROR(vars NAME:lstring;        {Set field to error color}
            vars FIELD:integer):integer; extern;
function SETORIGIN(vars NAME:lstring;          {Set display origin}
            vars ROW:integer;
            vars COLUMN:integer):integer; extern;
function SETBAKCOL(vars NAME:lstring;          {Set background color}
            vars COLOR:integer):integer; extern;
function SETLABFLD(vars NAME:lstring;          {Set label limits}
            vars FIRST:integer;
            vars LAST:integer):integer; extern;
function SETDATFLD(vars NAME:lstring;          {Set data field limits}
            vars FIRST:integer;
            vars LAST:integer):integer; extern;
function SETPAGE( vars NAME:lstring;           {Set display page}
            vars PAGE:integer):integer; extern;
function SCROLROW(vars NAME:lstring;           {scroll up or down}
            vars ROWS:integer):integer; extern;
function SCROLCOL(vars NAME:lstring;           {scroll right or left}
            vars COLUMNS:integer):integer; extern;
procedure sgcrepo; extern;
procedure readfil; extern;
procedure readfili( vars va:boolean); extern;
procedure writefil; extern;

procedure nulnam(consts len : integer; vars name : lstring); extern;

{ Non-general SGC utilities } function setedii(vars name:lstring;      {set edit display size}
            vars rows:integer;
            vars cols:integer):integer;
    extern;
{ keyin for cursor position edit}
function kexin:integer;
    extern;
{keyin for lable, data field declaration}
function kezin(vars roworg:integer;
```

```
            vars colorg:integer;
            vars rowsz:integer;
            vars colsz:integer;
            vars dtype:integer;
            vars row:integer;
            vars column:integer;
            vars length:integer;
            vars curpos:integer;
            vars color:integer):integer;
    extern;

{ Get label from screen } function getlabel(vars name:lstring;
            vars len:integer;
            vars roworg:integer;
            vars colorg:integer;
            vars row:integer;
            vars col:integer):integer;
    extern;
{ Display label on screen } function dislabel(vars name:lstring;
            vars len:integer;
            vars roworg:integer;
            vars colorg:integer;
            vars row:integer;
            vars col:integer):integer;
    extern;

{Screen Links}

{ Link Screen Testl }
{$include:'\sgcscr\sgcscrlb.pas'}
(* * * *  I N C L U D E   R E P L A C E S   T H E S E  * * * *
FUNCTION SGC2L(vars monsz:INTEGER;
        vars dpage:INTEGER;
        vars roworg:INTEGER;
        vars colorg:INTEGER;
        vars rowsz:INTEGER;
        vars colsz:INTEGER;
        vars colmsg:LSTRING;
        vars v2:BOOLEAN;
        vars v3:BOOLEAN;
        vars v4:BOOLEAN;
        vars v5:BOOLEAN;
        vars v6:BOOLEAN):INTEGER;  EXTERN;

{ Color Palette Input }

FUNCTION SGC3L(vars libno:INTEGER;
        vars field:INTEGER;
        vars msg1:LSTRING;
        vars msg2:LSTRING;
        vars msg3:LSTRING;
        vars msg4:LSTRING):INTEGER;  EXTERN;
```

{ Color Library }

```pascal
function sgc3lbl(vars libnum:integer;
            vars libmsg:lstring):integer;
    extern;

{ Function Key input edit }

FUNCTION SGC14l(vars vv:LSTRING):INTEGER;   EXTERN;

{ Function Key Label Edit } function sgc15l:integer;        extern;

* * * *   E N D   O F   C O M M E N T E D   P A R T   * * * *)

{ Processing procedures }

{ get bits from a byte }
procedure bitsbyte(vars bits:dimbits; vars bytes:integer) [public];
var     j,i:integer;
begin
        j:=bytes;
        for i:= 1 to 8 do
                begin
                        bits[i]:=j mod 2;
                        j:= j div 2;
                end; {for}
end; {bitsbyte}
{ pack bits into byte }
procedure bytebits(vars bits:dimbits;vars bytes:integer) [public];
var i:integer;
begin
        bytes:=0;
        for i:= 8 downto 1 do
                begin
                        bytes:= bytes*2 +bits[i];
                end; {for}
end; {bytebits}
{ Split color into components}
procedure colsplit(color:integer;
            vars blink:integer;
            vars bakcol:integer;
            vars chrcol:integer)   [public];
    begin
            chrcol:=color mod 16;
            color:=color div 16;
            bakcol:=color mod 8;
            blink:= color div 8;
    end; {procedure}

{ Pack color from components }
function colpak(blink:integer;
            bakcol:integer;
            chrcol:integer):integer;
```

```
        begin
                colpak:=(blink*8 + bakcol)*16 +chrcol;
        end; {procedure}
{ Enter New color in color library }
procedure clibstor(consts color:integer) [public];
var     i:integer;
begin
        for i:= 1 to nolib do
                begin
                        if colib[i] = color then [return];
                end;  {for}
        if nolib < 20 then
                begin
                        nolib:=nolib+1; nopnt:=nolib;
                        colib[nolib]:=color;
                end
        else    begin
                        nopnt:=nopnt+1;
                        if nopnt > 20 then nopnt:= 1;
                        colib[nopnt]:=color;
                end; {else}
end;    {clibstor}

{ LIBRARY COLOR DISPLAY } procedure libcol;
var     j:integer;
        row:integer;
        col:integer;
        nam:lstring(8);
        lop:integer;
        i:integer;
begin
        nam:='SGC3Lb';
        nulnam(7,nam);
        col:=63;
        lop:=cleared+sgc3lbl(j,libmsg);            {library link}
        for i := 1 to nolib do
                begin
                        j:=i;
                        row:=i+2;
                        lop:= setorigin(nam,row,col);
                        lop:= displayd;
                        j:=2;
                        lop:=setcolor(nam,j,colib[i]);
                end; {do}
        nam:='sgc3lB';
end;    {libcol}

{ COLOR PALETTE & INPUT } procedure palette(vars numcols:integer;
            vars col1,col2,col3,col4:integer) [public];

var     cop:integer;
        field:integer;
```

```
            libno:integer;
            nam:lstring(8);
            zop:integer;
            blink:integer;
            chrcol:integer;
            bakcol:integer;
    label 100,101;
    begin
            field:=1; libno:=0;
            nam:='SGC3';
            nulnam(4,nam);
            cop:=cleared +sgc3l(libno,field,msg1,msg2,msg3,msg4);
            cop:=backgrd+labels;
            libcol;                 {display library}
            cop:=cleared +sgc3l(libno,field,msg1,msg2,msg3,msg4);
            cop:=displayd;
    101:    field:=3; cop:=setcolor(nam,field,col1);
            if numcols >1 then [field:=4; cop:=setcolor(nam,field,col2)];
            if numcols >2 then [field:=5; cop:=setcolor(nam,field,col3)];
            if numcols >3 then [field:=6; cop:=setcolor(nam,field,col4)];
      100:  cop:=keyin;
            if cop < 10 then
                    case cop of
                    0,1,2,5,6:      begin
                            clibstor(col1);
                            if numcols >1 then [clibstor(col2)];
                            if numcols >2 then [clibstor(col3)];
                            if numcols >3 then [clibstor(col4)];
                            return;
                            end;
                    3,4:    begin
                            zop:=readd;
                            if (field < 1) or (field > numcols) then
                                    begin
                                    field:=2; zop:=seterror(nam,field);
                                    goto 100;
                                    end
                            else if (libno <1) or (libno > nolib) then
                                    begin
                                    field:=1; zop:=seterror(nam,field);
                                    goto 100;
                                    end
                            else case field of
                                    1: [col1:=colib[libno]];
                                    2: [col2:=colib[libno]];
                                    3: [col3:=colib[libno]];
                                    4: [col4:=colib[libno]];
                                    end; {case}
                            goto 101;
                            end;   {begin}
                    otherwise [];
                    end; {case}
            zop:=readd;
            if (field <1) or (field > numcols) then
                    begin
                            field:=2; zop:=seterror(nam,field);
                            goto 100;
```

```
                end;
        case field of
                1:[colsplit(col1,blink,bakcol,chrcol)];
                2:[colsplit(col2,blink,bakcol,chrcol)];
                3:[colsplit(col3,blink,bakcol,chrcol)];
                4:[colsplit(col4,blink,bakcol,chrcol)];
        end;   {case}
        if cop <19 then [chrcol:=cop-11]
                else if cop = 19 then
                        if blink = 1 then blink:=0
                                else blink:=1;
        if cop in [21..28] then chrcol:=cop-13;
        if cop in [41..48] then bakcol:=cop-41;

case field of
                1: [col1:=colpak(blink,bakcol,chrcol)];
                2: [col2:=colpak(blink,bakcol,chrcol)];
                3: [col3:=colpak(blink,bakcol,chrcol)];
                4: [col4:=colpak(blink,bakcol,chrcol)];
        end;   {case}
        goto 101;
end;

{read Macro Information Screen.   ERROR returned false if o.k.
                                  ERROR returned true if found} procedure readsgc2;

var kop:integer;

begin
        kop:=readd; {read screen data}
        error:=false;
        dname:='SGC2';
        nulnam(5,dname);
        if not((monsz = 40)or(monsz = 80)) then
                begin
                        field:=1; {error Field}
                        kop:=seterror(dname,field);
                        error:=true;
                end;
        if(dpage <0)or(dpage >2)then
                begin
                        field:=2; {error Field}
                        kop:=seterror(dname,field);
                        error:=true;
                end;
        if(roworg<1)or(roworg > 24)then
                begin
                        field:=3; {error Field}
                        kop:=seterror(dname,field);
                        error:=true;
                end;
        if(colorg<1)or(roworg > monsz)then
                begin
                        field:=3; {error Field}
                        kop:=seterror(dname,field);
                        error:=true;
```

```
                    end;
        if(rowsz + roworg -1> 24) or(rowsz < 1)then
                begin
                        field:=5; {error Field}
                        kop:=seterror(dname,field);
                        error:=true;
                end;
        if(colsz + colorg -1> monsz) or(colsz < 1)then
                begin
                        field:=6; {error Field}
                        kop:=seterror(dname,field);
                        error:=true;
                end;
        dname:='sgc2';
end;    {function readsgc2}

{ Macro Information Procedure } procedure macroinfo [public];

var     bits:dimbits;
        masop:integer;
        colmsg:lstring(6);
        dummy:integer;
        ncol:integer;
        nam:lstring(8);
        v2,v3,v4,v5,v6:boolean;

label   4,5,6;

begin
        colmsg:=' ABCD ';
        nam:='SGC2';
        nulnam(5,nam);
  6:    masop:=cleared;
        masop:=sgc2l(monsz,dpage,roworg,colorg,rowsz,colsz,colmsg,
                v2,v3,v4,v5,v6);
  4:    masop:=backgrd+labels;
        bitsbyte(bits,disedc);   {crack edit controly byte}
                if bits[3]=0 then v2:=false else v2:=true;
                if bits[4]=0 then v3:=false else v3:=true;
                if bits[5]=0 then v4:=false else v4:=true;
                if bits[6]=0 then v5:=false else v5:=true;
                if bits[7]=0 then v6:=false else v6:=true;
        masop:=displayd;
        readsgc2;
        masop:=7; masop:=setcolor(nam,masop,bakcol);
  5:    masop:=keyin;
        case masop of
                1..4:   begin   {cntl return}
                                readsgc2;
                                if error=true then goto 5;
                        end;
                11:     begin   { color }
                                readsgc2;
                                msg1:='1  Display Backgrd  ';
```

```
                                msg2:=null;
                                msg3:=null;
                                msg4:=null;
                                dummy:=0;
                                ncol:=1;
                                palette(ncol,bakcol,dummy,dummy,dummy);
                                goto 6;
                                end;
        12,13,14,15,16:         begin
                                readsgc2;
                                if bits[masop-9]=0 then bits[masop-9]:=1
                                                   else bits[masop-9]:=0;
                                bytebits(bits,disedc);
                                goto 4;
                                end;
                otherwise [];
        end;    {case}
        nam:='sgc2';
end;

{ Function Key Message Edit } procedure funcedlab(nolab:integer);
var     frow,fcol,frsz,fcsz:integer;
        flen,fcur,fcolor,ftype:integer;
        row,col,flop,ncols,dummy:integer;
        nam:lstring(8);

label   200,201;

begin
        fcolor:=bakcol;fcur:=0;
200:    frow:=1;fcol:=1;col:=1;row:=nolab+19;frsz:=24;fcsz:=80;
        flen:=80;ftype:=0;nam:='sgc15';nulnam(6,nam);
        flop:=cleared+sgc15l;
201:    flop:=kezin(frow,fcol,frsz,fcsz,ftype,
                    row,col,flen,fcur,fcolor);
        case flop of
        0,2:    [return];

1:      [flen:=80;
                flop:=getlabel(funcmsg[nolab],flen,frow,fcol,row,col);
                return];
        11:     [ncols:=1;msg1:=' 1..Message Color   ';
                msg2:=null;msg3:=null;msg4:=null;
                palette(ncols,fcolor,dummy,dummy,dummy);
                goto 200];
        24:     [funcmsg[nolab]:=null;goto 200];
        otherwise goto 200;
        end;{case}
end;{edit}

{ Display Function Key Definitions } procedure funcdisp [public];
var     fdop,i,j,k,l,rowo,colo,row,col,len:integer;
        nam:lstring(8);
```

```
begin
        nam:='SGC14';
        nulnam(6,nam);
        fdop:=cleared+sgc14l(inot); fdop:=backgrd+labels+markfld;
        for i:=1 to 40 do begin
        if funcfil[i].faction <>0 then begin
                for l:= 1 to nfunset do
                if funcfil[i].faction=funcset[l].code then
                        inot:=funcset[l].key;
                j:=i;fdop:=setdatfld(nam,j,j)+displayd;
                end; {begin}
        end; {for i}
        j:=1;k:=40;fdop:=setdatfld(nam,j,k);     {restore}

{ display labels }
        fdop:= cleared+sgc15l;
        rowo:=1;colo:=1;
        for i:= 1 to 4 do
                if funcmsg[i] <> null then
                        [col:=1;row:=i+19;len:=80;
                        fdop:=dislabel(funcmsg[i],len,rowo,colo,
                                                row,col)];
end;{funcdisp}

{ read function data from screen } procedure readfunc;
var i,j,k,l,frop:integer;
        nam:lstring(8);

label 401;

begin
        error:= false;
        nam:='SGC14';
        nulnam(6,nam);
        for i:= 1 to 40 do begin
                j:=i;frop:=setdatfld(nam,j,j);
                frop:=readd;
                if inot = null then [funcfil[i].faction:=0;
                                    funcfil[i].fvalue:=0]
                else begin
                        for j:= 1 to nfunset do begin
                        if inot = funcset[j].key then
                                [funcfil[i].faction:=funcset[j].code;
                                goto 401];
                        end; {for j}
                    error:=true;l:=i; frop:=seterror(nam,l);
401:                funcfil[i].fvalue:=i+10;
                    end;  {else}
        end; {for i}
        l:=1;k:=40;frop:=setdatfld(nam,l,k);    {restore sets}
end; {readfunc}

{---------------------------------}
{ Function key Edit               }
{---------------------------------}
```

```
procedure funkedit [public];
var fedo,msg:integer;
        nam:lstring(8);

label   402;

begin
        nam:='SGC14';
        nulnam(6,nam);
        funcdisp;                       {display existing data}
402:    fedo:= cleared + sgc14l(inot);
        fedo:= keyin;

case fedo of
        1..4:   [readfunc; if error then goto 402;
                return];
        11:     [msg:=1;
                funcedlab(msg);
                goto 402];
        12:     [msg:=2;
                funcedlab(msg);
                goto 402];
        13:     [msg:=3;
                funcedlab(msg);
                goto 402];
        14:     [msg:=4;
                funcedlab(msg);
                goto 402];
        otherwise [];
        end; {case}
end;
end.

{ END OF SGCGP1.PAS LISTING }

; EDIT.ASM
; SCREEN GENERATION COMPILER (SGC) - Source Code documentation
; Copyright(c) 1987 Syndetic Corporation. All Rights Reserved
; ----- SGC program support module (assembly routine) -----
;
title EDIT ASSEMBLER ROUTINE GROUP ONE
        name edit
        extrn disdat:near
        extrn reddat:near
        extrn keybrd:near
        extrn keybrda:near
        extrn keybrdb:near
        extrn hlppos:near
        extrn cfnc0:near
        extrn cursor:near
        extrn segset:near
        extrn segrtn:near
        extrn renfld:near
        extrn resc:near
        extrn fldpos:near
  edit    segment byte public 'code'
        assume ds:edit,cs:edit,es:nothing
```

```
        subttl PASCAL INTERFACE ROUTINES
        page
        public curofff
curofff proc near
;ret
        mov ah,1
        mov ch,10          ;first cursor line
        mov cl,13
        int 10h
        ret
curofff endp
        public backgrd
backgrd proc far           ;color background
        push bp            ;save
        mov bp,sp          ;get internal frame ptr
        mov ax,0           ;args to skip
        call setertn       ;set error return
        call curofff       ;turn cursor off
        mov ax,3           ;erase option
        call editop        ;execute
        mov ax,1           ;completion key
        jmp rtnstd
backgrd endp
        public labels
labels  proc far           ;label display
        push bp            ;save
        mov bp,sp          ;get internal frame ptr
        mov ax,0           ;args to skip
        call setertn       ;set error return
        call curofff       ;turn cursor off
        mov ax,1           ;label option
        call editop
        mov ax,1           ;completion key
        jmp rtnstd
labels  endp
        public markfld
markfld proc far           ;mark data fields
        push bp            ;save
        mov bp,sp          ;get internal frame ptr
        mov ax,0           ;args to skip
        call setertn       ;set error return
        call curofff       ;turn cursor off
        mov ax,2           ;mark data fields option
        call editop        ;execute
        mov ax,1           ;completion key
        jmp rtnstd
markfld endp
        public displayd
displayd proc far          ;display data in fields
        push bp            ;save
        mov bp,sp          ;get internal frame ptr
        mov ax,0           ;args to skip
        call setertn       ;set error return
        call curofff       ;turn cursor off
        mov ax,4           ;display data fields
        call editop        ;execute
        mov ax,1           ;completion key
        jmp rtnstd
displayd endp
        public readd
readd   proc far           ;read screen data
        push bp            ;save
```

```
                mov  bp,sp          ;get internal frame ptr
                mov  ax,0           ;args to skip
                call setertn        ;set error return
                mov  ax,5           ;read screen data
                call editop         ;execute
                mov  ax,1           ;completion key
                jmp  rtnstd
readd   endp
public keyin
keyin   proc far            ;keyboard input
                push bp             ;save
                mov  bp,sp          ;get internal frame ptr
                mov  ax,0           ;args to skip
                call setertn        ;set error return
                call curofff        ;turn cursor off
                call keybrda        ;keyboard on
                jmp  rtnstd
keyin   endp
public renkeyin
renkeyin proc far           ;keyboard input
                push bp             ;save
                mov  bp,sp          ;get internal frame ptr
                mov  ax,0           ;args to skip
                call setertn        ;set error return
                call curofff        ;turn cursor off
                call keybrdb        ;keyboard on
                jmp  rtnstd
renkeyin endp
public cleared
cleared proc far            ;clear editer links
;
;   this routine clears all the editor sets
;
                push bp                     ;save bp for return
                mov  bp,sp          ;set bp to sp for internal use
                mov  ax,0
                call setertn        ;set up error return routine
                mov  di, offset edittab  ;set up es,di
                mov  dx,seg edittab
                mov  es,dx
                sub  ax,ax          ;zero
                mov  word ptr es:[di],ax
                mov  word ptr es:[di+2],ax
                mov  byte ptr es:[di+29],al
                mov  ax,1           ;norm completion flag
                jmp  rtnstd
cleared endp
public getcurfld
getcurfld proc far          ;return screen name and field #
;
;   This routine returns the screen number and data field number
;   of the cursor at the time an exist was taken.
;
;   =getcurfld(name:lstrin(8),Field#:integer)
;
                push bp                     ;save bp for return
                mov  bp,sp          ;set bp to sp for internal use
                mov  ax,10
                call setertn        ;set up error return routine
                mov  si, offset edittab  ;set up ds,si
                mov  dx,seg edittab
                mov  ds,dx
```

```
        push bp
        call resc           ;re-enter screen set
        pop bp
        mov al,es:[di+1]        ;screen number
        sub ah,ah           ;ax has screen no
        mov dl,[si+13]  ;field no
        sub dh,dh           ;dx has field number
        inc dx              ;add one for to start count at one
        lds si,dword ptr[bp+6]   ;field no address
        mov word ptr[si],dx      ;return field no
        lds si,dword ptr[bp+10]         ;screen # address
        mul byte ptr es:[di+22]         ;screen by table width
        add ax,56           ;offset to name
        mov cl,es:[di]  ;len of name
        sub ch,ch
        inc cx  ;mov len too
cursfl1: mov al,es:[di] ;get name chr
        mov byte ptr [si],al    ;mov to name
        inc di
        inc si
        loop short cursfl1
        mov ax,1            ;complete key
        jmp rtnstd
getcurfld endp
public setcurfld
setcurfld proc far      ;set cursor position for first edit
; SCREEN GENERATION COMPILER (SGC) - Source Code documentation
; Copyright(c) 1987 Syndetic Corporation. All Rights Reserved
; ----- SGC program support module (assembly routine) -----
;
;
;   SETCURFLD(NAME,FIELD#)
;
        push bp                     ;save bp for return
        mov bp,sp       ;set bp to sp for internal use
        mov ax,10       ;two argument routine, skip 10 bytes on return
        call setertn    ;set up error return routine
        mov di, offset edittab  ;set up es,di
        mov dx,seg edittab
        mov es,dx
        lds si,dword ptr[bp+10]         ;load ds,si to display name
        push bp
        call edpcl      ;match name to link
                        ;will return only if found
        dec al
        mov byte ptr es:[di+29],al      ;save  number
        pop bp
        les di,dword ptr[bp+6]  ;field no addr
        mov ax,es:[di]  ;load in ax
        dec ax              ;subtract one to start field count at zero
        cmp al,[si+18]  ;less than first
        jge short scurf1
        mov al,[si+18]
scurf1: cmp al,[si+19]  ;greater than last?
        jle short scurf2
        mov al,[si+19]
scurf2: mov byte ptr[si+34],al  ;set first value
        jmp rtnstd
setcurfld endp
public setpage
setpage proc far        ;set display page
;
```

```
;   SETPAGE(NAME,PAGE#)
;
        push bp                 ;save bp for return
        mov bp,sp               ;set bp to sp for internal use
        mov ax,10               ;two argument routine, skip 10 bytes on return
        call setertn            ;set up error return routine
        mov di, offset edittab  ;set up es,di
        mov dx,seg edittab
        mov es,dx
        lds si,dword ptr[bp+10]         ;load ds,si to display name
        push bp
        call edpcl      ;match name to link
                        ;will return only if found
        pop bp
        les di,dword ptr[bp+6]   ;field no addr
        mov ax,es:[di]   ;load in ax
        cmp al,0         ;less than first
        jge short spage1
        mov al,0
spage1: cmp al,3         ;greater than last?
        jle short spage2
        mov al,3
spage2: mov byte ptr[si+44],al   ;set first value
        mov bl,al
        sub bh,bh
        shl bx,1
        add bx,offset link1
        mov ax,cs:[bx]
        mov word ptr[si+22],ax
        jmp rtnstd
setpage endp
public cursorpos
cursorpos proc far      ;return screen name, row & col of cursor
;
;   This routine returns the screen name and the row and column of the
;           cursor at the time an exist was taken.
;
;   =cursorpos(name:lstrin(8),row:integer,column:integer)
;
        push bp                 ;save bp for return
        mov bp,sp               ;set bp to sp for internal use
        mov ax,14
        call setertn    ;set up error return routine
        mov si, offset edittab  ;set up ds,si
        mov dx,seg edittab
        mov ds,dx
        push bp
        call resc       ;re-enter screen set
        pop bp
        mov al,[si+13]  ;get current fld no
        sub ah,ah
        call fldpos     ;table pos
        mov al,[bx]     ;row #
        sub ah,ah
        inc ax
        mov dl,[bx+1]   ;fld col org
        sub dh,dh
        add dl,[si+35]  ;cursor offset
        inc dx
        push si
        push ds
        lds si,dword ptr[bp+6]   ;col addr
```

```
            mov word ptr[si],dx      ;stor col
            lds si,dword ptr[bp+10]           ;row addr
            mov word ptr[si],ax      ;save row
            pop ds
            pop si
            mov al,es:[di+1]         ;screen number
            sub ah,ah         ;ax has screen no
            lds si,dword ptr[bp+14]           ;screen # address
            mul byte ptr es:[di+22]           ;screen by table width
            add ax,56         ;offset to name
            mov cl,es:[di]    ;len of name
            sub ch,ch
            inc cx   ;mov len too
curpos1:    mov al,es:[di]    ;get name chr
            mov byte ptr [si],al     ;mov to name
            inc di
            inc si
            loop short curpos1
            mov ax,1          ;complete key
            jmp rtnstd
cursorpos endp
public firdis
firdis  proc far         ;set first display
; SCREEN GENERATION COMPILER (SGC) - Source Code documentation
; Copyright(c) 1987 Syndetic Corporation. All Rights Reserved
; ----- SGC program support module (assembly routine) -----
;
;
;  This routine sets the first active display of all linked displays,
;
            push bp                  ;save bp for return
            mov bp,sp         ;set bp to sp for internal use
            mov ax,6          ;one argument routine, skip 6 bytes on return
            call setertn      ;set up error return routine
            mov di, offset edittab   ;set up es,di
            mov dx,seg edittab
            mov es,dx
            lds si,dword ptr[bp+6]   ;load ds,si to display name
            call edpcl        ;match name to link
                              ;will return only if found
            mov byte ptr[di+2],al    ;al has display number
            mov ax,1
            jmp rtnstd        ;make standard return
firdis  endp
public lasdis
lasdis  proc far         ;set last display
;
;  This routine sets the last active display of all linked displays,
;
            push bp                  ;save bp for return
            mov bp,sp         ;set bp to sp for internal use
            mov ax,6          ;one argument routine
            call setertn      ;set up error return routine
            mov di, offset edittab   ;set up es,di
            mov dx,seg edittab
            mov es,dx
            lds si,dword ptr[bp+6]   ;load ds,si to display name
            call edpcl        ;match name to link
                              ;will return only if found
            mov byte ptr[di+3],al    ;al has display number
            mov ax,1          ;norm completion flag
            jmp rtnstd        ;standard return
```

```
lasdis   endp
public setcolor
setcolor proc far          ;set field color
;
;   SETCOLOR(NAME,FIELD#,COLOR)
;
        push bp                          ;save bp for return
        mov bp,sp        ;set bp to sp for internal use
        mov ax,14        ;THREE argument routine, skip 14bytes on return
        call setertn     ;set up error return routine
        mov di, offset edittab  ;set up es,di
        mov dx,seg edittab
        mov es,dx
        lds si,dword ptr[bp+14]          ;load ds,si to display name
        push bp
        call edpcl       ;match name to link
                         ;will return only if found
        pop bp
        les di,dword ptr[bp+10]          ;field no addr
        mov ax,es:[di]   ;load in ax
        dec ax           ;field no's start at 0
        cmp al,[si+18]   ;first
        jl short setcol1            ;errorr, less than first
        cmp al,[si+19]   ;compare to last
        jle short setcol2
setcol1: mov ax,103      ;error code
        jmp errrtn       ;error--Does not return
setcol2: mov byte ptr[si+13],al ;set to current
        push ax          ;save
        call scrorg      ;set screen origin
        mov bx,[si+58]   ;set data table offset
        cmp bx,0
        je short setcol1            ;error,no data table
        les di,dword ptr[bp+6]  ;color var
        mov dx,es:[di]
        pop ax
        push dx          ;save color
        sub ah,ah        ;clear field # hi byte
        mul byte ptr[si+26]      ;table width
        add bx,ax
        call cursorg.    ;cursor orgin
        sub ch,ch
        mov cl,[bx+6]    ;field len
        cmp cl,0
        je short setcol1            ;null field
        pop ax
        inc di
setcol3: mov byte ptr es:[di],al          ;reset color
        inc di
        inc di
        loop short setcol3       ;do till done
        mov ax,1         ;standard complete
        jmp rtnstd       ;note! does not return to here
setcolor endp
public blinkon
blinkon proc far           ;set blink on
;
;   BLINKON(NAME,FIELD#)
;
        push bp                          ;save bp for return
        mov bp,sp        ;set bp to sp for internal use
        mov ax,10        ;Two argument routine, skip 10bytes on return
```

```
        call setertn      ;set up error return routine
        mov di, offset edittab   ;set up es,di
        mov dx,seg edittab
        mov es,dx
        lds si,dword ptr[bp+10]         ;load ds,si to display name
        push bp
        call edpcl     ;match name to link
                       ;will return only if found
        pop bp
        les di,dword ptr[bp+6]   ;field no addr
        mov ax,es:[di]    ;load in ax
        dec ax            ;field no's start at 0
        cmp al,[si+18]    ;first
        jl short blnkon1           ;errorr, less than first
        cmp al,[si+19]    ;compare to last
        jle short blnkon2
blnkon1: mov ax,103       ;error code
        jmp errrtn        ;error--Does not return
blnkon2: mov byte ptr[si+13],al ;set to current
        push ax           ;save
        call scrorg       ;set screen origin
        mov bx,[si+58]    ;set data table offset
        cmp bx,0
        je short blnkon1           ;error,no data table
        pop ax
        sub ah,ah         ;clear field # hi byte
        mul byte ptr[si+26]      ;table width
        add bx,ax
        call cursorg      ;cursor orgin
        sub ch,ch
        mov cl,[bx+6]     ;field len
        cmp cl,0
        je short blnkon1           ;null field
        mov al,10000000b           ;blink on mask
        inc di
blnkon3: or byte ptr es:[di],al ;reset color
        inc di
        inc di
        loop short blnkon3        ;do till done
        mov ax,1          ;standard complete
        jmp rtnstd        ;note! does not return to here
blinkon endp
public blinkoff
blinkoff proc far         ;set blink on
;
;   BLINKOFF(NAME,FIELD#)
;
        push bp                   ;save bp for return
        mov bp,sp         ;set bp to sp for internal use
        mov ax,10         ;Two argument routine, skip 10bytes on return
        call setertn      ;set up error return routine
        mov di, offset edittab   ;set up es,di
        mov dx,seg edittab
        mov es,dx
        lds si,dword ptr[bp+10]         ;load ds,si to display name
        push bp
        call edpcl        ;match name to link
                          ;will return only if found
        pop bp
        les di,dword ptr[bp+6]   ;field no addr
        mov ax,es:[di]    ;load in ax
        dec ax            ;field no's start at 0
```

```
        cmp al,[si+18]    ;first
        jl short blnkof1            ;errorr, less than first
        cmp al,[si+19]   ;compare to last
        jle short blnkof2
blnkof1: mov ax,103      ;error code
        jmp errrtn       ;error--Does not return
blnkof2: mov byte ptr[si+13],al ;set to current
        push ax          ;save
        call scrorg      ;set screen origin
        mov bx,[si+58]   ;set data table offset
        cmp bx,0
        je short blnkof1           ;error,no data table
        pop ax
        sub ah,ah        ;clear field # hi byte
        mul byte ptr[si+26]       ;table width
        add bx,ax
        call cursorg     ;cursor orgin
        sub ch,ch
        mov cl,[bx+6]    ;field len
        cmp cl,0
        je short blnkof1           ;null field
        mov al,01111111b           ;blink on mask
        inc di
blnkof3: and byte ptr es:[di],al           ;reset color
        inc di
        inc di
        loop short blnkof3         ;do till done
        mov ax,1         ;standard complete
        jmp rtnstd       ;note! does not return to here
blinkoff endp
public reversecol
reversecol proc far     ;reverse field color
; SCREEN GENERATION COMPILER (SGC) - Source Code documentation
; Copyright(c) 1987 Syndetic Corporation. All Rights Reserved
; ----- SGC program support module (assembly routine) -----
;
;
;   REVERSECOL(NAME,FIELD#)A
;
        push bp                     ;save bp for return
        mov bp,sp        ;set bp to sp for internal use
        mov ax,10        ;Two argument routine, skip 10bytes on return
        call setertn     ;set up error return routine
        mov di, offset edittab    ;set up es,di
        mov dx,seg edittab
        mov es,dx
        lds si,dword ptr[bp+10]           ;load ds,si to display name
        push bp
        call edpcl       ;match name to link
                         ;will return only if found
        pop bp
        les di,dword ptr[bp+6]   ;field no addr
        mov ax,es:[di]   ;load in ax
        dec ax           ;field no's start at 0
        cmp al,[si+18]   ;first
        jl short revers1           ;errorr, less than first
        cmp al,[si+19]   ;compare to last
        jle short revers2
revers1: mov ax,103      ;error code
        jmp errrtn       ;error--Does not return
```

```
revers2: mov byte ptr[si+13],al  ;set to current
         push ax                 ;save
         call scrorg             ;set screen origin
         mov bx,[si+58]          ;set data table offset
         cmp bx,0
         je short revers1        ;error,no data table
         pop ax
         sub ah,ah               ;clear field # hi byte
         mul byte ptr[si+26]     ;table width
         add bx,ax
         call cursorg            ;cursor orgin
         sub ch,ch
         mov cl,[bx+6]           ;field len
         cmp cl,0
         je short revers1        ;null field
         inc di
revers3: mov al,byte ptr es:[di]         ;get color
         mov ah,al                       ;save copy
         and ah,01110111b                ;clear low order colors
         and al,10001000b                ;clear low order colors
         rol ah,1                        ;shift colors
         rol ah,1                        ;shift colors
         rol ah,1                        ;shift colors
         rol ah,1                        ;shift colors
         or al,ah                        ;merge
         mov byte ptr es:[di],al                 ;reset
         inc di
         inc di
         loop short revers3      ;do till done
         mov ax,1                ;standard complete
         jmp rtnstd              ;note! does not return to here
reversecol endp
public seterror
seterror proc near       ;set field to error color
;
;   SETERROR(NAME,FIELD#)
;
         push bp                 ;save bp for return
         mov bp,sp               ;set bp to sp for internal use
         mov ax,10               ;two argument routine, skip 10 bytes on return
         call setertn            ;set up error return routine
         mov di, offset edittab  ;set up es,di
         mov dx,seg edittab
         mov es,dx
         lds si,dword ptr[bp+10]         ;load ds,si to display name
         push bp
         call edpcl      ;match name to link
                         ;will return only if found
         pop bp
         les di,dword ptr[bp+6]  ;field no addr
         mov ax,es:[di]  ;load in ax
         dec ax          ;fields start at 0
         cmp al,[si+18]  ;first
         jl short seterr1                ;errorr, less than first
         cmp al,[si+19]  ;compare to last
         jle short seterr2
seterr1: mov ax,103      ;error code
         jmp errrtn      ;error Note!--returns to pascal,not here
seterr2: mov byte ptr[si+13],al ;set to current
         push ax                 ;save
         call scrorg             ;set screen origin
         mov bx,[si+58]          ;set data table offset
         cmp bx,0
```

```
        je short seterr1         ;error,no data table
        pop ax
        sub ah,ah         ;clear field # hi byte
        mul byte ptr[si+26]      ;table width
        add bx,ax
        call cursorg     ;cursor orgin
        sub cl,cl
        mov cl,[bx+6]    ;field len
        cmp cl,0
        je short seterr1         ;null field
        mov al,[bx+5]    ;get error color
        inc di
seterr3: mov byte ptr es:[di],al         ;reset color
        inc di
        inc di
        loop short seterr3       ;do till done
        mov ax,1         ;standard complete
        jmp rtnstd       ;Note! returns to pascal, not here
seterror endp
subttl SETORIGIN--Set screen origin
page
public setorigin
setorigin proc far
; SCREEN GENERATION COMPILER (SGC) - Source Code documentation
; Copyright(c) 1987 Syndetic Corporation. All Rights Reserved
; ----- SGC program support module (assembly routine) -----
;
;
; CALL SETORIGIN(NAME,ROW,COLUMN)
;
        push bp                  ;save bp for return
        mov bp,sp        ;set bp to sp for internal use
        mov ax,14        ;THREE argument routine, skip 14bytes on return
        call setertn     ;set up error return routine
        mov di, offset edittab   ;set up es,di
        mov dx,seg edittab
        mov es,dx
        lds si,dword ptr[bp+14]          ;load ds,si to display name
        push bp
        call edpcl       ;match name to link
                         ;will return only if found
        pop bp
        les di,dword ptr[bp+6]   ;Column addr
        mov ax,es:[di]   ;get new col origin
        dec ax           ;numbering starts at 0
        mov word ptr [si+7],ax   ;modify screen
        les di,dword ptr[bp+10]          ;row addr
        mov ax,es:[di]   ;get new row origin
        dec ax           ;numbering starts at 0
        mov word ptr [si+5],ax   ;modify screen
        mov ax,1         ;o.k. flag
        jmp rtnstd       ;complete
setorigin endp
subttl SETBAKCOL--Set Background Color
page
public setbakcol
setbakcol proc far
;
; CALL SETBAKCOL(NAME,COLOR)
;
        push bp                  ;save bp for return
        mov bp,sp        ;set bp to sp for internal use
```

```
        mov ax,10          ;two argument routine, skip 10bytes on return
        call setertn       ;set up error return routine
        mov di, offset edittab  ;set up es,di
        mov dx,seg edittab
        mov es,dx
        lds si,dword ptr[bp+10]         ;load ds,si to display name
        push bp
        call edpcl         ;match name to link
                           ;will return only if found
        pop bp
        les di,dword ptr[bp+6]  ;Column addr
        mov ax,es:[di]     ;get new col origin
        mov byte ptr [si+24],al         ;modify screen
        mov ax,1           ;o.k. flag
        jmp rtnstd         ;complete
setbakcol endp
subttl SETDATFLD--Set first and last data fields
page
public setdatfld
setdatfld proc far         ;set first and last data fields
;
;   SETDATFLD(NAME, FIRST, LAST)
;
        push bp                         ;save bp for return
        mov bp,sp          ;set bp to sp for internal use
        mov ax,14          ;THREE argument routine, skip 14bytes on return
        call setertn       ;set up error return routine
        mov di, offset edittab  ;set up es,di
        mov dx,seg edittab
        mov es,dx
        lds si,dword ptr[bp+14]         ;load ds,si to display name
        push bp
        call edpcl         ;match name to link
                           ;will return only if found
        pop bp
        les di,dword ptr[bp+10]         ;field no addr
        mov ax,es:[di]     ;load in ax
        dec ax             ;field no's start at 0
        CMP AL,[SI+10]     ;compare to max
        jge short sdfld1           ;max starts counting from one
        mov byte ptr [si+18],al         ;set first
sdfld1: les di,dword ptr[bp+6]  ;get last
        mov ax,es:[di]
        dec ax             ;table needs count from zero
        cmp al,[si+10]     ;greater than Max/
        jge short sdfld2
        mov byte ptr[si+19],al   ;set last
sdfld2: mov ax,1
        jmp rtnstd
setdatfld endp
subttl SETLABFLD--Set first and last label fields
page
public setlabfld
setlabfld proc far         ;set first and last label fields
;
;   SETLABFLD(NAME, FIRST, LAST)
;
        push bp                         ;save bp for return
        mov bp,sp
        mov ax,14          ;THREE argument routine, skip 14bytes on return
        call setertn       ;set up error return routine
```

```
        mov di, offset edittab   ;set up es,di
        mov dx,seg edittab
        mov es,dx
        lds si,dword ptr[bp+14]         ;load ds,si to display name
        push bp
        call edpcl      ;match name to link
                        ;will return only if found
        pop bp
        les di,dword ptr[bp+10]         ;field no addr
        mov ax,es:[di]   ;load in ax
        dec ax           ;field no's start at 0
        CMP AL,[SI+9]    ;compare to max
        jge short slfld1        ;max starts counting from one
        mov byte ptr [si+16],al         ;set first
slfld1: les di,dword ptr[bp+6]   ;get last
        mov ax,es:[di]
        dec ax           ;table needs count from zero
        cmp al,[si+9]    ;greater than Max
        jge short slfld2
        mov byte ptr[si+17],al   ;set last
slfld2: mov ax,1
        jmp rtnstd
setlabfld endp
subttl SCROLROW--scroll screen by row
page
public scrolrow
scrolrow proc near
;
; SCROLROW(NAME,ROWS)
; negative rows for up scroll
;
        push bp
        mov bp,sp
        mov ax,10
        call setertn    ;set return status
        mov di,offset edittab
        mov dx,seg edittab
        mov es,dx
        lds si,dword ptr[bp+10]         ;screen name
        push bp
        call edpcl
        pop bp
        les di,dword ptr[bp+6]   ;rows
        mov ax,es:[di]
        cmp ax,0
        jl short sxolr1
        call srolup
        jmp rtnstd      ;finished
sxolr1: neg ax  ;restore to posative
        call sroldw
        jmp rtnstd
scrolrow endp
subttl SCROLCOL--scroll screen by COL
page
public scrolcol
scrolcol proc near
;
; SCROLCOL(NAME,COLS)
; negative rows for up scroll
;
        push bp
        mov bp,sp
        mov ax,10
```

```
        call setertn      ;set return status
        mov di,offset edittab
        mov dx,seg edittab
        mov es,dx
        lds si,dword ptr[bp+10]      ;screen name
        push bp
        call edpcl
        pop bp
        les di,dword ptr[bp+6]   ;rows
        mov ax,es:[di]
        cmp ax,0
        jl short srolcl
        call srolrt
        jmp rtnstd        ;finished
srolcl: neg ax   ;restore to posative
        call srollf
        jmp rtnstd
scrolcol endp
subttl SETEDII--Special for SGC--set screen for generation
page
public setedii
setedii  proc far        ;set
;
;   SETEDII(NAME,ROWS,COLS)
;
        push bp                      ;save bp for return
        mov bp,sp      ;set bp to sp for internal use
        mov ax,14      ;THREE argument routine, skip 14bytes on return
        call setertn   ;set up error return routine
        mov di, offset edittab   ;set up es,di
        mov dx,seg edittab
        mov es,dx
        lds si,dword ptr[bp+14]      ;load ds,si to display name
        push bp
        call edpcl     ;match name to link
                       ;will return only if found
        pop bp
        les di,dword ptr[bp+10]      ;row address
        mov ax,es:[di]   ;row value
        les di,dword ptr[bp+6]   ;cols address
        mov dx,es:[di]   ;cols value
        mov word ptr [si+1],ax   ;set new row size
        mov byte ptr [si+10],al          ;no of data fields
        dec al
        mov byte ptr [si+19],al          ;set max data field
        inc al
        mov word ptr [si+3],dx   ;set new col size
        mov cx,ax         ;counter for loop
        mov al,[si+26]    ;byte per data tab entry
        cbw               ;convert to word
        mov di,[si+58]    ;get dtab offset
setdil: mov byte ptr [di+6],dl   ;new field len
        add di,ax         ;next tab entry
        loop short setdil
        mov ax,1          ;o.k. flag
        jmp rtnstd        ;done, return
setedii endp
subttl SEDIT--Transfer Pascal Calling arguments to Editor
page
        public sedit
public sedit
sedit   proc near
; SCREEN GENERATION COMPILER (SGC) - Source Code documentation
```

; Copyright(c) 1987 Syndetic Corporation. All Rights Reserved
; ----- SGC program support module (assembly routine) -----
;
;
;   This routine is called to transfer arguments in the stack,PASCAL
;   format to the allocated core format of the editor
;
          push bp                    ;save bp
;         register usage
;         bp--frame pointer
;         dx--no of args
;         bs:si--pointing to screen
;internal
;         di--destination
;         bp--source
;
;
;compute intial source offset bp=base+6
          add bp,6
;
;compute intial dest di= screen offset +table offset
;
          mov di,95        ;offset to tab begin
          add di,si        ;add screen offset
          mov al,[di]      ;get no of enteries
          cmp al,0         ;no action if no args
          jne short sedit0
          mov dx,0         ;args to skip
          pop bp
          ret
sedit0:   mov dl,al        ;save
          mov dh,[di+1]    ;table width
          sub ah,ah
          dec al   ;first entry is zero, not one
          mul byte ptr[di+1]     ;tab width
          inc ax
          inc ax   ;mov past no entries and width
          add di,ax        ;point to end of table
sedit1:   mov ax,[bp]      ;offset
          mov word ptr[di],ax     ;save in tab
          inc bp
          inc bp
          mov ax,[bp]      ;load segment
          mov word ptr[di+2],ax   ;save in table
          inc bp
          inc bp
          mov al,[di+4]    ;entry type
          cmp al,32        ;is it string
          jne short sedit2
          mov ax,[bp]      ;string--len included
          mov byte ptr[di+5],al   ;save in tab
          inc bp
          inc bp   ;advance past
sedit2:   mov al,dh        ;table width
          cbw      ;make word
          sub di,ax        ;subtract from di
          dec dl
          jnz short sedit1          ;do till done
          mov dx,bp        ;save skip width
          sub dx,6         ;skip only variables
          pop bp   ;re-get original bp
          sub dx,bp        ;clear int set
          ret

```
sedit endp
subttl ERROR RETURNS TO PASCAL
page
public setertn
setertn proc near
;
;this routine sets the error return routine for a proper
;return to PASCAL via a jump to this routine.
;
;   al has the bytes in frame to skip
;
        mov bx,offset errrtna     ;stak ptr save space
        mov word ptr cs:[bx],bp           ;bp has sp of call arg frame
        mov word ptr cs:[bx+2],si         ;register restor
        mov word ptr cs:[bx+4],ds
        mov word ptr cs:[bx+6],di         ;register restor
        mov word ptr cs:[bx+8],es
        mov bx,offset errrtnb     ;modify RTN skips
        mov word ptr cs:[bx+1],ax
        call curofff     ;turn cursor off
        ret
setertn endp
public errrtna
errrtna proc near
        dw 0
        dd 2 dup (0)
errrtna endp
public errrtn
public rtnstd    ;standard return
errrtn  proc near         ;return to PASCAL
;
; ax has error number which is negated for return
;
        neg ax   ;negate number
errrtn  endp
rtnstd  proc near         ;standard return
        push ax
        mov ah,1          ;set cursor size
        mov ch,6          ;turn cursor on
        mov cl,7          ;one line cursor
        int 10h
        mov ah,2          ;set cursor position
        mov dh,24         ;row
        mov dl,0          ;column
        mov bh,[si+44]    ;page number
        int 10h                   ;set cursor
        pop ax
        mov bx,offset errrtna     ;set sp saved address
        mov sp,cs:[bx]
        lds si,dword ptr cs:[bx+2]        ;restore ds,si
        les di,dword ptr cs:[bx+6]        ;restore es,di
        pop bp
rtnstd  endp
errrtnb  proc far         ;return
        ret 99
errrtnb endp
subttl EDPC1--Find access by name
page
        public edpc1
edpc1   proc near         ;find linked screen by name
;
;   ds,si--requested name
;   es,di--set to edittab
;
```

```
;returns    ds,si--set to screen
;           ax--set to screen number in link list
;
;           if access not found  e.c. 100--no linked screens
;           101--requested screen not linked
            push di
            push si                 ;save for future use
            sub ah,ah       ;clear ah
            mov al,es:[di]  ;number of screens linked
            cmp al,0        ;must be more than 0
            je short edpc1a         ;error--no screens linked
            mov bp,ax       ;save--needed later
            mov dx,56       ;first screen name
            sub bh,bh
            mov bl,[si+22]  ;link table width
            sub al,al       ;clear
            inc al          ;set to 1, first pass
            sub ch,ch
edpc1b:     pop si
            pop di
            push di
            push si                 ;reget but save
            mov cl,[si]     ;get lenght
            cmp cl,0        ; accept first screen if length is zero
            je short edpc1c
            add di,dx       ;offset to table name
repe        cmpsb           ;compare string
            je short edpc1c         ;if equal, accept
            inc al
            add dx,bx       ;add table width to dx
            cmp ax,bp       ;loop finished
            jle short edpc1b        ;do again
            mov ax,101      ;error code--no link found
            jmp short edpc1e
edpc1c:     pop si          ;name found
            pop di
            push di                 ;save
            add di,dx       ;reset di to entry
            sub di,4        ;align to tab begin
            lds si,dword ptr es:[di]        ;load data segment
            pop di
            ret
edpc1a:     mov ax,100      ;error code--no screens linked
edpc1e:     pop si
            pop di
            jmp errrtn      ;jump to error return
edpc1       endp
subttl HLPKBD--Help Processor
page
public hlpkbd
hlpkbd      proc near       ;help keyboard input rtn
            mov bx,offset hlpspc    ;check for first entry
            mov ax,cs:[bx]  ;get fist stak ptr save
            cmp ax,0        ;is it zero
            jne short hlpkb1
            mov word ptr cs:[bx+4],sp       ;save stk ptr for future
            mov al,[si+13]  ;current cursor field no
            mov byte ptr cs:[bx+6],al       ;save
hlpkb1:     mov ax,[si+60]  ;help table address
            cmp ax,0
            jne short hlpkbx        ;if zero, nop
            mov bx,offset hlpops    ;beep operator=0
            call word ptr cs:[bx]   ;execute
            jmp hlpesc      ;execute esc command
```

```
hlpkbx: mov bx,offset hlpms2    ;help message
        call hlpmes     ;displya on line 25
        call hlpsav     ;save chrs under help marks
        call hlplst     ; put help marks on screen
hlpkb5: call cursor     ;turn keyboard on
        cmp al,0        ;function key:
        jne short hlpkb4
        mov al,ah       ;mov extended to reg.
hlpkb4: mov bx,offset hlpfun1   ;function list
        call hlpstk     ;call stack operator
        jmp short hlpkb5
hlpkbd  endp
hlpstk  proc near       ;process instruction from stack
;
;   al has chr
;   bx has table address
;
hlpst1: cmp al,cs:[bx]  ;compare to list value
        jle short hlpst2
        inc bx
        inc bx
        jmp short hlpst1
hlpst2: mov bl,cs:[bx+1]        ;get operator no.
        sub bh,bh       ;clear high
        shl bx,1        ;mult by two
        add bx,offset hlpops    ;ops stk address
        call word ptr cs:[bx]
        ret
hlpstk  endp
hlpfnc  proc near       ;function keys
        sub al,58       ;adjust range 1 to 10
        jmp hlpnex      ;execute
hlpfnc  endp
hlpcnt  proc near       ;control keys
        sub al,83       ;adjust range 11 to 20
        jmp hlpnex      ;execute
hlpcnt  endp
hlpalt  proc near       ;alternate keys
        sub al,83       ;adjust range 21 to 40
        jmp hlpnex      ;execute
hlpalt  endp
hlpshf  proc near       ;shifted keys
        sub al,53       ;adjust range 31 to 40
        jmp hlpnex      ;execute
hlpshf  endp
hlpnex  proc near       ;load next screen
        mov bx,[si+60]  ;help table
        mov ah,255      ;end test
hlpnx1: cmp ah,[bx]     ;table end?
        jne short hlpnx2
        call cfnc0      ;beep
        ret
hlpnx2: cmp al,[bx]     ;is it hit number
        jle short hlpnx3
        sub dh,dh
        mov dl,[si+41]  ;table width
        add bx,dx
        jmp short hlpnx1
hlpnx3: mov bp,offset hlpspc    ;stak ptr rtns space
        sub cx,cx       ;set to zero
        cmp cx,cs:[bp]  ;if blank, first help call
```

```
        jne short hlpnx7
        push ds
        push si                         ;save for return
        mov word ptr cs:[bp],sp         ;save stak ptr
        jmp short hlpnx8
hlpnx7: mov ax,offset hlpnx6            ;found, set up return
        push ax
        push ds
        push si
        mov ax,cs:[bp+2]
        push ax                         ;save to resotore
        mov word ptr cs:[bp+2],sp       ;re
hlpnx8: mov dx,[bx+14]  ;new scr seg
        mov si,[bx+12]  ;new offset
        mov ds,dx       ;reset seg
hlpnex  endp
hlpnx6  proc near
        call hlplnk     ;link
        call erase      ;erase
        call disscr     ;display
        call fldmrk     ;mark data fields
        mov bx,offset hlpms1    ;message
        call hlpmes     ;display on line 25
hlpnx4: call cursor     ;read keyboard
        cmp al,0
        jne short hlpnx5
        mov al,ah
hlpnx5: mov bx,offset hlpfun    ;function codes
        call hlpstk     ;execute
        jmp short hlpnx4
hlpnx6  endp
hlpesc  proc near       ;return to preceeding screen
        mov bx,offset hlpspc
        mov dx,cs:[bx+2]        ;get return s
        cmp dx,0        ;if null, return to main
        je hlpfin
        mov sp,dx       ;reset stack pointer
        pop dx
        pop si
        pop ds
        mov word ptr cs:[bx+2],dx       ;reset return pointer
        call hlplnk     ;link returned screen
        call erase      ;erase
        call disscr     ;display
        ret     ;stack has return
hlpesc  endp
hlpfin  proc near       ;finish help
        mov bx,offset hlpspc    ;get return address
        mov ax,cs:[bx]  ;get global return stack
        cmp ax,0        ; is it null
        je short hlpfn1
        mov sp,ax       ;set stack pointer
        sub ax,ax       ;clear
        mov word ptr cs:[bx],ax         ;clear fin return
        mov word ptr cs:[bx+2],ax       ;clear lower return
        pop si
        pop ds  ;reset register pointers
hlpfn1: mov sp,cs:[bx+4]                ;reget stak prt for return
        call segset     ;set seg ptrs to edittab
        mov al,[si+1]   ;get current screen pointer
        call segrtn     ;reset data
        call hlprst     ;restore screen
        mov bx,offset hlpspc    ;get return address
```

```
        mov  al,cs:[bx+6]        ;reget current field no
        mov  byte ptr[si+13],al  ;restore
        call segset
        call renfld              ;re-enter field
        mov  al,255
        mov  byte ptr[si+32],al  ;force func message
        ret
hlpfin  endp
hlpspc  proc near                ;space
        db 8 dup(0)
hlpspc  endp
hlpops  proc far
        dw offset cfnc0          ;0--beep
        dw offset hlpesc         ;1--return to preceeding screen
        dw offset hlpfin         ;2--end help
        dw offset hlpfnc         ;3--function codes
        dw offset hlpcnt         ;4--control codes
        dw offset hlpalt         ;5--alternate codes
        dw offset hlpshf         ;6--shifted codes
        dw offset hlpkbd         ;7--keybd input
hlpops  endp
hlpfun  proc near
        db 9,0    ;ignore
        db 10,2         ;cntl/est
        db 26,0         ;ignore
        db 27,1         ;esc
        db 58,0         ;ignore
        db 59,7         ;more help
        db 60,1         ;key 2-esc
        db 61,2         ;key 3-fin
        db 127,0        ;table end
hlpfun  endp
hlpfun1 proc near                ;help operations
        db 9,0    ;ignore
        db 10,2         ;cntl/est
        db 26,0         ;ignore
        db 27,1         ;esc
        db 58,0         ;ignore
        db 68,3         ;function keys
        db 83,0         ;ignore
        db 93,6         ;shifted funcs
        db 103,4        ;cntrl keys
        db 113,5        ;alt keys
        db 127,0        ;remainder
hlpfun1 endp
subttl HLPSAV--Save Screen Data under Help Instructions
page
        public hlpsav
hlpsav  proc    near
;
;       no presets assummed
;
        call scrorg     ;screen origin
        push es         ;save regs
        push di
        sub  ax,ax      ;clear field count
hlpsav1: push si
        push ds
        push ax                  ;save counter
        call hlppos     ;get table position
        mov  cl,255     ;table end inicator
        cmp  cl,[bx]    ;table end indicator
        je short hlpsav2
```

```
        inc bx              ;row,col offset by one
        call cursorg        ;cursor origin
        mov dx,es           ;swap es,ds
        mov ds,dx
        mov si,di
        pop ax              ;reget counter
        pop es              ;reget ds in es
        push es                     ;keep stack right
        mov di,bx
        inc di
        inc di
        inc di
        mov cx,08           ;counter
rep     movsb
        pop ds
        pop si
        inc ax
        jmp hlpsav1
hlpsav2: pop ax
        pop ds
        pop si
        pop di
        pop es
        ret
hlpsav  endp
subttl HLPRST--Restore Screen Data under Help Instructions
page
        public hlprst
hlprst  proc    near
;
;       no presets assummed
;
        call scrorg         ;screen origin
        push di
        sub ax,ax           ;clear field count
hlprst1: push si
        push ax                     ;save counter
        call hlppos         ;get table position
        cmp bx,0            ; check for non existant table
        je short hlprst2
        mov cl,255          ;table end inicator
        cmp cl,[bx]         ;table end indicator
        je short hlprst2
        inc bx              ;row,col offset by one
        call cursorg        ;cursor origin
        pop ax              ;reget counter
        mov si,bx           ;source offset
        inc si
        inc si
        inc si
        mov cx,08           ;counter
rep     movsb
        pop si
        inc ax
        jmp hlprst1
hlprst2: pop ax
        pop si
        pop di
        ret
hlprst  endp
subttl HLPLST--List Help Keys on screen
page
        public hlplst
```

```
hlplst   proc    near
;
;       no presets assummed
;
         call scrorg       ;screen origin
         sub ax,ax         ;clear field count
hlplst1: push ax
         call hlppos       ;get table position
         mov cl,255        ;table end inicator
         cmp cl,[bx]       ;table end indicator
         je short hlplst2
         inc bx            ;row,col offset by one
         call cursorg      ;cursor origin
         dec bx            ;pointer back to begin
         sub ah,ah         ;clear hi byte
         mov al,[bx]       ;key number
         mov ch,al         ;save in ch
         mov cl,10
         mov byte ptr[si+42],cl   ;temp for div
         div byte ptr[si+42]      ;divide by 10
         sub ah,ah         ;clear high
         add ax,offset hlplst3
         mov bp,ax         ;move to index reg
         mov cl,cs:[bp]    ;get character
         mov al,32         ;blank
         mov ah,[bx+3]     ;color
         mov word ptr es:[di],ax        ;first blank
         mov al,cl
         mov word ptr es:[di+2],ax      ;character
         mov cl,32         ;blank
         mov al,ch
         add al,48         ;convert to ansii
         cmp al,57         ;is it 10?
         jle short hlplst4
         mov al,49         ;diget one
         mov cl,48         ;didget zero
hlplst4: mov word ptr es:[di+4],ax      ;first dig
         mov al,cl
         mov word ptr es:[di+6],ax      ;2nd dig
         pop ax   ;reget counter
         inc ax
         jmp hlplst1
hlplst2: pop ax
         ret
hlplst3: db 102,99,97,70          ;f,c,a,F
hlplst   endp
subttl HLPMES--Help message routine
page
hlpmes   proc near
;
;  bx--message, in program seg.
;
         call scrorg       ;screen origin
         push ds
         push si
         push di
         mov ax,24         ;col addr of message
         mul byte ptr[si+21]      ;columns
         mov di,ax
         shl di,1          ; mult by 2
         sub ch,ch         ;clear high
         add di,[si+22]    ;add page offset
         mov cl,[si+21]    ;counter
```

```
        shl  cl,1           ;mult by two
        mov  dx,cs          ;
        mov  ds,dx          ;get prog seg into ds
        mov  si,bx          ;message offset into si
rep     movsb               ;transfer message
        pop  di
        pop  si
        pop  ds
        ret
hlpmes  endp
subttl HELP MESSAGES
page
hlpms1  proc near           ;help function key message
        db    32 , 71 , 102, 64 , 49 , 64
        db    45 , 64 , 45 , 64 , 77 , 64
        db    111, 64 , 114, 64 , 101, 64
        db    32 , 64 , 72 , 64 , 101, 64
        db    108, 64 , 112, 64 , 32 , 64
        db    32 , 7  , 32 , 7  , 32 , 48
        db    102, 48 , 50 , 48 , 45 , 48
        db    45 , 48 , 40 , 48 , 111, 48
        db    114, 48 , 32 , 48 , 69 , 48
        db    83 , 48 , 67 , 48 , 41 , 48
        db    45 , 48 , 45 , 48 , 80 , 48
        db    114, 48 , 101, 48 , 118, 48
        db    105, 48 , 111, 48 , 117, 48
        db    115, 48 , 32 , 48 , 83 , 48
        db    99 , 48 , 114, 48 , 101, 48
        db    101, 48 , 110, 48 , 32 , 48
        db    32 , 7  , 32 , 7  , 32 , 7
        db    32 , 96 , 102, 96 , 51 , 96
        db    45 , 96 , 45 , 96 , 40 , 96
        db    111, 96 , 114, 96 , 32 , 96
        db    67 , 96 , 110, 96 , 116, 96
        db    108, 96 , 47 , 96 , 82 , 96
        db    116, 96 , 110, 96 , 41 , 96
        db    45 , 96 , 45 , 96 , 69 , 96
        db    110, 96 , 100, 96 , 32 , 96
        db    72 , 96 , 101, 96 , 108, 96
        db    112, 96 , 32 , 96
hlpms1  endp
hlpms2  proc near           ;help key message
        db    32 , 116, 32 , 116, 32 , 116
        db    32 , 116, 32 , 116, 32 , 116
        db    32 , 116, 32 , 116, 32 , 116
        db    68 , 116, 101, 116, 112, 116
        db    114, 116, 101, 116, 115, 116
        db    115, 116, 32 , 116, 116, 116
        db    104, 116, 101, 116, 32 , 116
        db    65 , 116, 112, 116, 112, 116
        db    114, 116, 111, 116, 112, 116
        db    114, 116, 105, 116, 97 , 116
        db    116, 116, 101, 116, 32 , 116
        db    75 , 116, 101, 116, 121, 116
        db    32 , 116, 102, 116, 111, 116
        db    114, 116, 32 , 116, 116, 116
        db    104, 116, 101, 116, 32 , 116
        db    68 , 116, 101, 116, 115, 116
        db    105, 116, 114, 116, 101, 116
        db    100, 116, 32 , 116, 65 , 116
        db    100, 116, 100, 116, 105, 116
        db    116, 116, 105, 116, 111, 116
        db    110, 116, 97 , 116, 108, 116
```

```
            db    32 , 116, 72 , 116, 101, 116
            db    108, 116, 112, 116, 46 , 116
            db    32 , 116, 32 , 116, 32 , 116
            db    32 , 116, 32 , 116, 32 , 116
            db    32 , 116, 32 , 116, 32 , 116
            db    32 , 116, 32 , 116
hlpms2  endp
        public link
subttl  LINK--Link screen to active status
page
link    proc near
comment*
        fundamental routine
        presets
                ds--screent
                si--offset to screent this routine cross links the screen int screent with
        the editor.
*
        mov di,[si+78]          ;get edittab offset
        mov word ptr[si+47],di  ;set as active
        mov dx,[si+80]          ;get edittab segment
        mov word ptr[si+49],dx  ;set as active
        mov es,dx               ; mov to extra
        mov bx,si               ;rem save si
        sub ah,ah               ;clear ah
        mov al,es:[di]          ;get no scrs linked
        mov byte ptr es:[di+3],al       ;max active
        inc byte ptr es:[di]    ;inc no linked
        mul byte ptr es:[di+22]         ;compute ofset to move
        add di,ax               ;mov to dest
        add di,51               ;add initial offset
        add si,51               ;set source index
        mov cx,5                ;length to move
rep     movsb   ;screen to editor link complete
        mov si,bx               ;reset si
        add si,86               ;add offset to stored name
        mov cx,9                ;count
rep     movsb                   ;move name
        mov si,bx               ;restore si to screen offset
        mov bl,[si+44]          ;get screen no
        sub bh,bh               ;clear hi
        shl bx,1                ;mult by 2
        add bx,offset link1     ;rem page table
        mov ax,cs:[bx]          ;get page no base
        mov word ptr[si+22],ax  ;set to active
        ret
link    endp
link1   proc near               ;screen page segments
        dw 0,1000h,2000h,3000h  ;page segs
link1   endp
subttl  HLPLNK--Help-Link screen to active status
page
hlplnk  proc near
comment*
        fundamental rountine
        presets
                ds--screent
                si--offset to screent this routine cross links a help screen to the help seg table
```

```
                mov di,[si+82]   ;get helptab offset
                mov word ptr[si+47],di   ;set as active
                mov dx,[si+84]   ;get helptab segment
                mov word ptr[si+49],dx   ;set as active
                mov es,dx        ; mov to extra
                mov bx,si        ;rem save si
                sub ax,ax        ;clear accum
                mov word ptr es:[di],ax        ;clear table
                mov word ptr es:[di+2],ax      ;clear table
                add di,51        ;add initial offset
                add si,51        ;set source index
                mov cx,5         ;length to move
        rep     movsb    ;screen to editor link complete
                mov si,bx        ;restore si to screen offset
                mov bx,3         ;set screen no
                mov byte ptr[si+44],bl   ;set in table
                shl bx,1         ;mult by 2
                add bx,offset link1      ;rem page table
                mov ax,cs:[bx]   ;get page no base
                mov word ptr[si+22],ax   ;set to active
                ret
hlplnk  endp
SUBTTL EDITOP--Generalized function operator
page
comment*
        this routine calls each function for all active screens
        presets:  ds--some screen in the segment
                  si--offset of some screen
*
                public editop
editop  proc near
                mov di,offset edittab    ;set es,di
                mov dx,seg edittab       ;get edditab seg
                mov ds,dx        ;ds now points to edittab
                shl ax,1         ;multiply function # by 2
                add ax,offset ftab       ;add ftab offset
                mov cs:ftab,ax           ;save in position zero
                sub ax,ax        ;clear ax
                mov bx,ax        ;clear bx register
                cmp byte ptr[bx],al
                jne short nex
                mov ax,100       ;error code--no screens linked
                jmp errrtn       ;make error return
nex:            mov al,byte ptr[bx+2]    ;get min screen
                mov byte ptr[bx+1],al    ;save in first--starting action
lop:            sub ah,ah        ;clear ax,high
                mul byte ptr[bx+22]      ;bytes per active entry
                add al,51        ;offset to table base
                mov bp,ax        ;set bp to active table pointer
                mov si,ds:word ptr[bp+1]         ;offset to screen basic data
                push ds                  ;save edittab segment
                mov dx,ds:word ptr[bp+3]         ;segment of screen basic data
                mov ds,dx
                mov di,cs:ftab   ;get call table position
                call cs:word ptr[di]     ;relative subroutine call
                pop ds           ;reset edittab set
                sub bx,bx        ;clear bx
                mov al,byte ptr[bx+1]    ;get current page
                cmp al,byte ptr[bx+3]    ;current scr = last?
                jne short agn
                ret                      ;done
agn:            inc byte ptr[bx+1]               ;increment current screen
                mov al,byte ptr[bx+1]            ;move current to accum
                jmp short lop    ;do again
```

```
editop  endp
ftab    dw 0                    ;0--current position
        dw offset disscr        ;1--display labels
        dw offset fldmrk        ;2--mark fields
        dw offset erase         ;3--erase screen
        dw offset disdat        ;4--display data
        dw offset reddat        ;5--read data
        public cursorg
subttl  CURSORG--Cursor field origin computation routine
page
cursorg proc near
comment* t
        This routine adds the field orgin to the screen origin
  presets ds--screen data segment
          si--screen basic data offset
          bx--current field offset*
; returns tab 8,9--field origin offset
;         di--field origin
;         es, di are returned set for cursor or data move
;
        mov ax,0                ;clear ax register
        cmp bx,ax               ;if bx nul, no legal field
        jz short curso1
          mov al, byte ptr [bx]  ;get row #
          mul byte ptr[si+21]    ;screen col sized
          sub dh,dh              ;clear high byte
          mov dl,[bx+1]          ;load low col origin
          add ax,dx              ;add col origin
curso1: add ax,word ptr [si+11] ;add screen origin
        mov di,ax               ;mov to ptr ara
        rol di,1                ;multiply by two
        add di,[si+22]  ;add page offset
        mov word ptr [si+14],ax ;save index to field data
        mov dx,0b800h   ;screen segment
        mov es,dx               ;address of screen space--seg
        ret
cursorg endp
subttl  SCRORG-Sub-Screen Origin Computation routine
page
scrorg  proc near
        public scrorg
comment *
        ds--set to current basic table
        si--set to current basic offset
*
        mov ax,[si+5]           ;get row origin
        mul byte ptr[si+21]     ;multiply by 80
        add ax,[si+7]           ;add col origin
        mov [si+11],ax          ;save results
;       mov ch,[si+21]  ;screen col size
        mov cl,[si+44]  ;page number
;       sub ah,ah       ;0-code for mode set
;       mov al,3        ;80 col, color
;       cmp ch,80       ;is it right
;       je short scrorg1
;       mov al,1        ;mode for 40,color
;       shl cl,1        ;double page no.
;scrorg1: int 10h       ;ex interupt
scrorg1: mov ah,5       ;code for page set
        mov al,cl       ;page number
        int 10h                 ;ex interupt
        ret
scrorg  endp
```

```
         subttl DISSCR--Sub-Screen Label Display routine
         page
                public disscr
disscr   proc near
comment*
         this routine displays the lables of one complete sub-screen.
         ds--set to subscreen data segment
         si--set to offset to sub screen
*
;
         call scrorg               ;compute screen origin
         mov al,[si+16]            ;get first label
         mov byte ptr[si+13],al    ;save in current
gon:     mov bx,word ptr[si+56]    ;offset to label table
         cmp bx,0                  ;will be zero if no label table
         jne short dod
         ret                       ;none to do
dod:     sub ah,ah
         mul byte ptr[si+25]       ;multiply label # by table width
         add bx,ax                 ;add offset to label base
         call cursorg              ;establish cursor origin
         sub ch,ch                 ;clear high couter byte
         mov cl,byte ptr[bx+2]     ;length to move
         rol cx,1                  ;multiply by two
         push si                              ;save current offset
         mov si,word ptr[bx+3]     ;get lable address
rep      movsb                     ;move chr string
         pop si                    ;recall saved offset
         sub ah,ah                 ;clear accum high byte
         inc byte ptr[si+13]   .   ;increment current label
         mov al,byte ptr[si+13]    ;move to accum
         cmp al,byte ptr[si+17]    ;compare to last
         jle short gon
         ret                       ;finished
disscr   endp
         subttl ERASE--Sub-Screen Erase routine
         page
                public erase
erase    proc near
comment*
         this routine erases a sub-screen.  The screen area is filled
         with blanks of the background color.
         ds--set to subscreen data segment
         si--set to offset to sub screen
*
;
         call scrorg               ;compute screen origin
         mov dx,0b800h    ;screen segment
         mov es,dx
         mov dx,word ptr[si+1]     ;rem initial row #
         mov bl,32        ;rem blank
         mov bh,byte ptr[si+24]    ;background color
lopro:   mov ax,dx        ;rem re-get current row
         dec ax           ;row position is one less than count
         mul byte ptr[si+21]       ;multiply by columns
         add ax,word ptr[si+11]    ;add screen origin
         shl ax,1         ;mult by 2
         add ax,[si+22]   ;add screen page offset
         mov di,ax        ;move to dest index
         mov cx,word ptr[si+3]     ;words to move
lincl:   mov es:word ptr[di],bx
         inc di           ;increment index
         inc di
```

```
                dec cx                  ;decrement counter
                jnz short lincl         ;go for each column
                dec dx                  ;dec row number
                jnz short lopro         ;match?
                ret
erase   endp
subttl FLDMRK--Field mark routine for each screen
page
                public fldmrk
fldmrk  proc near
comment*
        This routine marks the data filed with the data field chr.
                The field will be blinking if requested.
        ds--set to subscreen data segment
        si--set to offset to sub screen
*
;
                call scrorg             ;compute screen origin
                mov al,[si+18]          ;get first data field
                mov byte ptr[si+13],al  ;save in current
gonf:           mov bx,word ptr[si+58]  ;offset to d.f. table
                cmp bx,0                ;offset must exist. if zero, no dataf
                jne short do
                ret                     ;none to do
do:             call fldmk1             ;mark or fill with blanks
skip:           sub ah,ah               ;clear accum high byte
                inc byte ptr[si+13]     ;increment current label
                mov al,byte ptr[si+13]  ;move to accum
                cmp al,byte ptr[si+19]  ;compare to last
                jle short gonf
                ret                     ;finished
fldmrk  endp
subttl TSTRQD--Test for required input
page
                public tstrqd
tstrqd  proc near
comment*
        tests for required input.
        bp returned non zero if error found.
        ds--set to subscreen data segment
        si--set to offset to sub screen
*
;
                call scrorg             ;compute screen origin
                mov bp,0                ;no error flag
                mov al,[si+18]          ;get first data field
tstrq0:         sub ah,ah
                mov byte ptr[si+13],al  ;save in current
                mov bx,word ptr[si+58]  ;offset to d.f. table
                cmp bx,0                ;offset must exist. if zero, no dataf
                jne short tstrq1
                ret                     ;none to do
tstrq1:         sub ah,ah
                mul byte ptr[si+26]     ;multiply label # by table width
                add bx,ax               ;add offset to label base
                call cursorg            ;establish cursor origin
                mov cl,byte ptr[bx+6]   ;length to move
                mov al,byte ptr[bx+7]   ;get edit control byte
                and al,100b             ;input required + blink bit
                xor al,100b             ;0 value is blink
                jz short tstrq4         ;not required field
                mov dl,176              ;fld mrk
                mov dh,32               ;space
                sub ch,ch
```

```
tstrq2:  mov al,es:[di]    ;get chr
         cmp al,dl
         je short tstrq3
         cmp al,dh
         jne short tstrq4          ;field not blank
tstrq3:  inc di
         inc di
         loop short tstrq2         ;go for fld len
         call cursorg              ;establish cursor origin
         inc bp    ;field error
         mov cl,[bx+6]     ;length
         sub ch,ch
         mov al,[bx+5]     ;error color
tstrq5:  inc di
         mov byte ptr es:[di],al          ;set error color
         inc di
         loop short tstrq5
tstrq4:  sub ah,ah                 ;clear accum high byte
         inc byte ptr[si+13]       ;increment current label
         mov al,byte ptr[si+13]    ;move to accum
         cmp al,byte ptr[si+19]    ;compare to last
         jle short tstrq0
         ret                       ;finished
tstrqd   endp
subttl FLDMK1--Single field mark
page
         public fldmk1
fldmk1   proc near
         mov bx,[si+58]    ;data table address
         mov al,[si+13]    ;field number
         call fldpos
         call cursorg              ;establish cursor origin
         mov ch,byte ptr[bx+6]     ;length to move
         mov al,byte ptr[bx+7]     ;get edit control byte
         mov dl,al         ;save copy in dx
         and al,100b       ;input required + blink bit
         xor al,100b       ;0 value is blink
         mov cl,5          ;count for rotate
         shl al,cl         ;move to 7 position
         or al,byte ptr[bx+2]      ;data field color
         and dl,1000b      ;field mark requested?
         jnz short fldm2
         mov dl,al         ;required?
         and dl,10000000b
         jz short fldm2
         mov dl,32         ;blank the field
         jmp short fldm
fldm2:   mov dl,176        ;field mark character
fldm:    mov es:byte ptr[di],dl   ;character
         inc di
         mov es:byte ptr[di],al   ;color
         inc di
         dec ch
         jnz short fldm
         ret
fldmk1   endp
subttl SROLUP--Scroll display up
page
srolup   proc near
;
; ds,si--screen base adress
; ax--rows to scroll
         mov bp,ax         ;save rows in bp
```

```
        call scrorg     ;compute screen base address
        mov cx,[si+1]   ;row size of display
        sub cx,bp       ;rows to move
        cmp cx,0        ;must be greater than 1
        jge short srolu1
        mov ax,-104
        ret             ;row mov greater than size
srolu1: push bp                 ;save
        mov dx,0b800h   ;screen base adress
        mov es,dx       ;setup es register
        mov ax,bp       ;setup move difference
        mul byte ptr[si+21]     ;rows to move times screen size
        mov bp,ax
        mov ax,[si+11]  ;screen origin
        shl ax,1        ;mult by two
        add ax,[si+22]  ;screen no offset
        mov di,ax       ;display origin
        mov dx,[si+3]   ;colum size
        dec dx          ;move value
        push si                 ;save screen base data offest
        mov si,di       ;use si as source
        add si,bp
srolu2: sub bx,bx       ;outer loop
srolu3: mov ax,es:[si+bx]       ;get chr + color
        mov es:word ptr[di+bx],ax       ;resave
        inc bx
        inc bx
        cmp bx,dx       ;finished?
        jle short srolu3
        add si,bp       ;prepare for next roll
        add di,bp
        loop short srolu2
        pop si          ;reget base
        pop cx          ;rows to erase
        mov al,32       ;blank
        mov ah,[si+24]  ;back ground color
srolu4: sub bx,bx
srolu5: mov es:word ptr[di+bx],ax       ;erase
        inc bx
        inc bx
        cmp bx,dx
        jle short srolu5
        add di,bp
        loop short srolu4
        mov ax,1
        ret
srolup  endp
subttl SROLDW--Scroll display down
page
sroldw  proc near
;
; ds,si--screen base adress
; ax--rows to scroll
        mov bp,ax       ;save rows in bp
        call scrorg     ;compute screen base address
        mov cx,[si+1]   ;row size of display
        sub cx,bp       ;rows to move
        cmp cx,0        ;must be greater than 1
        jge short sroldl
        mov ax,-104
        ret             ;row mov greater than size
sroldl: push bp                 ;save
        mov dx,0b800h   ;screen base adress
        mov es,dx       ;setup es register
```

```
        mov ax,bp          ;setup move difference
        mul byte ptr[si+21]    ;rows to move times screen size
        mov bp,ax
        mov ax,[si+1]      ;row size
        dec ax
        mul byte ptr[si+21]    ;cols
        add ax,[si+11]     ;screen origin
        shl ax,1           ;mult by two
        add ax,[si+22]     ;screen no offset
        mov di,ax          ;display origin
        mov dx,[si+3]      ;colum size
        dec dx             ;move value
        push si                      ;save screen base data offest
        mov si,di          ;use si as source
        sub si,bp
srold2: sub bx,bx          ;outer loop
srold3: mov ax,es:[si+bx]         ;get chr + color
        mov es:word ptr[di+bx],ax          ;resave
        inc bx
        inc bx
        cmp bx,dx          ;finished?
        jle short srold3
        sub si,bp          ;prepare for next roll
        sub di,bp
        loop short srold2
        pop si             ;reget base
        pop cx             ;rows to erase
        mov al,32          ;blank
        mov ah,[si+24]     ;back ground color
srold4: sub bx,bx
srold5: mov es:word ptr[di+bx],ax          ;erase
        inc bx
        inc bx
        cmp bx,dx
        jle short srold5
        sub di,bp
        loop short srold4
        mov ax,1
        ret
sroldw  endp
subttl SROLRT--Scroll display right
page
srolrt  proc near
;
; ds,si--screen base adress
; ax--cols to scroll
        mov dl,al          ;save cols to move in dl
        call scrorg        ;compute screen base address
        mov dh,[si+3]      ;col size of display
        cmp dh,dl          ;must width greater than scrol
        jge short srolx1
        mov ax,-104
        ret                ;row mov greater than size
srolx1: sub dh,dl          ;rows to move
        shl dh,1           ;mult by two
        shl dl,1           ;mult by two
        mov ax,0b800h      ;screen base adress
        mov es,ax          ;setup es register
        mov al,[si+21]     ;screen col size
        sub ah,ah
        mov bp,ax          ;save in bp
        shl bp,1           ;mult by two
        mov di,[si+11]     ;screen origin
```

```
        shl di,1           ;mult by two
        add di,[si+22]     ;page no offset
        mov al,32          ;blank
        mov ah,[si+24]     ;back ground color
        push si
        push ax                       ;save
        mov al,0
        mov byte ptr [si+13],al       ;row counter
srolr1: sub bh,bh
        mov bl,dl          ;move offset
        sub ch,ch
        mov cl,dh          ;loop counter
        mov si,di          ;save initial di value
        add di,cx          ;start from right
        dec di
        dec di
        shr cx,1           ;divide by two
srolr2: mov ax,es:[di]     ;get value
        mov es:word ptr[di+bx],ax     ;resave
        dec di
        dec di
        loop short srolr2
        mov di,si          ;reset di to row origin
        pop ax
        pop si
        push si
        push ax                       ;reget and resave
        sub ch,ch
        mov cl,dl          ;length to blank
        shr cl,1           ;divide by 1
        sub bx,bx          ;index
srolr3: mov es:word ptr[di+bx],ax
        inc bx
        inc bx
        loop short srolr3
        add di,bp
        inc byte ptr[si+13]
        mov al,[si+13]
        sub ah,ah
        cmp ax,[si+1]      ;counter to row size
        jl short srolr1
        pop ax
        pop si
        mov ax,1
        ret
srolrt  endp
subttl SROLLF--Scroll display left
page
srollf  proc near
;
; ds,si--screen base adress
; ax--cols to scroll
        mov dl,al          ;save cols to move in dl
        call scrorg        ;compute screen base address
        mov dh,[si+3]      ;col size of display
        cmp dh,dl          ;must be greater than 0
        jge short sxolf1
        mov ax,-104
        ret                ;row mov greater than size
sxolf1: sub dh,dl          ;rows to move
        shl dh,1           ;mult by two
        shl dl,1           ;mult by two
        mov ax,0b800h      ;screen base adress
        mov es,ax          ;setup es register
        mov al,[si+21]     ;screen col size
```

```
                sub ah,ah
                mov bp,ax           ;save in bp
                shl bp,1            ;mult by two
                mov di,[si+11]      ;screen origin
                shl di,1            ;mult by two
                add di,[si+22]      ;page no offset
                mov al,32           ;blank
                mov ah,[si+24]      ;back ground color
                push si
                push ax                         ;save
                mov al,0
                mov byte ptr [si+13],al         ;row counter
    srolf1:     sub bh,bh
                mov bl,dl           ;move offset
                sub ch,ch
                mov cl,dh           ;loop counter
                mov si,di           ;save initial di value
                shr cx,1            ;divide by two
    srolf2:     mov ax,es:[di+bx]               ;get value
                mov es:word ptr[di],ax   ;resave
                inc di
                inc di
                loop short srolf2
                sub ch,ch
                mov cl,dl           ;length to blank
                shr cl,1            ;divide by 1
                pop ax
                sub bx,bx           ;index
    srolf3:     mov es:word ptr[di],ax
                inc di
                inc di
                loop short srolf3
                mov di,si           ;reset di to row origin
                pop si
                push si
                push ax                         ;reget and resave
                add di,bp
                inc byte ptr[si+13]
                mov al,[si+13]
                sub ah,ah
                cmp ax,[si+1]       ;counter to row size
                jl short srolf1
                pop ax
                pop si
                mov ax,1
                ret
    srolf       endp
    edit        ends
    subttl EDDITAB--Edit control table
    page
    public edittab
    edtb        segment para public 'code'
                assume cs:edtb
    edittab proc far
                db 0        ;byte--number of linked screens
                db 0        ;current active screen
                db 0        ;min active screen
                db 0        ;max active screen
                dd 0                ;function key message
                dd 0                ;control key message
                dd 0                ;alt key message
                dd 0                ; shft fnc key message
                db 7        ;width of lable table
```

```
        db 19     ;width of data table
        db 14     ;width of link table
        db 25     ;screen row size
        db 80     ;screen column size
        dw 0b800h         ;screen core seg addr
        db 0      ;background color--blank
        db 0      ;margin color
        db 2 dup(0)       ;unused space
        db 440 dup(0)     ;linked table
edittab endp
edtb    ends
public helptab
hlptb   segment para public 'code'
        assume cs:hlptb
helptab proc far
        db 0      ;byte--number of linked screens
        db 0      ;current active screen
        db 0      ;min active screen
        db 0      ;max active screen
        dd 0              ;function key message
        dd 0              ;control key message
        dd 0              ;alt key message
        dd 0              ; shft fnc key message
        db 7      ;width of lable table
        db 19     ;width of data table
        db 05     ;width of link table
        db 25     ;screen row size
        db 80     ;screen column size
        dw 0b800h         ;screen core seg addr
        db 0      ;background color--blank
        db 0      ;margin color
        db 2 dup(0)       ;unused space
        db  30 dup(0)     ;linked table
helptab endp
hlptb   ends
end
; END OF EDIT.ASM ASSEMBLER LISTING
; KEYINS.ASM
; SCREEN GENERATION COMPILER (SGC) - Source Code documentation
; Copyright(c) 1987 Syndetic Corporation. All Rights Reserved
; ----- SGC program support module (assembly routine) -----
;
        name keyins
        extrn chrcnv:near
        extrn togon:near
        extrn togop:near
        extrn cfnc0:near
        extrn cfnc8:near
        extrn cfnc9:near
        extrn cfnc33:near
        extrn fldpos:near
        extrn beepsd:near
        extrn edittab:far
        extrn kybop:near
        extrn setertn:near
        extrn rtnstd:near
        extrn inifld:near
        extrn renfld:near
        extrn cursorg:near
        extrn scrorg:near
        extrn fncmsg:near
        extrn curofff:near
  edit     segment byte public 'code'
        assume ds:nothing,cs:edit,es:nothing
```

```
         public kexin      ;keboard for edit1
kexin    proc far
         push bp
         mov bp,sp
         mov ax,0
         call setertn
         call curofff
         call kexbrd
         jmp rtnstd
kexin    endp public kexren     ;keboard for edit1
kexren   proc far
         push bp
         mov bp,sp
         mov ax,0
         call setertn
         call curofff
         call kxxbrd
         jmp rtnstd
kexren   endp
         public kezin      ;keboard for edit2
kezin    proc far
;
; CALL KEZIN(ROWORG,COLORG,ROWSZ,COLSZ,TYPE,ROW,COLUMN,LEN,
;                    CURPOS,COLOR)
;
         push bp
         mov bp,sp
         mov ax,40
         call setertn
         call curofff
         call kezbrd
         jmp rtnstd
kezin    endp
kxxbrd   proc near
; SCREEN GENERATION COMPILER (SGC) - Source Code documentation
; Copyright(c) 1987 Syndetic Corporation. All Rights Reserved
; ----- SGC program support module (assembly routine) -----
;
;
;  This routine is a fundamental entry. When called, the
;        input edit is set up according to pre-existing
;        values.
;
;        ds,si must be set to an existing screen.
;
         mov bx,offset edittab     ;edittab address set
         mov dx,seg edittab
         mov es,dx
         add bx,32
         mov es:word ptr[bx],sp    ;save stack pointer
         mov dx,seg edittab
         mov ds,dx
         mov si,offset edittab
         call renfld      ;re-enter edit
         call kxybrd
         ret
kxxbrd   endp
         subttl KEYBRDA--Keyboard input for SGC edit
kexbrd   proc near
;
;  This routine is a fundamental entry. When called, the
;        input edit is set up according to pre-existing
;        values.
```

```
;
;       ds,si must be set to an existing screen.
;
        mov cs:byte ptr togon,0
        mov bx,offset edittab    ;edittab address set
        mov dx,seg edittab
        mov es,dx
        add bx,32
        mov es:word ptr[bx],sp   ;save stack pointer
        call inifld     ;set to initial field, initial set
kexbrd  endp
kxybrd  proc  near
        mov al,255      ;force proper func display
        mov byte ptr[si+32],al  ;shift state register
kexbd1: call cursor     ;input read routine
        call chrcnv     ;convert for handicapped
        cmp al,0        ;special keys
        jne short kexbd2        ;
        mov al,ah       ;extra chr in ah
        mov bx,offset kexalta   ;alternate key processing
        jmp kexba
kexbd2: mov bx,offset kexed1    ;cursor moves
;
;   stack operator
;
kexba:  cmp al,cs:[bx]  ;milestone test
        jle short kexbb         ;if less than, action found
        inc bx
        inc bx
        jmp short kexba         ;do again
kexbb:  mov bl,cs:[bx+1]        ;get action byte
        sub bh,bh
        shl bx,1                ;mult by two for offset
        add bx,offset kybop     ;add opstack offset
        cmp cs:byte ptr togop,2
        je short kexbe
        mov cs:byte ptr togon,0
kexbe:  call word ptr cs:[bx]
        jmp kexbd1      ;back to keyboard
;
;       integer legal table
;
kexed1: db 7,0   ;skip
        db 8,38         ;back space
        db 9,15         ;tab--clear left
        db 10,17        ;cntrl/rtn--data enter
        db 12,0         ;skip
        db 13,3         ;cr
        db 26,0         ;skip
        db 27,16        ;escape-return
        db 127,0        ;skip remainder
kexalta: db 14,0        ;skip
        db 15,14        ;shifted tab
        db 58,0         ;skip
        db 68,34        ;function keys
        db 71,8                 ;home key--left of field
        db 72,6                 ;cursor up
        db 73,10        ;pg-up--to first field
        db 75,5                 ;cursor left
        db 77,4                 ;cursor right
        db 79,9                 ;end--right of field
        db 80,7                 ;cursor down
        db 81,11        ;pg-down to last field
```

```
        db 82,12         ;insert
        db 83,13         ;delete
        db 93,35         ;shifted function keys
        db 103,36        ;control function keys
        db 113,37        ;alt function keys
        db 127,0         ;finish
kxybrd  endp subttl KEYBRD--Keyboard read and process routine
page
kezbrd  proc near
;
;   This routine is a fundamental entry.  When called, the
;       input edit is set up according to pre-existing
;       values.
;
;       ds,si must be set to an existing screen.
;
        mov cs:byte ptr togon,0
        mov bx,offset edittab    ;edittab address set
        mov dx,seg edittab
        mov es,dx
        add bx,32
        mov es:word ptr[bx],bp   ;save stack pointer
        push bp
        call inifld      ;set to initial field, initial set
        pop bp
        push es
        push di
        les di,dword ptr[bp+42]          ;ROWORG
        mov ax,es:[di]
        dec ax
        mov word ptr [si+5],ax
        les di,dword ptr[bp+38]          ;colORG
        mov ax,es:[di]
        dec ax
        mov word ptr [si+7],ax
        les di,dword ptr[bp+30]          ;colsz
        mov ax,es:[di]
        mov word ptr [si+3],ax
        les di,dword ptr[bp+34]          ;rowsz
        mov ax,es:[di]
        mov word ptr [si+1],ax
        les di,dword ptr[bp+6]   ;color
        mov ax,es:[di]
        mov byte ptr [si+39],al
        mov byte ptr [si+28],al
        les di,dword ptr[bp+10]          ;cursor pos
        mov ax,es:[di]
        mov byte ptr[si+35],al
        les di,dword ptr[bp+14]          ;fld len
        mov ax,es:[di]
        mov byte ptr [bx+6],al
        dec ax
        mov byte ptr [si+36],al
        les di,dword ptr[bp+18]          ;fld col org
        mov ax,es:[di]
        dec ax
        mov byte ptr [bx+1],al
        les di,dword ptr[bp+22]          ;fld row org
```

```
        mov ax,es:[di]
        dec ax
        mov byte ptr [bx],al
        les di,dword ptr[bp+26]         ;label/data field opt
        mov ax,es:[di]
        pop es
        pop di
        mov byte ptr [si+38],al
        mov byte ptr[bx+9],al
        call scrorg
        call cursorg
        mov al,255          ;force proper func display
        mov byte ptr[si+32],al   ;shift state register
kezbd1: call cursor         ;input read routine
        call chrcnv         ;convert for handicapped
        cmp al,0            ;special keys
        jne short kezbd2    ;
        mov al,ah           ;extra chr in ah
        mov bx,offset kezalt    ;alternate key processing
        jmp kezba
kezbd2: mov bl,[si+38]  ;get field type
        mov bh,bl
        cmp bh,1            ;data type
        je short kezbd3
        mov bx,offset kezlab    ;label type
        jmp kezba
kezbd3: mov bh,bl           ;data field type
        mov bx,offset kezdat    ;data field type
;
;   stack operator
;
kezba:  cmp al,cs:[bx]  ;milestone test
        jbe short kezbb         ;if less than, action found
        inc bx
        inc bx
        jmp short kezba         ;do again
kezbb:  mov bl,cs:[bx+1]        ;get action byte
        sub bh,bh
        shl bx,1                ;mult by two for offset
        add bx,offset kzbop     ;add opstack offset
        cmp cs:byte ptr togop,2
        je short kezbe
        mov cs:byte ptr togon,0
kezbe:  call word ptr cs:[bx]   ;operator
        jmp short kezbd1
kezdat  db 7,0   ;null
        db 8,38             ;back space
        db 9,14             ;clear tab left
        db 10,17            ;cntl/rtn
        db 12,0             ;null keys
        db 13,17                    ;cr
        db 26,0             ;null keys
        db 27,16            ;esc
        db 31,0             ;null keys
        db 32,1             ;space
        db 127,0            ;skip
kezlab: db 7,39             ;control keys
        db 8,38             ;back space
        db 9,15             ;tab--clear left
        db 10,17            ;cntl/rtn--data enter
        db 12,39            ;control keys
        db 13,17            ;cr
        db 26,39            ;control keys
```

```
                db 27,16            ;escape-return
                db 31,39            ;control keys
                db 127,1            ;print
    kezalt: db 14,0                 ;skip
                db 15,14            ;shifted tab
                db 25,29            ;alt keys block one
                db 29,0
                db 38,30            ;alt keys group 2
                db 43,0
                db 50,31            ;alt keys group 3
                db 58,0             ;skip
                db 68,34            ;function keys
                db 71,8                     ;home key--left of field
                db 74,0
                db 75,5                     ;cursor left
                db 77,4                     ;cursor right
                db 79,9                     ;end--right of field
                db 80,0                     ;cursor down
                db 81,0             ;pg-down to last field
                db 82,12            ;insert
                db 83,13            ;delete
                db 93,35            ;shifted function keys
                db 103,36           ;control function keys
                db 113,37           ;alt function keys
                db 120,0
                db 131,32           ;alt keys, group 4
                db 255,0
    kezbrd  endp
    specvar proc near
                db 186,205,201,187,200,188,203,202,204,185
                db 176,177,178,219,254,220,223,221,222
                db 027,026,024,025,029,018,023
                db 179,196,218,191,192,217,194,193,195,180,197
    specvar endp
    ctrlvar proc near
                db 000,214,030,017,211,212,189,210
                db 000,000,000,208,199,000,031,181
                db 216,213,190,183,209,198,016,184
                db 215,207,182,000,227,206,228,233
    ctrlvar endp
    page
    subttl KYBOP-keyboard opstack table
    page
    kzbop proc near
                dw offset cfnc0     ;0--nop, drop with beep
                dw offset cfnz1     ;1--legal chr, print on screen
                dw 0
                dw 0
                dw offset cfnz4     ;4--cursor right
                dw offset cfnz5     ;5--cursor left
                dw 0
                dw 0
                dw offset cfnc8     ;8--cursor left to field boundary
                dw offset cfnc9     ;9--cursor right to field boundary
                dw 0
                dw 0
                dw offset cfnz12    ;12--insert chr in field
                dw offset cfnz13    ;13--delete chr from field
                dw 0
                dw offset cfnz15    ;15--blank field cursor to right
                dw offset cfnz16    ;16--esc--return
                dw offset cfnz17    ;17--data enter -- return
                dw offset fmovl
```

```
            dw  offset fmovr         ;19--move left
            dw  offset fmovup        ;20--field up
            dw  offset fmovdw        ;21--move down
            dw  offset getcol        ;22--get color
            dw  offset delfld        ;23--delfield
            dw  offset cfnz24        ;24--blank field
            dw  0
            dw  0
            dw  0
            dw  offset cfnz28        ;28--set global var & return
            dw  offset cfnz29        ;29--alt keys block one
            dw  offset cfnz30        ;30 alt keys block two
            dw  offset cfnz31        ;31 alt keys block three
            dw  offset cfnz32        ;32 alt keys block four
            dw  offset cfnz33        ;33--help
            dw  offset cfnz34        ;34--standard function keys
            dw  offset cfnz35        ;35--shifted function keys
            dw  offset cfnz36        ;36--control function keys
            dw  offset cfnz37        ;37--alternate function keys
            dw  offset cfnz38        ;38--backspace
            dw  offset cfnz39        ;39--control key characters
kzbop   endp
subttl OPS-STACK CODE BLOCKS
page
cfnz1   proc near           ;print on
        mov bl,[si+35]      ;reget cursor position
        sub bh,bh           ;insure high zero
        shl bx,1            ;mult by 2
        mov ah,[si+28]      ;rem color
        sub cl,cl
        cmp cl,[si+38]      ;data/label
        je short cfnz1a
        mov al,176          ;rem fld mrk
cfnz1a: mov es:word ptr[di+bx],ax        ;onto crt
        call cfnz4          ;cursor right
        ret
cfnz1   endp
cfnz4   proc near           ;cursor right
;
; bx has current cursor position
        mov bl,[si+35]      ;get cursor position
;
        mov ah,[si+36]      ;get field len
        cmp bl,ah
        jge short cfnz4a
        inc bl
        mov byte ptr[si+35],bl  ;save cursor
        ret
cfnz4a  proc near
        mov ch,ah
        sub al,al
        call fldpos         ;data field position
        mov al,[bx+1]       ;col org
        add ch,al
        inc ch
        inc ch
        cmp ch,[si+3]       ;display col siz
        jge short cfnz4b
        inc byte ptr[si+35]     ;curs positon
        inc byte ptr[si+36]     ;fld len
        ret
cfnz4b: mov cx,1000         ;440 cps
        mov dx,4000         ;beep length
        call beepsd
        ret
```

```
cfnz4a  endp
cfnz4   endp
cfnz5   proc near        ;cursor
;
; bx has current cursor position
;
        mov bl,[si+35]   ;get cursor position
        cmp bl,0         ;already at min
        je  short cfnz5a
        dec bl
        mov byte ptr[si+35],bl  ;save cursor
        ret
cfnz5a: mov cx,1000      ;440 cps
        mov dx,4000      ;rem length
        call beepsd
        ret
cfnz5   endp
cfnz12  proc near        ;insert character in field
        mov ah,[si+36]   ;fld len
        mov ch,ah
        sub al,al
        call fldpos      ;data field position
        mov al,[bx+1]    ;col org
        add ch,al
        inc ch
        cmp ch,[si+3]    ;display col siz
        jge short cfnzzz
        inc byte ptr[si+35]      ;curs positon
        inc byte ptr[si+36]      ;fld len
        jmp short cfnzy
cfnzzz: mov cx,1000
        mov dx,4000      ;beep length
        call beepsd
        ret
cfnzy:  dec byte ptr[si+35]      ;cfnz4a has inced
        mov bl,[si+36]   ;get field lenght
        sub bh,bh        ;insure clear
        shl bx,1         ;mult by 2
        cmp bx,-2        ;legal field?
        jne short cfnz12a        ;start at 2 less
        ret
cfnz12b: shl bx,1        ;mult by two
        mov ax,es:[di+bx]        ;get screen chr
        mov es:word ptr[di+bx+2],ax     ;place 1 chr right
cfnz12a: shr bx,1        ;div by 2
        dec bx
        cmp bl,[si+35]   ;compare to cursor position
        jge short cfnz12b        ;do till done
        mov al,176       ;rem half tone chr
        sub cl,cl
        cmp cl,[si+38]
        jne short cfnz12c
        mov al,32        ;space
        mov ah,[si+39]   ;field color
cfnz12c: mov bl,[si+35]  ; cursor position
        sub bh,bh
        shl bx,1
        mov es:word ptr[di+bx],ax       ;blank new space
        ret
cfnz12  endp
cfnz13  proc near        ;delete character in field
        mov bl,[si+36]   ;get field lenght
        sub bh,bh        ;insure clear
```

```
        inc bl
        cmp bl,0            ;legal field?
        jne short cfnz13c   ;cannot be zero
        ret
cfnz13c: mov bl,[si+35] ;get current cursor position
        dec bl
cfnz13b: inc bl
        shl bx,1            ;mult by 2
        mov ax,es:[di+bx+2]     ;get screen chr
        mov es:word ptr[di+bx],ax       ;place 1 chr right
        shr bl,1
        cmp bl,[si+36]   ;compare to length
        jl short cfnz13b        ;do till done
        mov al,32           ;space
        mov ah,[si+24]   ;background color
        mov bl,[si+36]   ; cursor position
        sub bh,bh
        shl bx,1
        mov es:word ptr[di+bx],ax       ;blank new space
        dec byte ptr [si+36]
        mov bl,0
        cmp bl,[si+35]
        je short cfnz13e
    ; dec byte ptr [si+35]
    ; removed by DBK 3-35-87
    ; to correct the way BS & DEL were moving 1 space too many to the le
cfnz13e: ret
cfnz13  endp
cfnz15  proc    near    ;blank field cursor to right
        sub bh,bh           ;insure clear
        mov bl,[si+35]   ;cursor position
        shl bx,1            ;mult by 2
        mov al,32
        mov ah,[si+24]   ;field color
cfnz15a: mov es:word ptr[di+bx],ax      ;clear
        shr bx,1
        cmp bl,[si+36]   ;to length
        jge short cfnz15b
        inc bl
        shl bx,1
        jmp short cfnz15a
cfnz15b: mov bl,[si+35] ;cursor pos
        inc bl
        mov byte ptr [si+36],bl         ;set new fld len
        ret
cfnz15  endp
cfnz16 proc near           ;return on es
        mov ax,2            ;returned key for esc
        jmp cfnz98          ;return to caller
cfnz16  endp
cfnz17 proc near           ;return on data enter
        mov ax,1            ;cntl/rtn value
        jmp cfnz98          ;return/jump
cfnz17  endp
cfnz24  proc near          ;blank field
        mov al,0            ;reset cursor to fld left
        mov byte ptr[si+35],al
        jmp cfnz15          ;blank right
cfnz24  endp
cfnz28 proc near           ;set global variable& return
        jmp cfnz98          ;execute return
cfnz28  endp
```

```
cfnz29  proc near       ;alt keys block one
        mov bl,al
        sub bl,16
        jmp altkdo
cfnz29  endp
cfnz30  proc near       ;alt keys block 2
        mov bl,al
        sub bl,20
        jmp altkdo
cfnz30  endp
cfnz31  proc near       ;alt keys block 3
        mov bl,al
        sub bl,25
        jmp altkdo
cfnz31  endp
cfnz32  proc near       ;alt keys block 4
        mov bl,al
        sub bl,95
        jmp altkdo
cfnz32  endp
altkdo  proc near
        sub bh,bh
        add bx,offset specvar
        mov al,cs:[bx]
        jmp cfnz1        ;print spc chr
altkdo  endp
cfnz39  proc near
        mov bl,al        ;get chr number
        sub bh,bh
        add bx,offset ctrlvar
        mov al,cs:[bx]
        jmp cfnz1        ;print spc chr
cfnz39  endp
cfnz33  proc near
        sub al,al
        call fldpos
        mov al,[si+36]
        inc al
        mov byte ptr[bx+6],al
        call cfnc33
        ret
cfnz33  endp
cfnz34  proc near         ;standard function key
        mov bp,4          ;offset to address
        sub ah,ah         ;clear ah, al has key value
        sub al,59         ;clear offset
        mul byte ptr[si+40]    ;table width
        add ax,4          ;clear message address
        mov bx,ax         ;move to index reg
        call cfnz99       ;execute
        ret
cfnz34  endp
cfnz35  proc near         ;shifted function key
        mov bp,16         ;offset to address
        sub ah,ah         ;clear ah, al has key value
        sub al,84         ;clear offset
        mul byte ptr[si+40]    ;table width
        add ax,4          ;clear message address
        mov bx,ax         ;move to index reg
        call cfnz99       ;execute
        ret
cfnz35  endp
```

```
cfnz36  proc near           ;control  function key
        mov bp,8             ;offset to address
        sub ah,ah            ;clear ah, al has key value
        sub al,94            ;clear offset
        mul byte ptr[si+40]     ;table width
        add ax,4             ;clear message address
        mov bx,ax            ;move to index reg
        call cfnz99          ;execute
        ret
cfnz36  endp
cfnz37  proc near           ;alternatefunction key
        mov bp,12            ;offset to address
        sub ah,ah            ;clear ah, al has key value
        sub al,104           ;clear offset
        cmp al,7             ;fnc key 8
        jne short cfnz37a
        mov cs:byte ptr togop,0
        mov cs:byte ptr togon,0
        ret
cfnz37a: cmp al,8
        jne short cfnz37b
        mov cs:byte ptr togop,1
        mov cs:byte ptr togon,4
        ret
cfnz37b: cmp al,9
        jne short cfnz37c
        mov cs:byte ptr togop,2
        mov cs:byte ptr togon,4
        ret
cfnz37c: mul byte ptr[si+40]     ;table width
        add ax,4             ;clear message address
        mov bx,ax            ;move to index reg
        call cfnz99          ;execute
        ret
cfnz37  endp
cfnz38  proc near           ;backspace
        sub al,al
        cmp al,[si+35]       ;cursor zero,at left?
        je short cfnz38a
        dec byte ptr[si+35]     ;decrement cursor
cfnz38a: jmp cfnz13          ;execute chr delet
cfnz38  endp
cfnz98  proc near           ;return jump to caller
        push ax
        les bx,dword ptr[si+47]           ;rem load edittab address
        mov bp,es:[bx+32]    ;get sp set for return
        sub al,al
        call fldpos
        sub ah,ah
        mov al,[si+35]       ;current cursor
        les di,dword ptr[bp+10]
        mov word ptr es:[di],ax
        mov al,[si+36]       ;length
        inc al
        les di,dword ptr[bp+14]
        mov word ptr es:[di],ax
        mov al,[bx+1]        ;colunm
        inc al
        les di,dword ptr[bp+18]
        mov word ptr es:[di],ax
        mov al,[bx]          ;row
        inc al
        les di,dword ptr[bp+22]
```

```
                mov word ptr es:[di],ax
                pop ax
                jmp rtnstd          ;standard return
cfnz98  endp
cfnz99  proc near            ;execute function key
;
;   bp has offset to table
;   bx has function number
;
                push ds             ;save current sement
                push si             ;save current offst
                mov dx,[si+49]      ;edittab segment
                mov si,[si+47]      ;edittab offset
                mov ds,dx
                mov dx,ds:[si+bp+2]     ;get ftab seg
                cmp dx,0                ;does it exist
                jne short cfnz99a
                mov bp,0            ;set to beep
                jmp short cfnz99b
cfnz99a:   mov si,ds:[si+bp]        ;get ftab offset
                mov ds,dx
                mov dl,[si+bx]   ;get operator
                sub dh,dh
                mov ax,[si+bx+5]        ;get returned func value incase return
cfnz99b:   pop si   ;reget offset
                pop ds   ;reget segment
                shl dx,1            ;multiply by two
                mov bp,dx           ;mov to index
                add bp,offset kzbop     ;add ops stack table offset
                call word ptr cs:[bp]   ;execute operation
                ret
cfnz99  endp fmovl proc near  ;mov field left
                sub al,al
                call fldpos
                sub al,al
                cmp al,[bx+1]    ;already first field?
                jl short fmovl1
bppl:       mov cx,1000         ;440 cps
                mov dx,4000         ;beep length
                call beepsd
                ret
fmovl1: sub ch,ch
                mov cl,[si+36]   ;fld len
                inc cl
                cmp cl,ch
                je short bppl
fmovl2: mov ax,es:[di]   ;get chr
                mov word ptr es:[di-2],ax           ;new pos
                inc di
                inc di
                loop short fmovl2
                mov al,32           ;blank
                mov ah,[si+24]   ;bak color
                mov word ptr es:[di-2],ax
                dec byte ptr [bx+1]     ;col org
                sub al,al
                call fldpos
                call cursorg
                ret
fmovl   endp
```

```
fmovr    proc near          ;mov right
         sub al,al
         call fldpos
         mov al,[bx+1]      ;col fld org
         sub ah,ah
         add al,[si+36]     ;fld len
         cmp al,[si+3]      ;at max
         jl short fmovr1
bppr:    mov cx,1000        ;440 cps
         mov dx,4000        ;beep length
         call beepsd
         ret
fmovr1:  sub ch,ch
         mov cl,[si+36]     ;fld len
         inc cl
         cmp cl,ch
         je short bppr
         add di,cx
         add di,cx
fmovr2:  mov ax,es:[di-2]          ;get chr
         mov word ptr es:[di],ax           ;new pos
         dec di
         dec di
         loop short fmovr2
         mov al,32          ;blank
         mov ah,[si+24]     ;bak color
         mov word ptr es:[di],ax
         inc byte ptr [bx+1]       ;col org
         sub al,al
         call fldpos
         call cursorg
         ret
fmovr    endp
fmovup   proc near          ;up move
         sub al,al
         call fldpos
         sub al,al
         cmp al,[bx]
         jl short fmovup1
bppu:    mov cx,1000        ;440 cps
         mov dx,4000        ;beep length
         call beepsd
         ret
fmovup1: dec byte ptr [bx]         ;dec row count
         mov bl,32
         mov bh,[si+24]
         sub ch,ch
         mov cl,[si+36]     ;fld len
         inc cl
         cmp cl,ch
         je short bppu
         push si
         mov si,di
         sub si,160
fmovup2:  mov ax,es:[di]    ;get chr
         mov word ptr es:[si],ax           ;new pos
         mov word ptr es:[di],bx           ;blank
         inc di
         inc di
         inc si
         inc si
         loop short fmovup2
         pop si
```

```
                sub ax,ax
                call fldpos
                call cursorg
                ret
fmovup  endp
fmovdw  proc near          ;down move
                sub al,al
                call fldpos
                mov al,[bx]
                cmp al,[si+1]    ;at min
                jl short fmovdw1
bppd:   mov cx,1000      ;440 cps
                mov dx,4000      ;beep length
                call beepsd
                ret
fmovdw1: inc byte ptr [bx]       ;inc row count
                mov bl,32
                mov bh,[si+24]
                sub ch,ch
                mov cl,[si+36]   ;fld len
                inc cl
                cmp cl,ch
                je  short bppd
                push si
                mov si,di
                add si,160
fmovdw2: mov ax,es:[di]  ;get chr
                mov word ptr es:[si],ax         ;new pos
                mov word ptr es:[di],bx         ;blank
                inc di
                inc di
                inc si
                inc si
                loop short fmovdw2
                pop si
                sub ax,ax
                call fldpos
                call cursorg
                ret
fmovdw  endp
delfld  proc near       ;delete field
                call cfnz24
                mov ax,24
                jmp cfnz28       ;function key return
delfld  endp
getcol  proc near               ;get color under cursor
                mov bl,[si+35]   ;curs pos
                sub bh,bh
                shl bx,1
                mov al,es:[di+bx+1]      ;color byte
                sub ah,ah
                mov byte ptr[si+28],al   ;curs col
                mov byte ptr[si+39],al   ;disp col
                push si
                push ds
                lds si,dword ptr[si+47]          ;edditab
                mov bp,[si+32]   ;stack pointer
                lds si,dword ptr[bp+6]   ;color adr
                mov word ptr [si],ax
                pop ds
                pop si
                ret
getcol  endp
```

```
        subttl GETLABEL--Get label from screen into lstring
        page
public getlabel
getlabel proc far
;
;   GETLABEL(NAME, LEN , ROWORG,COLORG,ROW,COL)
;
        push bp
        mov bp,sp
        mov ax,26
        call setertn       ;prepare for return
;
        mov bx,offset edittab    ;edittab address set
        mov dx,seg edittab
        mov es,dx
        add bx,32
        mov es:word ptr[bx],bp   ;save stack pointer
        push bp
        call inifld        ;set to initial field, initial set
        pop bp
        call argsav        ;save roworg,colorg,row,col
        les di,dword ptr[bp+22]          ;len
        mov cx,es:[di]
        shl cx,1           ;mult by two
        push cx
        call scrorg
        sub ax,ax
        call fldpos
        call cursorg
        mov dx,es          ;mov es;di to ds;si
        mov ds,dx
        mov si,di
        les di,dword ptr[bp+26]          ;lstring
        pop cx
        mov byte ptr es:[di],cl
        inc di
  rep   movsb
        mov ax,1
        jmp rtnstd
getlabel endp
public dislabel
dislabel proc far
;
;   DISLABEL(NAME, LEN , ROWORG,COLORG,ROW,COL)
;
        push bp
        mov bp,sp
        mov ax,26
        call setertn       ;prepare for return
;
        mov bx,offset edittab    ;edittab address set
        mov dx,seg edittab
        mov es,dx
        add bx,32
        mov es:word ptr[bx],bp   ;save stack pointer
        push bp
        call inifld        ;set to initial field, initial set
        pop bp
        call argsav        ;save roworg,colorg,row,col
        les di,dword ptr[bp+22]          ;len
        mov cx,es:[di]
        shl cx,1           ;mult by two
        push cx
```

```
                call scrorg
                sub ax,ax
                call fldpos
                call cursorg
                lds si,dword ptr[bp+26]         ;lstring
                inc si
                pop cx
        rep     movsb
                mov ax,1
                jmp rtnstd
dislabel endp
argsav  proc near
                les di,dword ptr[bp+6]    ;col
                mov ax,es:[di]
                dec ax
                mov byte ptr[bx+1],al
                les di,dword ptr[bp+10]         ;row
                mov ax,es:[di]
                dec ax
                mov byte ptr[bx],al
                les di,dword ptr[bp+14]         ;colorg
                mov ax,es:[di]
                dec ax
                mov word ptr[si+7],ax
                les di,dword ptr[bp+18]         ;roworg
                mov ax,es:[di]
                dec ax
                mov word ptr[si+5],ax
                ret
argsav  endp
;
;       Character row/column print routines
;
kexbrdprt proc near
                push bx
                push di             ;save screen read address
                push ax             ;save character return address
                mov al,[si+13]      ;get field posistion number
                sub ah,ah
                call fldpos         ;get address to field data
                mov al,[bx]         ;row number of field
                inc al              ;offset for zero as first
                mov di,[si+22]      ;get screen page offset
                add di,3984         ;offset to row print
                call prwcl          ;print row number
                mov al,[bx+1]       ;get field column origin
                add al,[si+35]      ;add cursor position offset
                inc al              ;offset for zero as first
                add di,8            ;column print position
                call prwcl          ;print column number
                pop ax
                pop di              ;reset saved vars
                pop bx
                ret
kexbrdprt       endp
;
;
prwcl   proc near
;
;       es:di have print position
;       al has integer 0-255 number
;
                sub ah,ah           ;clear high byte
                mov cl,10           ;divisor
```

```
        div cl              ;divide out first char
        add ah,48           ;remainder has first chr, convert to ascii
        mov es:byte ptr[di+4],ah        ;print 3rd charater
        sub ah,ah           ;clear high byte
        div cl              ;divide out second char
        cmp ax,0            ;if zero, no higher chrs
        jnz short prwcl1
        mov ah,32
        mov es:byte ptr[di+2],ah        ;blank
prwcl2: ret     ;mov es:byte ptr[di],ah         ;blank
        ret
prwcl1: add ah,48           ;remainder has second chr, convert to ascii
        mov es:byte ptr[di+2],ah        ;print 3rd charater
        mov ah,0
        cmp al,0
        je short prwcl2                 ;no third char
        add al,48                       ;convert to ascii
        mov es:byte ptr[di],al  ;move to screen
        ret
prwcl   endp
; SCREEN GENERATION COMPILER (SGC) - Source Code documentation
; Copyright(c) 1987 Syndetic Corporation. All Rights Reserved
; ----- SGC program support module (assembly routine) -----
;
subttl CURSOR--Keyboard read routine with cursor blink
page
cursor  proc near
;
;   es,di,bx--screen position
;
;   ds,si--screen table
;
;   returns ah,al character set from rom-bios
;
        call kexbrdprt  ;print row and col numbers
        sub bh,bh       ;clear
        mov bl,[si+35]  ;cursor fld position
        shl bx,1
        mov ax,es:[di+bx]       ;get chr under cursor
        mov word ptr[si+30],ax  ;save chr
        mov ax,[si+27]  ;get cursor
        mov es:word ptr[di+bx],ax       ;onto crt
        mov cx,800      ;blink rate counter
        mov al,1
        mov byte ptr[si+29],al  ;cursor on screen flag
curso1: mov ah,2        ;read keyboard shift state
        int 16h
        cmp al,[si+32]  ;has state changed
        je short curso5                 ;no change
        and al,1111b    ;test to see if shift state on
        cmp byte ptr cs:togon,0
        je short curso4
        cmp al,0
        jz short curso5
curso4: push ax
        call fncmsg     ;message if nec
        pop ax
        and al,1111b
        cmp al,0
        jne short curso5                ;higher shift on
        push cx
        call kexbrdprt  ;print row and col numbers
        pop cx
```

```
curso5:  mov ah,1              ;read character state
         int 16h
         jnz short curso2      ;zero flag 0, character read
         dec cx                ;dec blink timer
         jnz short curso1      ;not zero, not ready
         xor byte ptr[si+29],1 ;swap key
         jnz short curso3      ;if 1, put cursor on screen
         mov ax,[si+30]        ;get character
         mov es:word ptr[di+bx],ax      ;on crt
         mov cx,800            ;reset counter
         jmp short curso1      ;go again
curso3:  mov ax,[si+27]        ;get cursor
         mov es:word ptr[di+bx],ax      ;on crt
         mov cx,800            ;reset counter
         jmp short curso1      ;go again
curso2:  mov ax,[si+30]        ;get character
         mov es:word ptr[di+bx],ax      ;on crt
         mov ah,0              ;read chr interupt
         int 16h
         ret
cursor   endp
edit ends
end ; END OF KEYINS.ASM ASSEMBLER LISTING
; SCRECUR.ASM
; SCREEN GENERATION COMPILER (SGC) - Source Code documentation
; Copyright(c) 1987 Syndetic Corporation. All Rights Reserved
; ----- SGC program support module (assembly routine) -----
;
         name screcur
public chrcnv
public togon
public togop
public inifld
public kybop
public cursor
public cfnc0
public cfnc8
public cfnc9
public cfnc33
public beepsd
public segset
public segrtn
public fldpos
public fncmsg
         extrn edittab:far
         extrn disscr:near
         extrn fldmrk:near
         extrn fldmk1:near
         extrn scrorg:near
         extrn cursorg:near
         extrn hlpkbd:near
         extrn red1fl:near
         extrn dis1fl:near
         extrn tstrqd:near
         public keybrd
         public keybrda
         public keybrdb
  edit   segment byte public 'code'
         assume ds:nothing,cs:edit,es:nothing
comment* T
; SCRECUR.ASM
```

; SCREEN GENERATION COMPILER (SGC) - Source Code documentation
; Copyright(c) 1987 Syndetic Corporation. All Rights Reserved
; ----- SGC program support module (assembly routine) -----
;
            These routines handle the cursor movement from screen to
            screen.  Screen to screen wrap is allowed.  The following
            functions are inclueded:
                    1.  Initialize to first screen.
                    2.  Increment count to next screen, returning to
                        the min. screen when list exceeded.
                    3.  Decrement count to preceeding screen, going to
                        max screen when first screen is reached.

required:   ds--Set to segment of some screen
            si--set to offset of some screen
   returns ds--screen data segment
           si--screen basic data offset
* subttl KEYBRD--Keyboard read and process routine
page
keybrdb proc near        ;re-enter call
;
;  This routine is a fundamental entry.  When called, the
;       input edit is set up according to pre-existing
;       values.
;
;       ds,si must be set to an existing screen.
;
        mov bx,offset edittab   ;edittab address set
        mov dx,seg edittab
        mov es,dx
        add bx,32
        mov es:word ptr[bx],sp  ;save stack pointer
        call renfld     ;re-enter keyboard in
        call keybrd
        ret
keybrdb endp
keybrda proc near
;
;  This routine is a fundamental entry.  When called, the
;       input edit is set up according to pre-existing
;       values.
;
;       ds,si must be set to an existing screen.
;
        mov byte ptr cs:togon,0         ;clear on entry
        mov bx,offset edittab   ;edittab address set
        mov dx,seg edittab
        mov es,dx
        add bx,32
        mov es:word ptr[bx],sp  ;save stack pointer
        call inifld     ;set to initial field, initial set
keybrda endp
keybrd  proc near
        mov al,255      ;force proper func display
        mov byte ptr[si+32],al  ;shift state register
keybd1: call cursor     ;input read routine
        call chrcnv     ;convert for handicapped toggle
        cmp al,0        ;special keys
        jne short keybd2        ;
        mov al,ah       ;extra chr in ah
        mov bx,offset keyalt    ;alternate key processing
        jmp keyba

```
keybd2: mov bl,[si+38]    ;get field type
        mov bh,bl
        and bh,11b        ;real type bits
        jz short keybd3
        mov bx,offset keyrel   ;get real table offset
        jmp keyba
keybd3: mov bh,bl         ;test to integer type
        and bh,100b       ;integer bit mask
        jz short keybd4
        mov bx,offset keyint   ;get int table offset
        jmp keyba
keybd4: mov bh,bl         ;test to integer type
        and bh,100000b    ;string bit mask
        jz short keybd6
        mov bx,offset keystr   ;get int table offset
        jmp keyba
keybd6: mov bh,bl
        and bh,1000b      ;word mask
        jz short keybd7
        mov bx,offset keywrd
        jmp short keyba
keybd7: mov bh,bl
        and bh,10000b     ;boolean mask
        jz short keybd5
        push ax                ;save character
        mov al,[si+13]    ;current field pointer
        call fldpos
        pop ax
        mov ah,[bx+15]    ;true chr
        and ah,127
        cmp ah,al
        je short keybd8
        sub ah,al
        cmp ah,32         ;cap/small difference
        je short keybd8
        cmp ah,-32
        je short keybd8
        mov ah,[bx+16]    ;false chr
        and ah,127
        cmp ah,al
        je short keybd8
        sub ah,al
        cmp ah,32         ;cap/small difference
        je short keybd8
        cmp ah,-32
        je short keybd8
        mov bx,offset keybool
        jmp keyba
keybd8: mov bl,1          ;print chr
        jmp keybc
keybd5: mov bx,offset keynul    ;no legal field
;
;   stack operator
;
keyba:  cmp al,cs:[bx]    ;milestone test
        jle short keybb        ;if less than, action found
        inc bx
        inc bx
        jmp short keyba        ;do again
        keybb:  mov bl,cs:[bx+1]       ;get action byte
        keybc:  sub bh,bh
                shl bx,1               ;mult by two for offset
                add bx,offset kybop    ;add opstack offset
```

```
        cmp byte ptr cs:togop,2
        je short keybe
        mov byte ptr cs:togon,0
keybe:  call word ptr cs:[bx]
        jmp keybd1         ;back to keyboard
page
keynul: db 26,0            ;skip
        db 27,16           ;escape-return
        db 127,0           ;rest of chrs
;
;       integer legal table
;
keyint: db 7,0    ;skip
        db 8,38            ;back space
        db 9,15            ;tab--clear left
        db 10,17           ;cntrl/rtn--data enter
        db 12,0            ;skip
        db 13,3            ;cr
        db 26,0            ;skip
        db 27,16           ;escape-return
        db 31,0
        db 32,1            ;print space
        db 42,0            ;skip
        db 45,1            ;signs, comma--print
        db 47,0            ;skip
        db 57,1            ;numerals--print
        db 93,0
        db 94,2
        db 127,0           ;skip
keywrd: db 7,0    ;skip
        db 8,38            ;back space
        db 9,15            ;tab--clear left
        db 10,17           ;cntrl/rtn--data enter
        db 12,0            ;skip
        db 13,3            ;cr
        db 26,0            ;skip
        db 27,16           ;escape-return
        db 31,0
        db 32,1            ;print space
        db 47,0            ;skip
        db 57,1            ;numerals--print
        db 93,0
        db 94,2
        db 127,0           ;skip
keybool: db 7,0   ;skip
        db 8,38            ;back space
        db 9,15            ;tab--clear left
        db 10,17           ;cntrl/rtn--data enter
        db 12,0            ;skip
        db 13,3            ;cr
        db 26,0            ;skip
        db 27,16           ;escape-return
        db 31,0
        db 32,1            ;print space
        db 93,0
        db 94,2
        db 127,0           ;skip
keyrel: db 7,0    ;skip
        db 8,38            ;back space
        db 9,15            ;tab--clear left
        db 10,17           ;cntrl/rtn--data enter
        db 12,0            ;skip
        db 13,3            ;cr
```

```
        db 26,0           ;skip
        db 27,16          ;escape-return
        db 31,0
        db 32,1           ;print space
        db 42,0           ;skip
        db 46,1           ;signs, comma, decimal--print
        db 47,0           ;skip
        db 57,1           ;numerals--print
        db 93,0
        db 94,2
        db 127,0          ;skip
keystr: db 7,1    ;print
        db 8,38           ;back space
        db 9,15           ;tab--clear left
        db 10,17          ;cntrl/rtn--data enter
        db 12,1           ;print
        db 13,3           ;cr
        db 26,1           ;print
        db 27,16          ;escape-return
        db 93,1
        db 94,2
        db 127,1          ;print
keyalt: db 14,0           ;skip
        db 15,14          ;shifted tab
        db 58,0           ;skip
        db 68,34          ;function keys
        db 71,8                   ;home key--left of field
        db 72,2                   ;cursor up (-cr)
        db 73,10          ;pg-up--to first field
        db 75,5                   ;cursor left
        db 77,4                   ;cursor right
        db 79,9                   ;end--right of field
        db 80,7                   ;cursor down
        db 81,11          ;pg-down to last field
        db 82,12          ;insert
        db 83,13          ;delete
        db 93,35          ;shifted function keys
        db 103,36         ;control function keys
        db 113,37         ;alt function keys
        db 127,0          ;finish
keybrd  endp
page
subttl KYBOP-keyboard opstack table
page
kybop proc near
        dw offset cfnc0           ;0--nop, drop with beep
        dw offset cfnc1           ;1--legal chr, print on screen
        dw offset cfnc2           ;2--next line (-cr)
        dw offset cfnc3           ;3--next line (+cr)
        dw offset cfnc4           ;4--cursor right
        dw offset cfnc5           ;5--cursor left
        dw offset cfnc6           ;6--cursor up
        dw offset cfnc7           ;7--cursor down
        dw offset cfnc8           ;8--cursor left to field boundary
        dw offset cfnc9           ;9--cursor right to field boundary
        dw offset cfnc10          ;10--cursor to first field
        dw offset cfnc11          ;11--cursor to last field
        dw offset cfnc12          ;12--insert chr in field
        dw offset cfnc13          ;13--delete chr from field
        dw offset cfnc14          ;14--blank field cursor to left
        dw offset cfnc15          ;15--blank field cursor to right
        dw offset cfnc16          ;16--esc--return
        dw offset cfnc17          ;17--data enter -- return
```

```
            dw  0                    ;18--screen to printer
            dw  0                    ;19--5 function calculator
            dw  offset cfnc20        ;20--increment screen absolute
            dw  offset cfnc21        ;21--decrement screen absolute
            dw  offset cfnc22        ;22--first screen, first field
            dw  offset cfnc23a       ;23 clear blink
            dw  offset cfnc24        ;24  blank current data field
            dw  offset cfnc25        ;25  set local variable
            dw  offset cfnc26        ;26--set global variable
            dw  offset cfnc27        ;27--set local var & return
            dw  offset cfnc28        ;28--set global var & return
            dw  offset cfnc29        ;29--return to caller
            dw  offset cfnc30        ;30--diplay current sub-scr labels
            dw  offset cfnc31        ;31--fldmrk--current sub-scr
            dw  offset cfnc32        ;32--dis data--current sub-scr
            dw  offset cfnc33        ;33--help
            dw  offset cfnc34        ;34--standard function keys
            dw  offset cfnc35        ;35--shifted function keys
            dw  offset cfnc36        ;36--control function keys
            dw  offset cfnc37        ;37--alternate function keys
            dw  offset cfnc38        ;38--backspace
            dw  offset cfnc39        ;39--view page 0
            dw  offset cfnc40        ;40--view page 1
            dw  offset cfnc41        ;41--view page 2
kybop   endp
        subttl OPS-STACK CODE BLOCKS
        page
cfnc0   proc near                ;drop with beep
            mov cx,1500          ;pitch
            mov dx,2500          ;len
            call beepsd          ;beeper on
            ret
cfnc0   endp
cfnc1   proc near                ;print on screen
            push ax
            sub al,al
            cmp al,[si+45]
            je short cfnc1a
            mov byte ptr[si+45],al
            call cfnc15
cfnc1a: pop ax
            mov bl,[si+35]       ;reget cursor position
            sub bh,bh            ;insure high zero
            shl bx,1             ;mult by 2
            call cfnc23          ;clear blink
            mov ah,[si+28]       ;rem color
            mov es:word ptr[di+bx],ax        ;onto crt
            call cfnc4           ;cursor right
            ret
cfnc1   endp
cfnc2   proc near                ;cursor up (-cr)
            call redortn         ;read/display option
            mov al,[si+51]       ;screen edit control byte
            and al,10000b        ;mask return on up arrow request
            jz short cfnc2a
            mov ax,6             ;up-arrow return
            jmp cfnc98           ;return
cfnc2a: call decful
            ret
cfnc2   endp
cfnc3   proc near                ;cursor down (cr)
            call redortn         ;read/display option
            call incful
```

```
                ret
cfnc3   endp
cfnc4   proc near       ;cursor right with scroll
;
; bx has current cursor position
        sub al,al
        mov byte ptr[si+45],al
        mov bl,[si+35]  ;get cursor position
;
        mov ah,[si+36]  ;get field len
        cmp bl,ah
        jge short curi1         ;if at limit
        inc bl
        mov byte ptr[si+35],bl  ;save cursor
        ret
curi1:  call redortn    ;read/display option
        mov cx,1000     ;440 cps
        mov dx,4000     ;beep length
        call beepsd
        mov ah,1000000b         ;bit 6 mask
        and ah,[si+37]  ;forward wrap bit
        jnz short curi2
        call incful     ;increment to new field
curi2:  ret
cfnc4   endp
cfnc5   proc near       ;cursor left with scroll
;
; bx has current cursor position
;
        sub al,al
        mov byte ptr[si+45],al
        mov bl,[si+35]  ;get cursor position
        cmp bl,0        ;already at min
        je short curl1          ;if at limit
        dec bl
        mov byte ptr[si+35],bl  ;save cursor
        ret
curl1:  call redortn    ;read/display option
        mov cx,1000     ;440 cps
        mov dx,4000     ;rem length
        call beepsd
        mov ah,10000000b        ;bit 7 mask
        and ah,[si+37]  ;forward wrap bit
        jnz short curl2
        call decful     ;decrement to new field
curl2:  ret
cfnc5   endp
cfnc6   proc near       ;cursor up, cursor position no change
        call redortn    ;read/display option
        mov al,[si+35]  ;get cursor position
        push ax                 ;save
        call decful     ;decrement field count
        pop ax          ;reget cursor position
        cmp al,[si+36]  ;compare to field len
        jle short cfnc6a
        mov al,[si+36]  ;use len, cursor to field end
cfnc6a: mov byte ptr[si+35],al  ;re-set cursor
        ret
cfnc6   endp
cfnc7   proc near       ;cursor down, cursor position no change
        call redortn    ;read/display option
        mov al,[si+51]  ;screen edit control byte
        and al,100000b  ;mask return on down arrow request
```

```
                jz short cfnc7b
                mov ax,5            ;down arrow return
                jmp cfnc98          ;return
cfnc7b:         mov al,[si+35]      ;get cursor position
                push ax
                call incful         ;increment field count
                pop ax              ;reget cursor position
                cmp al,[si+36]      ;compare to field len
                jle short cfnc7a
                mov al,[si+36]      ;use len, cursor to field end
cfnc7a:         mov byte ptr[si+35],al  ;re-set cursor
                ret
cfnc7           endp
cfnc8           proc near           ;set cursor to left of field
                mov al,0            ;cursor set
                mov byte ptr[si+35],al   ;set
                ret
cfnc8           endp
cfnc9           proc near           ;set cursor to right
                mov al,[si+36]      ;cursor set to length
                mov byte ptr[si+35],al   ;set
                ret
cfnc9           endp
cfnc10          proc near           ;set cursor to first field on sub-screen
                call redortn        ;read/display option
                mov al,255
                mov byte ptr[si+13],al   ;set
                call incfld         ;increment to first
                ret
cfnc10          endp
cfnc11          proc near           ;set cursor to lastt field on sub-screen
                call redortn        ;read/display option
                mov al,127          ;fake current field no setting
                mov byte ptr[si+13],al   ;set
                call decfld         ;decrement to last
                ret
cfnc11          endp
cfnc12          proc near           ;insert character in field
                sub al,al
                mov byte ptr[si+45],al
                mov bl,[si+36]      ;get field lenght
                sub bh,bh           ;insure clear
                shl bx,1            ;mult by 2
                cmp bx,0            ;legal field?
                jne short cfnc12a             ;start at 2 less
                ret
cfnc12b:        shl bx,1            ;mult by two
                mov ax,es:[di+bx]             ;get screen chr
                mov es:word ptr[di+bx+2],ax    ;place 1 chr right
cfnc12a:        shr bx,1            ;div by 2
                dec bx
                cmp bl,[si+35]      ;compare to cursor position
                jge short cfnc12b             ;do till done
                mov al,176          ;rem half tone chr
                mov ah,[si+39]      ;field color
                mov bl,[si+35]      ; cursor position
                shl bx,1
                mov es:word ptr[di+bx],ax       ;blank new space
                ret
cfnc12          endp
cfnc13          proc near           ;delete character in field
                sub al,al
                mov byte ptr[si+45],al
```

```
        mov bl,[si+36]     ;get field lenght
        sub bh,bh          ;insure clear
        cmp bl,0           ;legal field?
        jne short cfnc13c  ;cannot be zero
        ret
cfnc13c: mov bl,[si+35]    ;get current cursor position
cfnc13b: shl bx,1                      ;mult by 2
        mov ax,es:[di+bx+2]            ;get screen chr
        mov es:word ptr[di+bx],ax      ;place 1 chr right
        shr bl,1
        inc bl
        cmp bl,[si+36]     ;compare to length
        jl short cfnc13b   ;do till done
        mov al,176         ;rem half tone chr
        mov ah,[si+39]     ;field color
        mov bl,[si+36]     ; cursor position
        shl bx,1
        mov es:word ptr[di+bx],ax      ;blank new space
        ret
cfnc13   endp
cfnc14   proc    near      ;blank field cursor to left
        sub bh,bh          ;insure clear
        mov bl,[si+35]     ;cursor position
        shl bx,1           ;mult by 2
        mov al,176         ;half tone chr
        mov ah,[si+39]     ;field color
cfnc14a: mov es:word ptr[di+bx],ax     ;clear
        cmp bl,0
        je short cfnc14b
        dec bl
        dec bl
        jmp short cfnc14a
cfnc14b: ret
cfnc14   endp
cfnc15   proc    near      ;blank field cursor to right
        sub bh,bh          ;insure clear
        mov bl,[si+35]     ;cursor position
        shl bx,1           ;mult by 2
        mov al,176         ;half tone chr
        mov ah,[si+39]     ;field color
cfnc15a: mov es:word ptr[di+bx],ax     ;clear
        shr bx,1
        cmp bl,[si+36]     ;to length
        jge short cfnc15b
        inc bl
        shl bx,1
        jmp short cfnc15a
cfnc15b: ret
cfnc15   endp
cfnc16 proc near           ;return on esc
        call redortn       ;read/display option
        mov ax,2           ;returned key for esc
        jmp cfnc98         ;return to caller
cfnc16  endp
cfnc17 proc near           ;return on data enter
        call redortn       ;read/display option
        call tstrqd        ;test for required input
        cmp bp,0           ;error count
        je short cfn17a
        ret
cfn17a: mov ax,1           ;cntl/rtn value
        jmp cfnc98         ;return/jump
cfnc17  endp
```

```
cfnc20 proc near            ;increment screen absolute
        call redortn        ;read/display option
        call abincf
        ret
cfnc20 endp
cfnc21 proc near            ;dedrement screen absolute
        call redortn        ;read/display option
        call abdecf
        ret
cfnc21 endp
cfnc22  proc near           ;set to first screen
        call initsc         ;initial set
        ret
cfnc22 endp
cfnc23  proc near           ;clear field blink
        mov ah,es:[di+bx+1]     ;get color under cursor
        and ah,10000000b        ;mask blink bit
        jnz cfnc23a
        ret                 ;not blinking
cfnc23a proc near
        mov bl,[si+36]      ;start at field right
        sub bh,bh           ;clear hi byte
        shl bx,1            ;mult by 2
        inc bx   ;point to color byte
        mov ah,01111111b            ;blank blink bit
cfnc23b: and es:byte ptr[di+bx],ah       ;clear bit
        dec bx
        dec bx
        jg short cfnc23b
        mov bl,[si+35]      ;reget cursor pos
        sub bh,bh           ;clear high byte
        shl bx,1            ;mult curs pos by two
        ret
cfnc23a endp
cfnc23  endp
cfnc24  proc near           ;blank field
        mov al,0            ;reset cursor to fld left
        mov byte ptr[si+35],al
        jmp cfnc15          ;blank right
cfnc24  endp
cfnc25 proc near            ;set local variable
        ret
cfnc25 endp
cfnc26 proc near            ;set global variable
        ret
cfnc26 endp
cfnc27 proc near            ;set local  variable& return
        ret
cfnc27 endp
cfnc28 proc near            ;set global variable& return
        push ax
        call redortn
        pop ax
        jmp cfnc98          ;execute return
cfnc28 endp
cfnc29 proc near            ;return to caller
        mov ax,0            ;function return
        jmp cfnc98          ;execute return
cfnc29 endp
cfnc30  proc near           ;display labels
        mov al,[si+13]      ;get current field pointer
        push ax                     ;save
        call disscr         ;display labels
```

```
                pop ax
                mov byte ptr[si+13],al  ;reset fld pointer
                call fldpos     ;computefld position
                call cursorg    ;compute cursor orgin
                ret
cfnc30  endp
cfnc31  proc near        ;field mark
                mov al,[si+13]  ;get current field pointer
                push ax                 ;save
                call fldmrk     ;mark data fields
                pop ax
                mov byte ptr[si+13],al  ;reset fld pointer
                call fldpos     ;computefld position
                call cursorg    ;compute cursor orgin
                ret
cfnc31  endp
cfnc32  proc near        ;Display Data
                mov al,[si+13]  ;get current field pointer
                push ax                 ;save
;               call xxxxxk     ;display data
                pop ax
                mov byte ptr[si+13],al  ;reset fld pointer
                call fldpos     ;computefld position
                call cursorg    ;compute cursor orgin
                ret
cfnc32  endp
cfnc33  proc near        ;help
                call hlpkbd     ;call help controler
                ret
cfnc33  endp
cfnc34  proc near        ;standard function key
                push ax
                call redortn
                pop ax
                mov bp,4        ;offset to address
                sub ah,ah       ;clear ah, al has key value
                sub al,59       ;clear offset
                mul byte ptr[si+40]     ;table width
                add ax,4        ;clear message address
                mov bx,ax       ;move to index reg
                call cfnc99     ;execute
                ret
cfnc34  endp
cfnc35  proc near        ;shifted  function key
                push ax
                call redortn
                pop ax
                mov bp,16       ;offset to address
                sub ah,ah       ;clear ah, al has key value
                sub al,84       ;clear offset
                mul byte ptr[si+40]     ;table width
                add ax,4        ;clear message address
                mov bx,ax       ;move to index reg
                call cfnc99     ;execute
                ret
cfnc35  endp
cfnc36  proc near        ;control  function key
                push ax
                call redortn
                pop ax
                mov bp,8        ;offset to address
                sub ah,ah       ;clear ah, al has key value
                sub al,94       ;clear offset
```

```
        mul byte ptr[si+40]     ;table width
        add ax,4                ;clear message address
        mov bx,ax               ;move to index reg
        call cfnc99             ;execute
        ret
cfnc36  endp
cfnc37  proc near               ;alternatefunction key
        push ax
        call redortn
        pop ax
        mov bp,12               ;offset to address
        sub ah,ah               ;clear ah, al has key value
        sub al,104              ;clear offset
        cmp al,7                ;clear togop
        jne short cfnc37a
        mov byte ptr cs:togop,0
        mov byte ptr cs:togon,0
        ret
cfnc37a: cmp al,8               ;set to one chr toggle
        jne short cfnc37b
        mov byte ptr cs:togop,1
        mov byte ptr cs:togon,4
        ret
cfnc37b: cmp al,9
        jne short cfnc37c
        mov byte ptr cs:togop,2
        mov byte ptr cs:togon,4
        ret
cfnc37c: mul byte ptr[si+40]    ;table width
        add ax,4                ;clear message address
        mov bx,ax               ;move to index reg
        call cfnc99             ;execute
        ret
cfnc37  endp
cfnc38  proc near               ;backspace
        sub al,al
        cmp al,[si+35]          ;cursor zero,at left?
        je short cfnc38a
        dec byte ptr[si+35]     ;decrement cursor
cfnc38a: jmp cfnc13             ;execute chr delet
cfnc38  endp
cfnc39  proc near               ;veiw page 0
        mov al,0
        jmp cfnc41a
cfnc39  endp
cfnc40  proc near               ;veiw page 1
        mov al,1
        jmp cfnc41a
cfnc40  endp
cfnc41  proc near               ;veiw page 2
        mov al,2
cfnc41  endp
cfnc41a proc near               ;switch page viewing
        mov ah,5                ;page code
        int 10h
        call cursor
        call segset
        call renfld             ;re-enter screen
        ret
cfnc41a endp
cfnc98  proc near               ;return jump to caller
        les bx,dword ptr[si+47]          ;rem load edittab address
```

```
                mov sp,es:[bx+32]       ;get sp set for return
                ret
cfnc98    endp
cfnc99    proc near             ;execute function key
;
;   bp has offset to table
;   bx has function number
;
                push ds                 ;save current sement
                push si                 ;save current offst
                mov dx,[si+49]    ;edittab segment
                mov si,[si+47]    ;edittab offset
                mov ds,dx
                mov dx,ds:[si+bp+2]     ;get ftab segment
                cmp dx,0                ;does it exist
                jne short cfnc99a
                mov bp,0                ;set to beep
                jmp short cfnc99b
cfnc99a:  mov si,ds:[si+bp]       ;get ftab offset
                mov ds,dx
                mov dl,[si+bx]    ;get operator
                sub dh,dh
                mov ax,[si+bx+5]        ;get returned func value incase return
cfnc99b:  pop si  ;reget offset
                pop ds  ;reget segment
                shl dx,1                ;multiply by two
                mov bp,dx               ;mov to index
                add bp,offset kybop     ;add ops stack table offset
                call word ptr cs:[bp]   ;execute operation
                ret
cfnc99    endp
subttl REDORTN--Read/Display on cursor advance.
redortn proc near
                mov al,1                ;read on return mask
                and al,[si+43]    ;control option byte
                jz short redor1
                call red1fl             ;read
                mov al,2                ;display on return mask
                and al,[si+43]    ;control option byte
                jz short redor1
                call fldmk1             ;mark field
                call dis1fl             ;display
redor1: ret
redortn endp
subttl BEEPSD--Beep the speaker.
page
beepsd    proc near
;
;  cx has pitch, 2711=440cps
;  dx has beep length
;
                push ax                       ;save ax
                mov al,0b6h       ;timer mode
                out 67,al         ;output mode
                mov al,cl
                out 66,al         ;output low byte
                mov al,ch
                out 66,al         ;output high byte
                in al,97          ;get current set
                or al,11b         ;set two low bytes on
                out 97,al         ;putput speaker on
beeps1: dec dx
                jnz short beeps1        ;on until zero
```

```
        in al,97             ;get set
        and al,11111100b     ;two bit off mask
        out 97,al
        pop ax               ;restore ax
        ret
beepsd  endp
subttl (SCRECUR) CURSOR keyboard read routine with cursor blink
page
cursor  proc near
;
;   es,di,bx--screen position
;
;   ds,si--screen table
;
;   returns ah,al character set from rom-bios
        sub bh,bh            ;clear
        mov bl,[si+35]       ;cursor fld position
        shl bx,1
        mov ax,es:[di+bx]    ;get chr under cursor
        mov word ptr[si+30],ax  ;save chr
        mov ax,[si+27]       ;get cursor
        mov es:word ptr[di+bx],ax    ;onto crt
        mov cx,800           ;blink rate counter
        mov al,1
        mov byte ptr[si+29],al   ;cursor on screen flag
curso1: mov ah,2             ;read keyboard shift state
        int 16h
        and al,1111b
        cmp byte ptr cs:togon,0
        je short curso4
        cmp al,0
        jz short curso5
curso4: call fncmsg          ;message if nec
curso5: mov ah,1             ;read character state
        int 16h
        jnz short curso2     ;zero flag 0, character read
        dec cx               ;dec blink timer
        jnz short curso1     ;not zero, not ready
        xor byte ptr[si+29],1    ;swap key
        jnz short curso3     ;if 1, put cursor on screen
        mov ax,[si+30]       ;get character
        mov es:word ptr[di+bx],ax    ;on crt
        mov cx,800           ;reset counter
        jmp short curso1     ;go again
curso3: mov ax,[si+27]       ;get cursor
        mov es:word ptr[di+bx],ax    ;on crt
        mov cx,800           ;reset counter
        jmp short curso1     ;go again
curso2: mov ax,[si+30]       ;get character
        mov es:word ptr[di+bx],ax    ;on crt
        mov ah,0             ;read chr interupt
        int 16h
        ret
cursor  endp
subttl FNCMSG--Display appropriate func key message
page
fncmsg  proc near
comment *
        ds--set to current basic table
        si--set to current basic offset
        es--screen base segment al--has shift key condition set
```

```
              byte 5--alt key depressed
                   6--cntl key depressed
                   7--left shift depressed
                   8--right shift depressed
*
              cmp al,byte ptr[si+32]   ;same a last?
              jne short fncmsa
fncmsb:       ret                      ;same , do nothing
fncmsa:       cmp byte ptr cs:togon,0
              je short fncms1                   ;not toggle on is set
              cmp al,0
              je short fncmsb                   ;zero set on shifts cannot provo
              cmp byte ptr cs:togop,1           ;single chr set?
              je short fncms1
              mov ah,al                ;get new copy
              xor ah,cs:togon                   ;shift match
              je short fncmsc
              mov ah,al
              sar ah,1
              xor ah,cs:togon                   ;matches other sets
              jnz short fncms1         ;not equal, set to this
fncmsc:       mov al,0                 ;set to no shift
fncms1:       mov byte ptr[si+32],al   ;save in last
              push bx                  ;save register
              push cx
              push di
              push si
              push ds
              sar al,1          ;bit to carry
              jc short fncms3          ;left shift on
              sar al,1          ;right shift to carry
              jnc short fncms4         ;if not on, no shifts
fncms3:       mov bx,16
              cmp byte ptr cs:togop,0
              je short fncms6
              mov byte ptr cs:togon,1
              jmp short fncms6
fncms4:       sar al,1          ;control shift to carry
              jnc short fncms5
              mov bx,8
              cmp byte ptr cs:togop,0
              je short fncms6
              mov byte ptr cs:togon,2
              jmp short fncms6
fncms5:       sar al,1          ;alt key to carry
              jnc short fncms7
              mov bx,12
              cmp byte ptr cs:togop,0
              je short fncms6
              mov byte ptr cs:togon,4
              jmp short fncms6
fncms7:       mov bx,4
              mov byte ptr cs:togon,0
fncms6:       sub ah,ah         ;clear high byte
              mov byte ptr cs:togclr,0
              mov al,[si+21]    ;screen columns
              mov cx,ax         ;save in cx
              mul byte ptr[si+20]      ;multiply by rows
              sub ax,cx         ;correct
              shl ax,1          ;multiply by two
              shl cx,1          ;multiply by two
              mov di,ax         ;set dest offset
              add di,[si+22]    ;screen page offset
```

```
                mov     dx,[si+49]      ;edittab segment
                mov     si,[si+47]      ;offset
                mov     ds,dx
                mov     dx,[si+bx+2]            ;table segment
                cmp     dx,0
                je      short fncms8
                mov     si,[si+bx]      ;offset control table
                mov     ds,dx
                mov     dx,[si+2]       ;message segment
                cmp     dx,0
                je      short fncms8
                mov     si,[si]         ;get message offset
                mov     ds,dx
        rep     movsb                   ;mov message to screen
fncms8:         pop     ds      ;restore register
                pop     si
                pop     di
                pop     cx
                pop     bx
                ret
fncmsg          endp
        subttl HANDLE SHIFTS--Handicaped useage shift retains
        page
chrcnv          proc    near            ;convert to shifted chars
;
;               ah,al have high low from keyboard
;
                mov     dl,cs:togon     ;get togon set
                cmp     dl,0
                jne     short cnv1      ;do only if on
                ret
cnv1:           cmp     al,0            ;do lo,hi conversion seperate
                je      short cnvh1
                sar     dl,1            ;shift key to carry
                jnc     short cnv2
                cmp     al,122          ;execute shift functions on lo
                jg      short cnv3
                cmp     al,97           ; compare a to z range
                jl      short cnv3
                sub     al,32           ; conver to upper case
cnv3:           cmp     al,9            ; tab
                jne     short cnv3a
                mov     ah,16
                sub     al,al
cnv3a:          ret                     ;done with shift
cnv2:           sar     dl,1            ;move control to carry
                jnc     short cnv4
                cmp     al,13           ; return is only control lo key
                jne     short cnv5
                mov     al,10
cnv5:           ret                     ;control done
cnv4:           sar     dl,1            ; move alt to carry
                jnc     short cnv6
                mov     bx,offset keyaltz       ;conversion table
cnv7:           cmp     al,cs:[bx]
                jle     short cnv8
                inc     bx
                inc     bx
                jmp     short cnv7
cnv8:           mov     dh,cs:[bx+1];
                cmp     dh,0
                je      short cnv6
                mov     ah,dh
```

```
          sub al,al
cnv6:     ret                    ;alt done
cnvh1:    mov dh,25              ; high keys
          sar dl,1               ; shift to carry
          jc short cnvh2
          mov dh,35
          sar dl,1               ;control to carry
          jc short cnvh2
          mov dh,45
          sar dl,1               ;alt to carry
          jc short cnvh2
          mov dh,0
cnvh2:    cmp ah,68              ;Funtion keys hi
          jg short cnvh3
          cmp ah,59
          jl short cnvh3
          add ah,dh
cnvh3:    ret
keyaltz:  db 44,0
          db 45,130
          db 47,0
          db 48,129
          db 49,120
          db 50,121
          db 51,122
          db 52,123
          db 53,124
          db 54,125
          db 55,126
          db 56,127
          db 57,128
          db 96,0
          db 97,30
          db 98,48
          db 99,46
          db 100,32
          db 101,18
          db 102,33
          db 103,34
          db 104,35
          db 105,23
          db 106,36
          db 107,37
          db 108,38
          db 109,50
          db 110,49
          db 111,24
          db 112,25
          db 113,16
          db 114,19
          db 115,31
          db 116,20
          db 117,22
          db 118,47
          db 119,17
          db 120,45
          db 121,21
          db 122,44
          db 127,0
togon     label   byte
          db 0
togop     label byte
          db 0
togclr    label byte
          db 0
```

```
chrcnv  endp
subttl INIFLD--First call, set Field count to intial screen and field.
page
inifld  proc near
;
;   this is the intial call in edit.  A screen must have been set
;        in ds,si.
;
        call initsc     ;set to initialy specified screen, else first.
        mov al,[si+34]  ;get first field specified
        dec al          ; decrement to fake increment field
        mov byte ptr[si+13],al  ;set current field
        call incful     ;set to field
        ret
inifld  endp
subttl RENFLD--Re-Enter editor to last set
page
        public renfld
renfld  proc    near
        call resc       ;re-enter to field set
        mov al,[si+35]  ;cursor pos
        push ax
        mov al,[si+13]  ;get current field no
        dec al
        mov byte ptr[si+13],al  ;save
        call incful
        pop ax
        mov byte ptr[si+35],al  ;restore cursor
        ret
        ret
renfld  endp
subttl  INCFUL--Increment field with all wrap options
page
incful  proc near
;
;   assumes a pre-existant call to INIFLD
;
incfu0: call incfld     ;increment field count
        cmp ah,0        ;zero return if legal field not found
        je short incfu1
        ret
incfu1: mov al,[si+51]  ;screen edit option
        mov ah,al       ;save copy
        and ah,100b     ;mask 'return on wrap' key
        jz short incfu2
        call tstrqd     ;input required:
        cmp bp,0        ;error test
        je short incfu4
        ret
incfu4: mov ax,3        ;forward wrap return value
        jmp cfnc98      ;execute return jump
incfu2: call incsc      ;standard case, increment screen count
        mov al,255      ;fake current for incfld to first
        mov byte ptr[si+13],al  ;save current
        call incfld     ;get first field
        ret
incful  endp
subttl  DECFUL--Decrement field with all wrap options
page
decful  proc near
;
;   assumes a pre-existant call to INIFLD
;
```

```
decfu0: call decfld       ;decrement field count
        cmp ah,0           ;zero return if legal field not found
        je short decfu1
        ret
decfu1: mov al,[si+51]     ;screen edit option
        mov ah,al          ;save copy
        and ah,1000b       ;mask 'return on wrap, reverse' key
        jz short decfu2
        call tstrqd        ;input required:
        cmp bp,0           ;error test
        je short decfu4
        ret
decfu4: mov ax,4           ;reverse wrap return value
        jmp cfnc98         ;jump to return
decfu2: call decsc         ;standard case, decrement screen count
        mov al,127         ;fake current for incfld to first
        mov byte ptr[si+13],al  ;save current
        call decfld        ;get first field
        ret
decful  endp
subttl ABINCF--Over-ride wrap suppression
page
abincf  proc near
;
; screen is incremented over wrap suppresson, then next field selected.
;
        call incsc         ;increment screen
        mov al,255         ;fake increment field routine
        mov byte ptr[si+13],al  ;save in first
        jmp incful         ;go from here
abincf  endp
subttl LEGSCR--Tests screen for legal edit capability
subttl ABDECF--Over-ride wrap suppression
page
abdecf  proc near
;
; screen is decremented over wrap suppresson, then next field selected.
;
        call decsc         ;decrement screen
        mov al,127         ;fake increment field routine
        mov byte ptr[si+13],al  ;save in first
        jmp decful         ;go from here
abdecf  endp
subttl LEGSCR--Tests screen for legal edit capability
page
;
;  This routine tests a screen for legal edit capability.
;  ax returned as zero for illegal field
;
legscr  proc near
;
;       ds,si set to screen required
;
        call scrorg        ;compute screen origin
        mov al,1           ;mask for edit check
        and al,[si+51]     ;break out edit bit
        jnz short legsc1   ;edit allowed
        mov ax,0           ;set no edit flag
        ret
legsc1: mov ax,0ffffh      ;check for legal offset
        and ax,[si+58]     ;offset must not be zero
        jnz short legsc2
        mov ax,0
```

```
legsc2: ret
legscr  endp
subttl INCFLD--Increment Field count
page
incfld  proc near
;
; Increment field count.  BS,SI set
;
; returns ah 0 for illegal set, 1 for legal set
;
        MOV AL,1
        mov byte ptr[si+45],al
        call legscr     ;test screen legality
        cmp ax,0        ;if zero, no field edit possible
        jz short incfl3
incfl2: inc byte ptr[si+13]     ;inc current field
        mov al,[si+13]  ;mov to accum
        cmp al,[si+18]  ;rem compare to min
        jge short incfl4
        mov al,[si+18]  ;set to min
incfl4: cmp al,[si+19]  ;compare to max
        jle short incfl1
incfl3: call setedi     ;set illegal edit conditons
        mov ax,0        ;set illegal flag
        ret
incfl1: call fldpos     ;set field position index
        mov cl,111b     ;edit control byte mask
        and cl,[bx+7]   ;field edit control word
        xor cl,111b     ;reverse bits
        jz short incfl2         ;will be zero if input not allowed
        call setedl     ;set legal edit conditons
        mov ah,0ffh     ;set legal flag
        ret
incfld  endp
subttl DECFLD--Decrement Field count
page
decfld  proc near
;
; Decrement field count.  BS,SI set
;
; returns ah 0 for illegal set, 1 for legal set
;
        MOV AL,1
        mov byte ptr[si+45],al
        call legscr     ;test for screen edit legality
        cmp ax,0        ;if zero, no field edit possible
        jz short decfl3
decfl2: mov al,[si+13]  ;mov current to accum
        cmp al,[si+18]  ;compare to min fld
        jg  short decfl1
decfl3: call setedi     ;set illegal edit conditons
        mov ax,0        ;set illegal flag
        ret
decfl1: dec al          ;decrement count
        cmp al,[si+19]  ;compare to max filed
        jle short decfl4
        mov al,[si+19]  ;set to max field
decfl4: call fldpos     ;set field position index
        mov cl,111b     ;edit control byte mask
        and cl,[bx+7]   ;field edit control word
        xor cl,111b     ;reverse option bit sets
        jz short decfl2         ;will be zero if input not allowed
        call setedl     ;set legal edit conditons
```

```
        mov ah,0ffh      ;set legal flag
        ret
decfld  endp
subttl SETEDL--set edit control for a legal field
page
setedl  proc near
;
;  Edit conditions are control the keyboard/screen display to
;  accept input for a legal field condition.  FLDPOS must have
;  been called.
;
        mov al,[bx+4]    ;keyboard color
        mov byte ptr[si+28],al  ;store
        mov al,127       ;cursor chr
        mov byte ptr[si+27],al  ;store
        mov al,0         ;initial curosr offset
        mov byte ptr[si+35],al  ;store
        mov al,[bx+6]    ;field length
        dec al   ;subtract 1
        mov byte ptr[si+36],al  ;store
        mov al,[bx+7]    ;cursor wrap conditions
        mov byte ptr[si+37],al  ;store
        mov al,[bx+9]    ;field type
        mov byte ptr[si+38],al  ;store
        mov al,[bx+2]    ;display color
        mov byte ptr[si+39],al  ;store
        mov al,[bx+11]   ;o5%, 2nd conttrol byte
        mov byte ptr [si+43],al          ;save
        call cursorg     ;establish cursor orgin
        ret
setedl  endp
subttl SETEDI--set edit control for an illegal field
page
setedi  proc near
;
;  Edit conditions are control the keyboard/screen display to
;  accept input for an illegal field condition.  FLDPOS must have
;  been called.
;
        mov al,[si+24]   ;keyboard color set to background
        mov byte ptr[si+28],al  ;store
        mov byte ptr[si+39],al  ;display color
        mov al,127       ;cursor chr
        mov byte ptr[si+27],al  ;store
        mov al,0         ;field length
        mov byte ptr[si+35],al  ;int cursor pos
        mov byte ptr[si+36],al  ;store
        mov byte ptr[si+37],al  ;store
        mov byte ptr[si+38],al  ;data type
        mov di,[si+11]   ;screen origin
        shl di,1         ;mult by two
        mov es,[si+22]   ;screen base
        ret
setedi  endp
subttl FLDPOS--Compute offset in table to field data
page
fldpos  proc    near
;
;  al has field number
;
        mov byte ptr[si+13],al   ;save current position
        sub ah,ah        ;clear high
        mul byte ptr[si+26]      ;mutl by table width
```

```
            mov bx,[si+58]    ;get table address
            cmp bx,0          ;if blank, do not set
            jz short fldpo1
            add bx,ax         ;add computed offset
fldpo1:     ret
fldpos      endp
subttl SEGSET-- Segment Address Set Routine
page
segset      proc near
;
;this proceedure sets the data segments ds,si to edittab values
;
            mov dx,[si+49]    ;get edittab segment
            mov si,[si+47]    ;get edittab offset
            mov ds,dx
            ret
segset      endp
subttl INTSC--Set Screen to First Screen With Edit Enable
page
;
;   set screen pointer of first editable screen
;
initsc      proc near                    ;Initialize screen position
            mov si,offset edittab        ;rem editab address
            mov dx,seg edittab
            mov ds,dx
            mov al,[si+29]    ;get first screen cursor set
initsc      endp
intsc5      proc near
            cmp al,[si+2]     ;compare to first screen
            jge short intsc6
            mov al,[si+2]     ;use first
            jmp short intsc4             ;legal entry
intsc6:     cmp al,[si+3]     ;compare to last
            jle short intsc4
            mov al,[si+3]     ;use last
intsc4:     mov byte ptr[si+31],al   ;rem starting point save
intsc2:     call segrtn       ;set segment regs to selected screen
            mov al,11b        ;edit control mask
            and al,[si]                  ;data field or function keys must exist
            jz  short intsc1
            ret                ;editable screen found
intsc1:     call segset       ;set register again
            inc byte ptr[si+1]           ;increment current
            mov al,[si+1]     ;move  current to accum
            cmp al,[si+3]     ;last
            jle short intsc3             ;do again
            mov al,[si+2]     ;use first
intsc3:     cmp al,[si+31]    ;compare to starting point
            jnz short intsc2             ;legal screen found
            call segrtn       ;set segments for return
            ret               ;error message needed here
intsc5      endp
Subttl RESC--Re-enter Edit at Last Screen Set
page
;
; re-enter edit at last point
;
            public resc
resc        proc near
            mov al,[si+1]     ;start with current set
            jmp intsc5        ;remainder is same as stndrd.
```

```
resc    endp
subttl  INCSC--Increment Screen Count
page
;
;       Increment Screen Count
;
incsc   proc near
        call segset     ;set seg regs to edittab
        mov al,[si+1]   ;load current screen
        mov byte ptr[si+31],al  ;set search start pointer
        inc al  ;increment current screen
incsc2: cmp al,[si+3]   ;compare to max
        jle short incsc1        ;if legal set registers
        mov al,[si+2]   ;else, set to first screen
incsc1: call segrtn     ;set seg regs to selected screen
        mov al,11b      ;edit control mask
        and al,[si]     ;and with edit control
        jz short incsc3         ;if uneditable, test for last try
        ret
incsc3: call segset     ;set regs to edittab
        mov al,[si+1]   ;get current
        cmp al,[si+31]  ;equal to search start
        jne short incsc2        ;if not equal, continue
        call segrtn     ;all tested, return
        ret
incsc   endp
subttl  DECSC--Decrement Screen Count
page
;
;       decrement screen counter
;
decsc   proc near
        call segset     ;set seg regs to editab
        mov al,[si+1]   ;get current screen
        mov byte ptr[si+31],al  ;search start save
dsc3:   cmp al,[si+2]   ;compare to first
        jle short dsc1  ;set to last if equal to first
        dec al          ;decrement count
        jmp short dsc2
dsc1:   mov al,[si+3]   ;set current to max
dsc2:   call segrtn     ;set registers for return
        mov al,11b      ;edit control mask
        and al,[si]     ;check edit control byte
        jz short dsc4
        ret
dsc4:   call segset     ;reset segs to edittab
        mov al,[si+1]   ;get current screen
        cmp al,[si+31]  ;compare to first
        jnz short dsc3  ;if not equal continue search
        call segrtn     ;set segs to current screen
        ret
decsc   endp
subttl  SEGRTN--Set Segments regs DS,SI for return
page
;
segrtn  proc near
;
;set segment regs ds,si to selected screen for return
;
;       al has selected screen no
;
        mov byte ptr[si+1],al   ;save current set
```

```
        sub ah,ah          ;clear high byte
        mul byte ptr[si+22]    ;multiply count by table width
        add ax,51          ;add initial offset
        mov bx,ax          ;set index register
        add bx,si          ;add edittab offset
        mov dx,ds          ;set es to edittab segment
        mov es,dx
        mov di,si          ;edittab  offsett moved
        mov si,[bx+1]
        mov ds,[bx+3]      ;ds set to selected screen segment
        mov al,[si]        ;display edit control
        and al,1000000b        ;clear kybd bit
        jz short segrtn2       ;skip if not on
segrtn1: mov ah,1          ;clear keyboard
        int 16h                ;keyboard interupt
        jz short segrtn2       ;no key depressed
        sub ah,ah         ;ah=0
        int 16h                ;read character
        jmp short segrtn1      ;do till clear
segrtn2: sub bx,bx         ;clear bx
        mov ax,[si+62]    ;funct tab
        mov es:word ptr[bx+4],ax
        mov ax,[si+64]
        mov es:word ptr[bx+6],ax
        mov ax,[si+66]    ;cntl/func
        mov es:word ptr[bx+8],ax
        mov ax,[si+68]
        mov es:word ptr[bx+10],ax
        mov ax,[si+70]    ;alt/func
        mov es:word ptr[bx+12],ax
        mov ax,[si+72]
        mov es:word ptr[bx+14],ax
        mov ax,[si+74]    ;shft/func
        mov es:word ptr[bx+16],ax
        mov ax,[si+76]
        mov es:word ptr[bx+18],ax
        call scrorg       ;establish screen origin
        ret
segrtn  endp
subttl HLPPOS--Compute offset in table to help entry data
page
        public hlppos
hlppos  proc    near
;
;   al has field number
;
        sub ah,ah         ;clear high
        mul byte ptr[si+41]    ;mutl by table width
        mov bx,[si+60]    ;get table address
        cmp bx,0          ;if blank, do not set
        jz short hlppo1
        add bx,ax         ;add computed offset
hlppo1: ret
hlppos endp
edit    ends
end;
; END OF SCRECUR.ASM ASSEMBLER LISTING
        extrn dercqq:far
        extrn deicqq:far
        extrn dencqq:far
        extrn dedcqq:far
        extrn dewcqq:far
        extrn enicqq:far
```

```
        extrn enncqq:far
        extrn enrcqq:far
        extrn endcqq:far
        extrn enwcqq:far
        extrn scrorg:near
        extrn cursorg:near
edit    segment byte public 'code'
        assume ds:edit,cs:edit,es:nothing
subttl DISPLAY.ASM; SYNDETIC PMAI PASCAL INTERFACE ROUTINES
subttl DISDAT--Sub-Screen Display field data
page
        public disdat
disdat  proc near
comment*
  SCREEN GENERATION COMPILER (SGC) - Source Code documentation
  Copyright(c) 1987 Syndetic Corporation. All Rights Reserved
  ----- SGC program support module (assembly routine) -----
        this routine displays the requested data on the screen in the
        requested format.
        ds--set to subscreen data segment
        si--set to offset to sub screen
*
;
        call scrorg                ;compute screen origin
        mov al,[si+18]             ;get first data field
        mov byte ptr[si+13],al     ;save in current
disdat1: mov bx,word ptr[si+58]    ;offset to label table
        cmp bx,0                   ;will be zero if no label table
        jne short disdat2
        ret                        ;none to do
disdat2: call dis1fl
        inc byte ptr[si+13]        ;increment current label
        mov al,byte ptr[si+13]     ;move to accum
        cmp al,byte ptr[si+19]     ;compare to last
        jle short disdat1
        ret                        ;finished
disdat  endp
subttl DIS1fl--display one field
page
        public dis1fl
dis1fl  proc near
comment*
  SCREEN GENERATION COMPILER (SGC) - Source Code documentation
  Copyright(c) 1987 Syndetic Corporation. All Rights Reserved
  ----- SGC program support module (assembly routine) -----
        this routine displays the requested data on the screen in the
        requested format.
        ds--set to subscreen data segment
        si--set to offset to sub screen
*
;
        mov bx,[si+58]    ;data table offset
        mov al,[si+13]             ;get first data field
        sub ah,ah
        mul byte ptr[si+26]        ;multiply data # by table width
        add bx,ax                  ;add offset to label base
        call cursorg               ;establish cursor origin
        mov al,[bx+9]    ;get field type byte
        mov ah,al        ;save copy
        and al,100000b   ;clear string byte
        jz short disdat3           ;not a string
        call disstr      ;display string
        jmp short disdatf
```

```
disdat3: mov al,ah
        and al,100b      ;integer mask
        jz short disdat4
        call disint      ;integer display
        jmp short disdatf
disdat4: mov al,ah       ;reget opt
        and al,1         ;real mask
        jz short disdat5
        call disrel      ;display real
        jmp short disdatf
disdat5: mov al,ah       ;reget opt
        and al,1000b     ;word mask
        jz short disdat6
        call diswrd      ;display word
        jmp short disdatf
disdat6: mov al,ah       ;reget opt
        and al,10000b    ;boolean mask
        jz short disdatf
        call disbool     ;display boolean
disdatf: ret
dis1fl  endp
subttl REDDAT--Sub-Screen Read field data
page
        public reddat
reddat  proc near
comment*
  SCREEN GENERATION COMPILER (SGC) - Source Code documentation
  Copyright(c) 1987 Syndetic Corporation. All Rights Reserved
  ----- SGC program support module (assembly routine) -----
        this routine reads the requested data on the screen in the
        requested format.
        ds--set to subscreen data segment
        si--set to offset to sub screen
*
;
        call scrorg               ;compute screen origin
        mov al,[si+18]            ;get first field
        mov byte ptr[si+13],al    ;save in current
reddat1: mov bx,word ptr[si+58]   ;offset to data table
        cmp bx,0                  ;will be zero if no label table
        jne short reddat2
        ret                       ;none to do
reddat2: call red1fl              ;read one field
        inc byte ptr[si+13]       ;increment current label
        mov al,byte ptr[si+13]    ;move to accum
        cmp al,byte ptr[si+19]    ;compare to last
        jle short reddat1
        ret                       ;finished
reddat  endp
subttl RED1fl--read one field
page
        public red1fl
red1fl  proc near
comment*
  SCREEN GENERATION COMPILER (SGC) - Source Code documentation
  Copyright(c) 1987 Syndetic Corporation. All Rights Reserved
  ----- SGC program support module (assembly routine) -----
        this routine reads one requested field
        requested format.
        ds--set to subscreen data segment
        si--set to offset to sub screen
*
;
```

```
        mov bx,[si+58]   ;data table offset
        mov al,[si+13]           ;get current field
        sub ah,ah
        mul byte ptr[si+26]      ;multiply label # by table width
        add bx,ax                ;add offset to label base
        call cursorg     ;cursor origin
        mov al,[bx+9]    ;get field type byte
        mov ah,al        ;save copy
        and al,100000b   ;clear string byte
        jz short reddat3         ;not a string
        call redstr      ;read string
        jmp short reddatf
reddat3: mov al,ah
        and al,100b      ;integer mask
        jz short reddat4
        call redint      ;read integer
        jmp short reddatf
reddat4: mov al,ah       ;reget opt
        and al,1         ;real mask
        jz short reddat5
        call redrel      ;read real
        jmp short reddatf
reddat5: mov al,ah       ;reget opt
        and al,1000b     ;word mask
        jz short reddat6
        call redwrd      ;read word
        jmp short reddatf
reddat6: mov al,ah       ;reget opt
        and al,10000b    ;boolean mask
        jz short reddatf
        call redbool     ;read boolean
reddatf: ret
redlfl  endp
subttL MVSTRS--Move string to screen
page
mvstrs  proc near        ;mov string to screen
;
;       ds,si--string address
;       ah--color
;       ch--recipient field length
;       cl--max len of string
;       dx--display option byte
;       es,di--point to screen origin of field
;
        mov cl,[si]      ;get actual len
        cmp ch,cl        ;compare to lstring len
        jge short mvstrs1        ;if longer, move only field len
        mov cl,ch        ;cl now has length to move
mvstrs1: and dl,110000b  ;clear display option key
        jz short mvstrs2         ;if zero,left justified.
        sub ch,cl        ;subtr str len from fld len
        cmp dl,100000b   ;center key
        jne short mvstrs3        ;if zero, right just
        shr ch,1         ;ch now has move offset
mvstrs3: mov dl,ch       ;get to double register
        sub dh,dh        ;clear high byte
        shl dx,1         ;mult by two, dest is screen
        add di,dx        ;add move offset
mvstrs2: sub ch,ch       ;clear hi byte
        cmp cl,0         ;beware of null move
        jle short mvstrs5
        inc si           ;mov past len
```

```
mvstrs4: mov al,[si]      ;get chr
         mov word ptr es:[di],ax        ;mov to screen
         inc si
         inc di
         inc di
         loop short mvstrs4   ;do till done
mvstrs5: ret
mvstrs   endp
subttl DISSTR--Display Lstring
page
disstr   proc near         ;display string
;
;        ds,si point to screen data
;        bx--offset to table entry
;
         mov al,[bx+7]    ;display requested?
         and al,10000b    ;mask
         jnz short disstr1
         ret              ;no display requed
disstr1: push si
         push ds          ;save
         mov al,[bx+13]   ;offset to variable
         dec al  ;numbering start from zero
         sub ah,ah
         mul byte ptr[si+96]   ;table width
         add ax,97        ;offset to table start
         add ax,si        ;add screen tab base
         mov bp,ax        ;save
         mov ah,[bx+2]    ;get color
         mov ch,[bx+6]    ;field length
         push ax                  ;save color;
         push cx                  ;save field dlen
         mov al,ds:[bp+5]    ;string max length
         sub ah,ah
         inc ax           ;include length byte
         mov cl,al
         and cl,01b       ;check if odd
         jz short disstr2
         inc ax           ;
disstr2: mov cx,[bx+17]  ;get returned value index
         cmp cx,0         ; if zero, do not decrement
         jz short disstr3
         dec cx
disstr3: mul cx           ;multiply index times len
         mov dl,[bx+8]    ;get lj,rj,cen
         pop cx           ;reget screen len
         mov cl,ds:[bp+5]      ;max string len
         lds si,dword ptr ds:[bp]       ;load string address
         add si,ax        ;add indexed offset
         pop ax           ;reget color
         call mvstrs      ;mov string to screen
         pop ds
         pop si
         ret
disstr endp
subttl DISBOOL--Display Boolean
page
disbool proc near         ;display boolean
;
;        ds,si point to screen data
;        bx--offset to table entry
;
```

```
        mov al,[bx+7]    ;display requested?
        and al,10000b    ;mask
        jnz short disboo1
        ret              ;no display requed
disboo1: push si
        push ds          ;save
        mov ax,[bx+17]   ; index
        cmp ax,0         ; is it null
        jz short disbox
        dec ax
disbox: mov bp,ax        ;save offset
        mov al,[bx+13]   ;offset to variable
        dec al   ;numbering start from zero
        sub ah,ah
        mul byte ptr[si+96]      ;table width
        add ax,97        ;offset to table start
        add ax,si        ;add screen tab base
        push bx                          ;save
        mov bx,ax
        lds si,dword ptr[bx]     ;load string address
        add si,bp
        mov dl,[si]      ;read value
        pop bx
        pop ds
        pop si
        mov cl,[bx+6]    ;rem fld len
        sub ch,ch
        mov al,32
        mov ah,[bx+3]    ;false color
        push di          ;save
        cmp dl,0
        je short disboo2
        mov ah,[bx+2]    ;true color
disboo2: mov word ptr es:[di],ax         ;blank field
        inc di
        inc di
        loop short disboo2
        pop di
        mov al,[bx+16]   ;false chr
        cmp dl,0
        je short disboo3
        mov al,[bx+15]   ;true chr
disboo3: mov cl,al
        and cl,128       ;left,right mask
        jz short disboo4
        mov cl,[bx+6]    ;fld len, right chr
        sub ch,ch
        dec cl
        shl cx,1
        add di,cx
disboo4: and al,127      ;clear l/r bit
        mov word ptr es:[di],ax          ;store
        ret
disboo1 endp
subttl REDSTR--Read string from screen
page
redstr  proc near        ;read string
;
;       ds,si point to screen data
;       bx--offset to table entry
;
        mov al,[bx+7]    ;return data requested?
        and al,100000b   ;mask
```

```
        jnz short redstr1
        ret             ;no display requed
redstr1: push si
        push ds         ;save
        mov al,[bx+14]  ;offset to variable
        dec al  ;numbering start from zero
        sub ah,ah
        mul byte ptr[si+96]     ;table width
        add ax,97       ;offset to table start
        add ax,si       ;add screen tab base
        mov bp,ax       ;save
        mov dl,[bx+9]   ;leading/trailing include
        mov al,ds:[bp+5]        ;string max length
        sub ah,ah
        inc ax          ;include length byte
        mov cl,al
        and cl,01b      ;check if odd
        jz short redstr2
        inc ax          ;
redstr2: mov cx,[bx+19] ;get returned value index
        cmp cx,0        ; if zero, do not decrement
        jz short redstr3
        dec cx
redstr3: mul cx         ;multiply index times len
        mov ch,[bx+6]   ;field length
        mov cl,ds:[bp+5]        ;lstring max length
        lds si,dword ptr ds:[bp]        ;load string address
        add si,ax       ;add index offset
        call mvscst     ;mov string from screen
        pop ds
        pop si
        ret
redstr endp
subttl REDBOOL--Read Booleanfrom screen
page
redbool proc near       ;read string
;
;       ds,si point to screen data
;       bx--offset to table entry
;
        mov al,[bx+7]   ;return data requested?
        and al,100000b  ;mask
        jnz short redbooc
        ret             ;no display requed
redbooc: push si
        push ds         ;save
        sub ch,ch
        mov dl,[bx+12]  ;default value
        and dl,10000b   ;mask bit 5
        jz short redboo1
        mov dl,1        ;set to true
redboo1: mov cl,[bx+6]  ;fld len
        sub ch,ch
redboo2: mov al,es:[di] ;get screen chr
        cmp al,176      ;fldmrk ?
        je short redboo4
        cmp al,32
        je short redboo4        ;space?
        mov ah,[bx+15]  ;true chr
        and ah,127
        cmp al,ah
        je short redbooa
        sub ah,al
```

```
        cmp ah,32          ;cap dif
        je short redbooa
        cmp ah,-32
        je short redbooa
        jmp short redboo3
redbooa: mov dl,1          ;true
        jmp short redboo5
redboo3: mov ah,[bx+16]    ;false chr
        and ah,127
        cmp al,ah
        je short redboob
        sub ah,al
        cmp ah,32          ;cap dif
        je short redboob
        cmp ah,-32
        je short redboob
        jmp short redboo4
redboob: sub dl,dl         ;set zero--false
        jmp short redboo5
redboo4: inc di
        inc di
        loop short redboo2
redboo5: mov ax,[bx+19]    ;get index
        mov cl,dl          ;save read value
        cmp ax,0           ; is it null
        jz short redbox
        dec ax
redbox: mov bp,ax          ;save offset
        mov al,[bx+14]     ;offset to variable
        dec al   ;numbering start from zero
        sub ah,ah
        mul byte ptr[si+96]    ;table width
        add ax,97          ;offset to table start
        add ax,si          ;add screen tab base
        mov bx,ax
        lds si,dword ptr[bx]   ;load string address
        add si,bp
        mov byte ptr[si],cl    ;set prog value
        pop ds
        pop si
        ret
redbool endp
subttl MVSCST--mov string from screen to core
page
mvscst  proc near          ;mov from screen to core
;
; ds:si--string address of lstring set to max len
; cl--field len
; dl--edit option  (leading ,trailing space include)
; es:di--screen space
;
        mov bl,32          ;blank
        mov bh,176         ;fld mrk chr
        mov dh,dl          ;save option copy
        and dh,1000000b        ;mask leading blk include
        jnz short mvscst4
mvscst2: mov al,es:[di]    ;get chr
        cmp al,bl          ;blank?
        je short mvscst3
        cmp al,bh          ;fld mrk?
        jne short mvscst4
mvscst3: inc di
        inc di   ;skip chr
```

```
                dec ch
                nop
                jnz short mvscst2
                mov byte ptr[si],ch     ;null field
                ret
mvscst4:        and dl,10000000b        ;trailing blank include
                jnz short mvscst5a
                push di                 ;trailing blank delete
                mov al,ch
                sub ah,ah               ;and field len to di
                dec ax  ;1st chr is 0 offset
                shl ax,1        ;mult by two
                add di,ax               ;ptr to end of field
mvscst6:        mov al,es:[di]  ;get chr
                cmp al,bl       ;blank?
                je short mvscst7
                cmp al,bh       ;fld mrk?
                jne short mvscst5
mvscst7:        dec di  ;skip
                dec di
                dec ch  ;field len
                jnz short mvscst6
mvscst5:        pop di  ;restor field begin
mvscst5a:       push si         ;save core start
                inc si  ;skip len space
                sub dl,dl       ;clear chr counter
mvscst8:        mov al,es:[di]  ;get chr
                cmp al,bh       ;fld mrk chr?
                jne short mvscst9
                mov al,bl       ;make blank
mvscst9:        mov byte ptr[si],al     ;store in string
                inc dl  ;chr count
                dec cl  ;recieve space
                jz short mvscst10
                dec ch  ;feild len
                jz short mvscst10
                inc si
                inc di
                inc di  ;next chr
                jmp short mvscst8
mvscst10:       pop si                  ;reget core string begin
                mov byte ptr[si],dl     ;set len
                ret
mvscst   endp
subttl REDINT--Read integer field
page
redint proc near
;
; ds,si--screen basic data
; es,di--field origin on screen
; bx--field table entry
;
                mov al,[bx+7]   ;return data requested?
                and al,100000b  ;mask
                jnz short redint1
                ret             ;no display requed
redint1:        push si
                push ds         ;save
                push bx
                mov cl,[bx+6]   ;field len
                mov al,[bx+9]   ;double precision indicator
                mov word ptr cs:redsav,sp       ;save stack pointer
                sub sp,80       ;set asside space for recipient string
```

```
        mov word ptr cs:redsav[2],sp    ;string addr
        mov dx,ss        ;swap indexes
        mov ds,dx
        mov si,sp        ;indexes point to recient space
        push ax                          ;save double prec flag
        call mnumd       ;move screen to lstring
        mov dx,ss
        mov es,dx
        pop dx           ;reget double precision flag
        sub sp,4         ;make space for returned val
        mov word ptr cs:redsav[4],sp    ;sav address
        sub ah,ah
        mov al,[si]      ;string length
        push ax                          ;length of string
        mov ax,cs:redsav[2]
        push ax                          ;string address
        mov ax,cs:redsav[4]
        push ss                          ;data segment address
        push ax                          ;data area address
        and dl,010b      ;double precision mask
        jnz short dipre
        mov ax,8001H     ;conversion sets
        push ax
        mov ax,7fffH     ;conversion sets
        push ax
        call deicqq      ;encode routine
        jmp short irtnv
dipre:  call dencqq      ;double precision decode
irtnv:  mov sp,cs:redsav                 ;restore stack
        pop bx
        pop ds
        pop si           ;reget system pointers
        push si
        push ds
        push bx                          ;save again
        mov al,[bx+14]   ;offset to variable
        mov dl,[bx+9]    ;double precis idicator
        dec al   ;numbering start from zero
        sub ah,ah
        mul byte ptr[si+96]     ;table width
        add ax,97        ;offset to table start
        add ax,si        ;add screen tab base
        mov bp,ax        ;variable offset to bx
        les di,dword ptr ds:[bp]         ;get var offset to bp
        mov ax,word ptr[bx+19]  ; index of returned variable
        cmp ax,0
        je short noindx
        dec ax
noindx: mov cl,2                ; len of single precis
        and dl,010b      ;d.p. mask
        jz short didx
        mov cl,4                ; d.p. width
didx:   sub ch,ch
        mul cx           ; multiply index by width
        add di,ax        ;add answer to di
        mov ax,ss        ; set ds to stack segment
        mov ds,ax
        mov si,cs:redsav[4]     ; stack offest
        cld
rep     movsb
        pop bx
        pop ds           ; reset register
        pop si
        ret
```

```
redsav  label word
        dw 3 dup (0)
redint  endp
subttl REDWRD--Read WORD field
page
redwrd proc near
;
; ds,si--screen basic data
; es,di--field origin on screen
; bx--field table entry
;
        mov al,[bx+7]   ;return data requested?
        and al,100000b  ;mask
        jnz short redwrd1
        ret             ;no display requed
redwrd1: push si
        push ds         ;save
        push bx
        mov cl,[bx+6]   ;field len
        mov word ptr cs:redsav,sp       ;save stack pointer
        sub sp,80       ;set asside space for recipient string
        mov word ptr cs:redsav[2],sp    ;string addr
        mov dx,ss       ;swap indexes
        mov ds,dx
        mov si,sp       ;indexes point to recient space
        call mnumd      ;move screen to lstring
        mov dx,ss
        mov es,dx
        sub sp,4        ;make space for returned val
        mov word ptr cs:redsav[4],sp    ;sav address
        sub ah,ah
        mov al,[si]     ;string length
        push ax         ;length of string
        mov ax,cs:redsav[2]
        push ax         ;string address
        mov ax,cs:redsav[4]
        push ss         ;data segment address
        push ax         ;data area address
        sub ax,ax       ;null
        push ax
        mov ax,7fffH    ;conversion sets
        push ax
        call dewcqq     ;encode routine
        mov sp,cs:redsav        ;restore stack
        pop bx
        pop ds
        pop si          ;reget system pointers
        push si
        push ds
        push bx         ;save again
        mov al,[bx+14]  ;offset to variable
        dec al  ;numbering start from zero
        sub ah,ah
        mul byte ptr[si+96]     ;table width
        add ax,97       ;offset to table start
        add ax,si       ;add screen tab base
        mov bp,ax       ;variable offset to bx
        les di,dword ptr ds:[bp]        ;get var offset to bp
        mov ax,word ptr[bx+19]  ; index of returned variable
        cmp ax,0
        je short noindw
        dec ax
```

```
noindw: mov cl,2                    ; len of single precis
        sub ch,ch
        mul cx              ; multiply index by width
        add di,ax                   ;add answer to di
        mov ax,ss                   ; set ds to stack segment
        mov ds,ax
        mov si,cs:redsav[4]         ; stack offest
        cld
rep     movsb
        pop bx
        pop ds              ; reset register
        pop si
        ret
redwrd  endp
subttl REDREL--Read REAL field
page
redrel proc near
;
; ds,si--screen basic data
; es,di--field origin on screen
; bx--field table entry
;
        mov al,[bx+7]    ;return data requested?
        and al,100000b   ;mask
        jnz short redrel1
        ret              ;no display requed
redrel1: push si
        push ds          ;save
        push bx
        mov cl,[bx+6]    ;field len
        mov al,[bx+9]    ;double precision indicator
        mov word ptr cs:redsav,sp        ;save stack pointer
        sub sp,80        ;set asside space for recipient string
        mov word ptr cs:redsav[2],sp    ;string addr
        mov dx,ss        ;swap indexes
        mov ds,dx
        mov si,sp        ;indexes point to recient space
        push ax                     ;save double prec flag
        call mnumd       ;move screen to lstring
        mov dx,ss
        mov es,dx
        pop dx           ;reget double precision flag
        sub sp,8         ;make space for returned val
        mov word ptr cs:redsav[4],sp    ;sav address
        sub ah,ah
        mov al,[si]      ;string length
        push ax                     ;length of string
        mov ax,cs:redsav[2]
        push ax                     ;string address
        mov ax,cs:redsav[4]
        push ss                     ;data segment address
        push ax                     ;data area address
        and dl,010b      ;double precision mask
        jnz short diprr
        call dercqq      ;encode routine
        jmp short rrtnv
diprr:  call dedcqq      ;double precision decode
rrtnv:  mov sp,cs:redsav            ;restore stack
        pop bx
        pop ds
        pop si           ;reget system pointers
        push si
        push ds
```

```
            push bx                     ;save again
            mov al,[bx+14]    ;offset to variable
            mov dl,[bx+9]     ;double precis idicator
            dec al   ;numbering start from zero
            sub ah,ah
            mul byte ptr[si+96]       ;table width
            add ax,97          ;offset to table start
            add ax,si          ;add screen tab base
            mov bp,ax          ;variable offset to bx
            les di,dword ptr ds:[bp]         ;get var offset to bp
            mov ax,word ptr[bx+19]  ; index of returned variable
            cmp ax,0
            je short norndx
            dec ax
norndx:     mov cl,4                 ; len of single precis
            and dl,010b              ;d.p. mask
            jz short drdx
            mov cl,8                 ; d.p. width
drdx:       sub ch,ch
            mul cx           ; multiply index by width
            add di,ax                ;add answer to di
            mov ax,ss                ; set ds to stack segment
            mov ds,ax
            mov si,cs:redsav[4]      ; stack offest
            cld
rep         movsb
            pop bx
            pop ds           ; reset register
            pop si
            ret
redrel  endp
subttl MNUMD--Move data from screen to Lstring
page
mnumd   proc near
;
;       ds,si--core ltring addr
;       es,di--screen origin of data
;       cl--field len
;
;
;       dh,dl--number range (internal use0
;       ch-/--illegal in above range
;
            mov dh,57          ;9
            mov dl,45          ;.
            mov ch,47          ;/
            sub bx,bx          ;clear chr count
            inc bx   ;leave sign space
            mov ah,45          ;- sgn
mnumd1:     mov al,byte ptr es:[di] ;get chr from screen
            cmp al,dh
            jg short mnumd2            ;greater than 9
            cmp al,dl
            jl short mnumd2            ;less than .
            cmp al,ch
            je short mnumd2            ; is /
            cmp al,ah
            jne short mnumd3           ;not a - sgn
            sub ah,ah        ;set sgn found flag
            jmp short mnumd2
mnumd3:     inc bl           ;legal chr
            mov byte ptr [si+bx],al
mnumd2:     inc di
            inc di   ;advance to next chr
```

```
            dec cl
            jnz short mnumd1
            inc bl
            mov al,32
            mov byte ptr[si+bx],al
            mov byte ptr[si],bl        ;set lstring len
            mov al,43          ;+ sign
            cmp ah,0
            jne short mnumd4           ;no sgn
            mov al,45
mnumd4:     mov byte ptr[si+1],al      ;store sgn or space
            ret
mnumd       endp
            subttl DISINT--Display Integer Variable
            page
disint proc near               ;display integer variable
;
;ds,si--screen data
;es,di--screen origin
;bx--offset to dat field entry
;
            mov al,[bx+7]      ;is display requested?
            and al,10000b      ;mask
            jnz short disint1
            ret        ;none requested
disint1:    push ds
            push si
            push es
            push di            ;save sets
            push bx
            mov word ptr cs:distab,sp           ;save stack for restor
            mov al,[bx+8]      ;sing option
            mov byte ptr cs:distab[2],al        ;save for later use
            mov byte ptr cs:savreg[4],al        ;for csltc
            mov al,[bx+10]     ;get l/t byte
            mov byte ptr cs:savreg[5],al        ;for csltc
            mov byte ptr cs:distab[3],al        ;for later use
            mov cl,02          ;s.p. width
            mov dl,[bx+9]      ; d.p. flag
            and dl,010b
            jz short cmpt
            mov cl,04
cmpt:       sub ch,ch
            mov ax,[bx+17]     ;display index
            cmp ax,0
            je short noidx
            dec ax
            mul cx
noidx:      mov bp,ax          ; save in dp
            mov cl,[bx+9]      ; save d.p. flag for future use
            mov byte ptr cs:savreg[6],cl        ;save for csltc
            mov al,[bx+13]     ;offset to variable
            dec al             ;sub one
            sub ah,ah          ;clear high
            mul byte ptr[si+96]            ;table width
            add ax,97          ;offset to tab begin
            add ax,si          ;add screent tab offset
            mov bx,ax          ;mov to adr reg
            les di,dword ptr[bx]           ;load variable address
            add di,bp                      ;add index offset
            mov dx,ss          ;set regs for pascal call
            mov ds,dx
            sub sp,80          ;clear stack space for ascii string
```

```
        mov si,sp            ;pointer to string start
        mov word ptr cs:distab[4],sp     ;save address
        mov ax,16            ;max string length
        push ax
        push si                          ; string address
        and cl,010b          ; d.P. flag
        jnz short dpencd
        mov ax,es:[di]
        push ax                          ; integer value
        mov ax,7fffh         ; encode key
        push ax
        push ax
        call enicqq          ;single precision encode
        jmp short disgo
dpencd: mov ax,es:[di+2]
        push ax                          ; hi word
        mov ax,es:[di]
        push ax                          ;lo word
        mov ax,7fffh         ;encode key
        push ax
        push ax
        call enncqq          ;double precis encode
;
; commas, sign opts here
;
disgo:  mov si,cs:distab[4]     ;reget string offest
        call csltc              ;insert comma, sign convention
        mov word ptr cs:distab[4],si    ;new base address
        mov sp,cs:distab        ;reset stack
        pop bx    ;restore
        pop di
        pop es
        pop si
        pop ds
        push ds
        push si         ;resave
        mov ah,[bx+2]   ;+ display color
        sub al,al       ;set to 0
        cmp al,cs:savreg[3]     ;negative?
        je short disint2        ;no
        mov ah,[bx+3]   ;negative color
disint2: mov dl,[bx+8]  ;left,right centered?
        sub dh,dh
        mov ch,[bx+6]   ;field length
        mov bx,ss
        mov ds,bx       ;set ds to stack
        mov si,cs:distab[4]     ;string offset
        call mvstrs     ;mov to screen
        pop si
        pop ds   ;restore
        ret
distab  label word
        dw 3 dup(0)
disint endp
subttl DISWRD--Display word Variable
page
diswrd proc near        ;display word variable
;
;ds,si--screen data
;es,di--screen origin
;bx--offset to dat field entry
;
```

```
        mov al,[bx+7]    ;is display requested?
        and al,10000b    ;mask
        jnz short diswrd1
        ret              ;none requested
diswrd1: push ds
        push si
        push es
        push di          ;save sets
        push bx
        mov word ptr cs:distab,sp       ;save stack for restor
        mov al,[bx+8]    ;sing option
        mov byte ptr cs:distab[2],al    ;save for later use
        mov byte ptr cs:savreg[4],al    ;for csltc
        mov al,[bx+10]   ;get l/t byte
        mov byte ptr cs:savreg[5],al    ;for csltc
        mov byte ptr cs:distab[3],al    ;for later use
        mov cl,02        ;s.p. width
        sub ch,ch
        mov ax,[bx+17]   ;display index
        cmp ax,0
        je short noiww
        dec ax
        mul cx
noiww:  mov bp,ax        ; save in dp
        mov cl,[bx+9]    ; save d.p. flag for future use
        mov al,[bx+13]   ;offset to variable
        dec al           ;sub one
        sub ah,ah        ;clear high
        mul byte ptr[si+96]     ;table width
        add ax,97        ;offset to tab begin
        add ax,si        ;add screen tab offset
        mov bx,ax        ;mov to adr reg
        les di,dword ptr[bx]    ;load variable address
        add di,bp        ;add index offset
        mov dx,ss        ;set regs for pascal call
        mov ds,dx
        sub sp,80        ;clear stack space for ascii string
        mov si,sp        ;pointer to string start
        mov word ptr cs:distab[4],sp    ;save address
        mov ax,16        ;max string length
        push ax
        push si          ; string address
        mov ax,es:[di]
        push ax          ; integer value
        mov ax,7fffh     ; encode key
        push ax
        push ax
        call enwcqq      ;single precision encode
;
; commas, sign opts here
;
        mov si,cs:distab[4]     ;reget string offest
        call csltc       ;insert comma, sign convention
        mov word ptr cs:distab[4],si    ;new base address
        mov sp,cs:distab        ;reset stack
        pop bx   ;restore
        pop di
        pop es
        pop si
        pop ds
        push ds
        push si          ;resave
        mov ah,[bx+2]    ;+ display color
```

```
        sub al,al          ;set to 0
        mov dl,[bx+8]      ;left,right centered?
        sub dh,dh
        mov ch,[bx+6]      ;field length
        mov bx,ss
        mov ds,bx          ;set ds to stack
        mov si,cs:distab[4]      ;string offset
        call mvstrs        ;mov to screen
        pop si
        pop ds   ;restore
        ret
diswrd  endp
subttl DISREL--Display Real Variable
page
disrel proc near           ;display real variable
;
;ds,si--screen data
;es,di--screen origin
;bx--offset to dat field entry
;
        mov al,[bx+7]      ;is display requested?
        and al,10000b      ;mask
        jnz short disrel1
        ret      ;none requested
disrel1: push ds
        push si
        push es
        push di            ;save sets
        push bx
        mov word ptr cs:distab,sp        ;save stack for restor
        mov al,[bx+8]      ;sing option
        mov byte ptr cs:distab[2],al     ;save for later use
        mov byte ptr cs:savreg[4],al     ;for csltc
        mov al,[bx+10]     ;get l/t byte
        mov byte ptr cs:savreg[5],al     ;for csltc
        mov byte ptr cs:distab[3],al     ;for later use
        mov al,[bx+11]     ;format byte
        and al,100b        ;format mask
        jz short disrl3
        mov al,[bx+12]     ;decimal places
        sub ah,ah          ;clear high byte
        push ax            ;save
        jmp short disrl4
disrl3: mov al,[bx+12]     ;offset to variable with dec
        dec al             ;sub one
        sub ah,ah          ;clear high
        mul byte ptr[si+96]      ;table width
        add ax,97          ;offset to tab begin
        add ax,si          ;add screent tab offset
        push bx
        mov bp,ax          ;save bx
        mov ax,[bx+15]           ;index of dec variable
        shl ax,1           ;multiply by two (integer width)
        push di
        push es                  ;save registers
        mov bx,bp          ;reget offset to var address
        les di,dword ptr [bx]    ;load var address
        cmp ax,0
        je short disrl5
        dec ax
        dec ax
disrl5: add di,ax                ;add index offset
        mov ax,es:[di]     ;get value of integer
```

```
              pop es
              pop di
              pop bx
              push ax              ;save decimals
disr14:       mov cl,04            ;s.p. width
              mov dl,[bx+9]        ; d.p. flag
              and dl,010b
              jz short disr16
              mov cl,08
disr16:       sub ch,ch
              mov ax,[bx+17]       ;display index
              cmp ax,0
              je short disr17
              dec ax
              mul cx
disr17:       mov bp,ax            ; save in dp
              mov ch,[bx+9]        ; save d.p. flag for future use
              mov byte ptr cs:savreg[6],ch    ;save for cslt
              mov al,[bx+13]       ;offset to variable
              dec al               ;sub one
              sub ah,ah            ;clear high
              mul byte ptr[si+96]  ;table width
              add ax,97            ;offset to tab begin
              add ax,si            ;add screent tab offset
              mov bx,ax            ;mov to adr reg
              lds si,dword ptr[bx] ;load variable address
              add si,bp            ;add index offset
              pop bp               ;reget decimal value
              sub sp,80            ;space for string conversion
              mov word ptr cs:distab[4],sp    ;save
              mov ax,20            ;conversion length
              push ax
              mov ax,cs:distab[4]  ;string address
              push ax
              mov dh,ch
              sub ch,ch
              push ss
              pop es
              sub sp,cx            ; set aside space for value
              mov di,sp
              cld
rep           movsb
              mov ax,20
              push ax
              push bp
              push ss
              pop ds
              and dh,010b          ;douple prec flag
              jnz short disr18
              call enrcqq          ;singl prec encode
              jmp short disr19
disr18:       call endcqq          ;double prec encode
disr19:       mov si,cs:distab[4]  ;reget string space offset
;
; commas, sign opts here
;
              call csltc           ;insert comma, sign convention
              mov word ptr cs:distab[4],si    ;new base address
              mov sp,cs:distab     ;reset stack
              pop bx   ;restore
              pop di
              pop es
              pop si
```

```
            pop ds
            push ds
            push si          ;resave
            sub sp,80        ;clear the string
            mov ah,[bx+2]    ;+ display color
            sub al,al        ;set to 0
            cmp al,cs:savreg[3]      ;negative?
            je short disrel2         ;no
            mov ah,[bx+3]    ;negative color
disrel2:    mov dl,[bx+8]    ;left,right centered?
            sub dh,dh
            mov ch,[bx+6]    ;field length
            mov bx,ss
            mov ds,bx        ;set ds to stack
            mov si,cs:distab[4]      ;string offset
            call mvstrs      ;mov to screen
            add sp,80        ;reset stack
            pop si
            pop ds   ;restore
            ret
disrel      endp
subttl Csltc--commas,L/T sign, l/tChr
page
            csltc proc near
;
; ds,si--ascii string
; savreg(0)--left  most non blank
;        (1)--right most non-blank
;        (2)--decimal position & comma bit 1000000b
;        (3)--sighn position (if any)
;        (4)--sign option blank
;        (5)--leading/trailing chr
;        (6)--d.p. and noprint zero option
;
            mov cl,[si]      ;get actual string len
            sub ch,ch        ;clear high
            sub bx,bx        ;clear
            sub al,al        ;nul
            mov byte ptr cs:savreg[2],al    ;clear dec
            mov byte ptr cs:savreg[3],al    ;clear sgn
            mov dl,46        ;decimal point ascii value
            mov dh,45        ;- sgn ascii value
;
;           locate sign and decimal
;
csltc1:     inc bx
            cmp dl,[si+bx]   ;dec?
            jne short csltc2
            mov byte ptr cs:savreg[2],bl    ;dec found
csltc2:     cmp dh,[si+bx]   ;- sgn?
            jne short csltc3
            mov byte ptr cs:savreg[3],bl    ;-sgn found
            mov al,32        ;blank
            mov byte ptr[si+bx],al  ;clear sign
csltc3:     loop short csltc1        ;do till done
;
; leading blanks
;
            mov cl,[si]      ;len
            sub bx,bx        ;clear
            mov dl,32        ;ascii blank value
csltc4:     inc bx
            cmp dl,[si+bx]   ;blank?
```

```
               jne short csltc5
               loop short csltc4         ;go till no blank
       csltc5: mov byte ptr cs:savreg,bl       ;save leading chr position
;
;trailing chr
;
               mov cl,[si]      ;len
               mov bl,cl        ;index to last
               sub cl,cs:savreg         ;subtract 1st from no. to do
               jz short csltc7          ;if none, finished
       csltc6: cmp dl,[si+bx]   ;blank?
               jne short csltc7
               dec bx
               loop short csltc6         ;do till done
       csltc7: mov byte ptr cs:savreg[1],bl
;
;       no-print on zero test
;
               mov bl,cs:savreg[6]
               and bl,10000000b
               jz short csltc22          ; no-prt not requested
               sub bx,bx
               mov bl,cs:savreg          ;left
      csltc20: cmp byte ptr[si+bx],48            ;zero?
               je short csltc21
               cmp byte ptr[si+bx],46            ;decimal?
               jne short csltc22                 ;not zero or dec
      csltc21: inc bl
               cmp bl,cs:savreg[1]               ; to right?
               jle short csltc20
               mov byte ptr[si],0                ;null string
               ret
;
; adjust for no dec
;
      csltc22: mov bl,cs:savreg[2]       ;get dec
               cmp bl,0         ;null?
               jne short csltc8          ;no
               mov bl,cs:savreg[1]       ;get last
               inc bl
               mov byte ptr cs:savreg[2],bl
;
; insert comma's
; check savreg(2), bit #7 first to see if comma's are to be used
; Following 3 lines added by DBK 3-27-87
       csltc8: mov cl,cs:savreg[2]       ; get option byte 2
               and cl,1000000b           ; check bit 7 comma/nocomma
               jz short csltc10          ;. skip inserting the commas
               mov cl,cs:savreg          ; get first, bl has dec pos.
       csltc9: sub bl,4         ;next comma pos.
               cmp cl,bl        ;in non blank space
               jg short csltc10          ;finished
               mov bp,cx        ;left shift index
      csltc11: mov al,ds:[si+bp]         ;get chr
               mov byte ptr ds:[si+bp-1],al      ;store 1 place left
               inc bp
               cmp bp,bx        ;to current pos?
               jle short csltc11         ;do again
               dec cl           ;dec first chr
               mov byte ptr cs:savreg,cl         ;store
               mov al,44        ;comma
               mov byte ptr[si+bx],al    ;insert in string
               jmp short csltc9          ;do till done
```

```
;
;   sign insert
;
csltc10:  mov bl,1            ;l/t mask
          and bl,cs:savreg[4] ;mask selected option
          jnz short csltc11a  ;trailing if 1
          sub al,al           ;nul
          cmp al,cs:savreg[3] ;number neg?
          je short csltc12    ;no--done
          dec byte ptr cs:savreg  ;decrement first
          mov bl,cs:savreg    ;load index
          mov al,45           ;neg sign
          mov byte ptr[si+bx],al  ;insert sign in string
          jmp short csltc12   ;done
csltc11a: sub ah,ah           ;nul
          mov al,32           ;blank ascii value
          inc byte ptr cs:savreg[1]       ;increment right chr
          mov bl,cs:savreg[1] ;save position
          mov byte ptr [si+bx],al         ;insert blank
          cmp ah,cs:savreg[3] ;number negative
          jz short csltc12    ;posative
          mov al,45           ;- sgn
          mov byte ptr[si+bx],al  ;insert sgn
;
;         leading or trailing chr
;
csltc12:  mov ah,cs:savreg[5] ;l/t chr
          cmp ah,0
          je short csltc13    ;none specified
          mov al,ah           ;save copy
          and al,127          ;clear chr of bit 8
          and ah,128          ;clear bit 7
          jnz short csltc14   ; if not 0, trailing
          dec byte ptr cs:savreg ;dec leading position
          mov bl,cs:savreg    ;get index
          mov byte ptr[si+bx],al  ;insert
          jmp short csltc13   ;done
csltc14:  inc byte ptr cs:savreg[1]       ;trailing
          mov bl,cs:savreg[1] ;get index
          mov byte ptr [si+bx],al         ;insert in string
;
; brackets, braces or parens sign option
;
csltc13:  mov al,110b         ;maskt
          and al,cs:savreg[4] ;option byte
          jz short csltc15    ;none requested
          shr al,1            ;shift right
          sub bl,bl           ;nul
          cmp bl,cs:savreg[3] ;number neg?
          jne short csltc16   ;yes
          mov al,32           ;no is posative, insert blanks
          mov ah,al
          jmp short csltc17   ;go insert
csltc16:  cmp al,1            ;parens value
          jne short csltc18   ;no
          mov al,40           ;(
          mov ah,41           ;)
          jmp short csltc17   ;go
csltc18:  cmp al,2            ;brackets
          jne short csltc19   ;no
          mov al,91           ;[
          mov ah,93           ;]
          jmp short csltc17   ;go
```

```
csltc19: mov al,123      ;{--assumed
         mov ah,125      ;}
csltc17: dec byte ptr cs:savreg ;left position
         mov bl,cs:savreg
         mov byte ptr[si+bx],al  ;left enclosure
         inc byte ptr cs:savreg[1]      ;right pos.
         mov bl,cs:savreg[1]
         mov byte ptr[si+bx],ah  ;right enclosure
csltc15: mov bl,cs:savreg       ;adjust addr and len
         dec bl
         add si,bx       ;new string org
         mov al,cs:savreg[1]    ;get right chr
         sub al,bl       ;compute length
         mov byte ptr[si],al    ;set to new len
         ret
savreg label byte
         db 7 dup (0)
csltc    endp
edit     ends
end
; END OF DISPLAY.ASM ASSEMBLER LISTING ; FILMAN.ASM
; SCREEN GENERATION COMPILER (SGC) - Source Code documentation
; Copyright(c) 1987 Syndetic Corporation. All Rights Reserved
; ---- SGC program SUPPORT MODULES (ASSEMBLER ROUTINES) --------
;   Modified 10-14-86:   SetDfD repaired
dms0001 segment byte public 'code'
         assume cs:dms0001
extrn dms0008:near
extrn dms0010:near
;
; getdate(vars date:integer)
;
         public getdate
 getdate proc far
         push bp
         mov bp,sp
         mov ax,4
         call dms0008
         mov ah,2ah
         int 21h
         lds si,dword ptr [bp + 6]
         mov al,dh
         sub ah,ah
         mov word ptr[si],ax
         inc si
         inc si
         mov al,dl
         mov word ptr[si],ax
         inc si
         inc si
         sub cx,1900
         mov word ptr[si],cx
         jmp dms0010
getdate endp
         public fndent
fndent   proc far
;
; function fndent(vars path:lstring
;                 vars itm:lstring
;                 vars atrb:integer):integer
;
```

```
        push bp
        mov bp,sp       ;save bp to restore
        mov ax,16
        call dms0008
        lds si,dword ptr[bp+6]   ;bet atrribute for search
        mov cx,[si]
        lds dx,dword ptr[bp+16] ;name string for find
        inc dx
        mov ah,4eh      ; function no
        int 21h
        jb  short finfnd
        mov ah,2fh      ; get DTA address
        int 21h
        mov di,bx       ; chang es:bx to es:di
        add di,30
        lds si,dword ptr[bp+10]
        mov ah,0        ;compare fore end
        sub bx,bx       ; zero index
lp3:    mov al,es:[di+bx]
        cmp al,ah       ;null if end
        je  short lstt
        inc bx
        mov byte ptr[si+bx],al
        jmp short lp3
lstt:   mov byte ptr[si],bl     ;set lstring length
        lds si,dword ptr[bp+6]  ;atrb address, return value found
        sub di,9                ;address in DTA
        mov al,es:[di]
        sub ah,ah
        mov word ptr[si],ax     ;return atrb to pascal
        sub ax,ax       ; set good key
finfnd: jmp dms0010
fndent  endp
        public nexent
nexent  proc far
; SCREEN GENERATION COMPILER (SGC) - Source Code documentation
; Copyright(c) 1987 Syndetic Corporation. All Rights Reserved
; ---- SGC program SUPPORT MODULES (ASSEMBLER ROUTINES) --------
;
; function nexent(vars itm:lstring
;                 vars atrb:integer):integer
;
        push bp
        mov bp,sp       ;save bp to restore
        mov ax,10
        call dms0008
        mov ah,4fh      ; function no
        int 21h
        jb  short finnex
        mov ah,2fh      ; get DTA address
        int 21h
        mov di,bx       ; chang es:bx to es:di
        add di,30
        lds si,dword ptr[bp+10]
        mov ah,0        ;compare fore end
        sub bx,bx       ; zero index
lp2:    mov al,es:[di+bx]
        cmp al,ah       ;null if end
        je  short lset
        inc bx
        mov byte ptr[si+bx],al
        jmp short lp2
```

```
lset:   mov byte ptr[si],bl        ;set lstring length
        lds si,dword ptr[bp+6]     ;atrb address, return value found
        sub di,9                   ;address in DTA
        mov al,es:[di]
        sub ah,ah
        mov word ptr[si],ax        ;return atrb to pascal
        sub ax,ax                  ; set good key
finnex: jmp dms0010
nexent  endp
        public creatsd
creatsd proc far
;
; function creatsd(vars name:lstring):integer
;
        push bp
        mov bp,sp                  ;save bp to restore
        mov ax,6
        call dms0008
        lds dx,dword ptr[bp+6]     ;name string for find
        inc dx
        mov ah,39h                 ; function no
        int 21h
        jb  short fincrt
        sub ax,ax                  ; set good key
fincrt: jmp dms0010
creatsd endp
        public setsd
setsd   proc far
;
; function setsd(vars name:lstring):integer
;
        push bp
        mov bp,sp                  ;save bp to restore
        mov ax,6
        call dms0008
        lds dx,dword ptr[bp+6]     ;name string for find
        inc dx
        mov ah,3bh                 ; function no
        int 21h
        jb  short finssd
        sub ax,ax                  ; set good key
finssd: jmp dms0010
setsd   endp
        public renamf
renamf  proc far
;
; function renamf(vars onam:lstring,nnam:lstring):integer
;
        push bp
        mov bp,sp                  ;save bp to restore
        mov ax,12
        call dms0008
        lds dx,dword ptr[bp+12]    ;old name string
        les di,dword ptr[bp+6]     ;new name string
        inc dx
        inc di
        mov ah,56h                 ; function no
        int 21h
        jb  short finrnm
        sub ax,ax                  ; set good key
finrnm: jmp dms0010
renamf  endp
        public setdfd
```

```
setdfd   proc far
;
; function setdfd(consts drno:integer)
;
;        drno: 0=a, 1=b, 2=c, etc.
         push bp
         mov bp,sp
         mov ax,4
         call dms0008
         lds si,[bp+6]    ; get passed drive no
         mov dx,[si]
         mov ah,0eh       ; function no
         int 21h
         jmp dms0010
setdfd   endp
         public getdfd
getdfd   proc far
;
; function getdfd:integer
;
;        drno:= 0,a ; + 1,b etc.
         push bp
         mov bp,sp        ;save bp to restore
         mov ax,0
         call dms0008
         mov ah,19h       ; function no
         int 21h
         sub ah,ah
         jmp dms0010
getdfd   endp
         public getsd
getsd    proc far
;
; function getsd(vars name:lstring):integer
;
         push bp
         mov bp,sp        ;save bp to restore
         mov ax,6
         call dms0008
         lds si,dword ptr[bp+6]   ;name to return
         inc si   ;save len space
         mov ah,47h       ; function no
         sub dl,dl
         int 21h
         jb short fingdd
         dec si
         mov bx,1
         mov al,0
loop:    cmp al,[si+bx]   ;string tunced by 0
         je short lenset
         inc bx
         jmp short loop
lenset:  dec bx
         mov byte ptr[si],bl
         sub ax,ax        ; set good key
fingdd:  jmp dms0010
getsd    endp
         public deldir
deldir   proc far
;
; function deldir(vars name:lstring):integer
;
```

```
                push bp
                mov bp,sp        ;save bp to restore
                mov ax,6
                call dms0008
                lds dx,dword ptr[bp+6]   ;name string for find
                inc dx
                mov ah,3ah       ; function no
                int 21h
                jb   short findrd
                sub  ax,ax       ; set good key
findrd:         jmp  dms0010
deldir          endp
                public delfil
delfil          proc far
;
; function delfil(vars name:lstring):integer
;
                push bp
                mov bp,sp        ;save bp to restore
                mov ax,6
                call dms0008
                lds dx,dword ptr[bp+6]   ;name string for find
                inc dx
                mov ah,41h       ; function no
                int 21h
                jb   short findfl
                sub  ax,ax       ; set good key
findfl:         jmp  dms0010
delfil          endp
dms0001         ends
end
; END OF FILMAN.ASM ASSEMBLER LISTING ; SCREEN GENERATION COMPILER (SGC) - Source Code documentation
; Copyright(c) 1987 Syndetic Corporation. All Rights Reserved
; ---- SGC program SUPPORT MODULES (ASSEMBLER ROUTINES) --------
title PRTPACK.ASM: PRINTER INTERFACE ROUTINES
        name PRTPACK
        extrn edpcl:near
        extrn edittab:far
        extrn setertn:near
        extrn rtnstd:near
 edit     segment byte public 'code'
          assume ds:edit,cs:edit,es:nothing
public getline
getline proc far           ;get a line from the screen for the printer
                           ;   GETLINE(NAME,ROW,LINE)
        push bp            ;save bp for return
        mov bp,sp          ;set bp to sp for internal use
        mov ax,14          ;THREE argument routine, skip 14bytes on return
        call setertn       ;set up error return routine
        mov di, offset edittab  ;set up es,di
        mov dx,seg edittab
        mov es,dx
        lds si,dword ptr[bp+16] ;load ds,si to display name
        push bp
        call edpcl         ;match name to link
                           ;will return only if found
        pop bp
        les di,dword ptr[bp+12]       ;row number
        mov ax,es:[di]     ;load in ax
```

```
            dec ax              ;row no's start at 0
            mul byte ptr [si+21]    ;col screen size
            shl ax,1            ;multiply by two
            mov di,[si+22]          ;page offset
            add di,ax           ;add offset to row
            mov dx,0b800h       ;scree core origin
            mov es,dx           ;es:di--screen position
            lds si,dword ptr[bp+6]      ;string address
            sub cx,cx           ;clear
            mov cl,80           ;string length
            mov byte ptr[si],cl     ;set string len
            inc si
gtlin:      mov al,es:[di]  ;get chr
            mov byte ptr [si],al    ;put in string
            inc si
            nop
            inc di
            inc di
            loop short gtlin
            mov ax,1            ;standard complete
            jmp rtnstd          ;note! does not return to here
getline endp
edit    ends
end ; END OF PRTPACK.ASM ASSEMBLER LISTING ; ERRTN.ASM
; SCREEN GENERATION COMPILER (SGC) - Source Code documentation
; Copyright(c) 1987 Syndetic Corporation. All Rights Reserved
; ---- SGC program SUPPORT MODULES (ASSEMBLER ROUTINES) --------
title ERRTN.ASM: Pascal Return procedures
            name errtn
dms0001     segment byte public 'code'
            assume ds:dms0001,cs:dms0001
public dms0008
dms0008 proc near           ;save data for jump return to pascal
;
;this routine sets the error return routine for a proper
;return to PASCAL via a jump to this routine.
;
;   al has the bytes in frame to skip
;
            mov bx,offset dms0009   ;stak ptr save space
            mov word ptr cs:[bx],bp ;bp has sp of call arg frame
            mov word ptr cs:[bx+2],si   ;register restor
            mov word ptr cs:[bx+4],ds
            mov word ptr cs:[bx+6],di   ;register restor
            mov word ptr cs:[bx+8],es
            mov bx,offset dms0011   ;modify RTN skips
            mov word ptr cs:[bx],0cah       ;far return with offset
            mov word ptr cs:[bx+1],ax
            ret
dms0008 endp
public dms0009
dms0009 proc near
            dw 0
            dd 2 dup (0)
dms0009 endp
public dms0010
dms0010 proc near       ;standard return
            mov bx,offset dms0009   ;set sp saved address
            mov sp,cs:[bx]
            lds si,dword ptr cs:[bx+2]      ;restore ds,si
```

```
        les di,dword ptr cs:[bx+6]    ;restore es,di
        pop bp
dms0010 endp
dms0011   proc far         ;return
        ret 01
dms0011 endp
dms0001 ends
end
; END OF ERRTN.ASM ASSEMBLER LISTING
```

What is claimed is:

1. An computer software system having set of instructions for controlling a general purpose digital computer in performing a desired function comprising:
a set of instructions formed into each of a plurality of modules, each module comprising:
a communications process,
a computational process,
a data storage process, and
a feedback process.

2. The system of claim 1, wherein each process is internally mathematically complete.

3. The system of claim 1, wherein each process satisfies a complete truth table.

4. An computer program having a plurality of instructions for controlling the operation of a computer to perform a function comprising:
a plurality of sets of instructions grouped to form a program module; each program module comprising
a first set of instructions for defining a communications process,
a second set of instructions defining a computational process,
a third set of instructions defining a data storage process, and
a fourth set of instructions defining a feedback process; and
generating a plurality of said program modules, said plurality of said program modules forming a complete program, each program module accessing other program modules in said program.

5. The computer program of claim 4, wherein each of said program modules is internally mathematically complete and wherein each process satisfies a complete truth table.

6. An process for generating a computer program having a plurality of instructions for controlling operation of a computer to form a function, said process comprising:
forming a plurality of instructions for forming a program module, generating within each program module
a first set of instructions defining a communications process,
a second set of instructions defining a computational process,
a third set of instructions defining a data storage process, and
a fourth set of instructions defining a feedback process; and
generating a plurality of said program modules to form a complete program, each program module accepting other program modules in said program.

7. The process of claim 6, further comprising the step of forming each process to be internally mathematically complete and to have a complete truth table.

8. An system for generating or controlling an apparatus or manufacturing process comprising:
a set of instructions formed into each of a plurality of modules, each module comprising
a communication process,
a computational process,
a data storage process, and
a feedback process;
wherein each process is internally mathematically complete and wherein each process satisfies a complete truth table.

* * * * *